(12) United States Patent
Heuler

(10) Patent No.: US 8,479,175 B1
(45) Date of Patent: Jul. 2, 2013

(54) MAINFRAME-BASED WEB SERVICE DEVELOPMENT ACCELERATOR

(75) Inventor: Randal J. Heuler, McMurray, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 643 days.

(21) Appl. No.: 12/688,545

(22) Filed: Jan. 15, 2010

Related U.S. Application Data

(63) Continuation-in-part of application No. 12/248,403, filed on Oct. 9, 2008, and a continuation-in-part of application No. 12/248,249, filed on Oct. 9, 2008, now Pat. No. 8,364,625, and a continuation-in-part of application No. 12/248,278, filed on Oct. 9, 2008, now Pat. No. 8,370,281, and a continuation-in-part of application No. 12/248,177, filed on Oct. 9, 2008.

(60) Provisional application No. 60/979,499, filed on Oct. 12, 2007, provisional application No. 60/979,500, filed on Oct. 12, 2007, provisional application No. 60/979,503, filed on Oct. 12, 2007, provisional application No. 60/979,508, filed on Oct. 12, 2007.

(51) Int. Cl.
*G06F 9/45* (2006.01)
*G06F 9/44* (2006.01)
*G06F 15/16* (2006.01)
*G06F 3/00* (2006.01)

(52) U.S. Cl.
USPC ........... 717/136; 717/100; 717/137; 717/140; 709/227; 719/316

(58) Field of Classification Search
None
See application file for complete search history.

(56) References Cited

U.S. PATENT DOCUMENTS

| | | | |
|---|---|---|---|
| 5,301,270 A | 4/1994 | Steinberg et al. | |
| 6,738,975 B1 | 5/2004 | Yee et al. | |
| 6,782,540 B1 * | 8/2004 | Chow et al. | 719/316 |
| 6,817,008 B2 | 11/2004 | Ledford et al. | |
| 6,915,487 B2 | 7/2005 | Costigan, Jr. et al. | |
| 6,931,623 B2 * | 8/2005 | Vermeire et al. | 717/108 |
| 7,007,266 B1 | 2/2006 | Isaacson | |
| 7,010,780 B2 | 3/2006 | Perycz et al. | |
| 7,065,745 B2 | 6/2006 | Chan | |
| 7,124,413 B1 | 10/2006 | Klemm et al. | |
| 7,134,086 B2 | 11/2006 | Kodosky | |
| 7,340,714 B2 | 3/2008 | Upton | |
| 7,437,703 B2 | 10/2008 | Wu | |
| 7,557,707 B2 | 7/2009 | Kumar et al. | |
| 7,668,836 B2 * | 2/2010 | Fung et al. | 707/999.01 |

(Continued)

OTHER PUBLICATIONS

Sneed, H., A pilot project for migrating COBOL code to web services, International Journal on Software Tools for Technology Transfer, Dec. 2009, vol. 11, Issue 6, pp. 441-451, [retrieved on Jun. 21, 2012], Retrieved from the Internet: <URL:http:// www.springerlink.com/index/n414964046471227.pdf>.*

(Continued)

*Primary Examiner* — Thuy Dao
*Assistant Examiner* — Geoffrey St Leger
(74) *Attorney, Agent, or Firm* — Buchanan Ingersoll & Rooney PC; Robert J. Pugh

(57) ABSTRACT

An interactive computer architecture is provided that can be employed as a bridge between a mainframe-based computing environment and a distributed server-based computing environment. A request/reply contract can be expressed within the mainframe-based environment and employed as the basis for generating a web service in the distributed computing environment.

16 Claims, 100 Drawing Sheets

U.S. PATENT DOCUMENTS

| | | | |
|---|---|---|---|
| 7,707,564 B2* | 4/2010 | Marvin et al. ................ | 717/140 |
| 7,941,543 B2* | 5/2011 | Moussallam et al. ......... | 709/227 |
| 7,941,747 B2 | 5/2011 | Jawaharlal et al. | |
| 7,954,051 B2 | 5/2011 | Achilles et al. | |
| 8,069,435 B1 | 11/2011 | Lai | |
| 2001/0025372 A1* | 9/2001 | Vermeire et al. .................. | 717/7 |
| 2004/0073565 A1 | 4/2004 | Kaufman et al. | |
| 2005/0021836 A1 | 1/2005 | Reed et al. | |
| 2005/0039173 A1* | 2/2005 | Tondreau et al. ............ | 717/136 |
| 2005/0044197 A1 | 2/2005 | Lai | |
| 2005/0096959 A1 | 5/2005 | Kumar et al. | |
| 2005/0138606 A1* | 6/2005 | Basu et al. .................... | 717/136 |
| 2005/0273709 A1 | 12/2005 | Lough et al. | |
| 2005/0283410 A1 | 12/2005 | Gosko | |
| 2006/0031820 A1* | 2/2006 | Li ................................. | 717/137 |
| 2007/0050735 A1 | 3/2007 | Roesnet et al. | |
| 2007/0055678 A1* | 3/2007 | Fung et al. .................... | 707/100 |
| 2007/0250769 A1 | 10/2007 | Bass et al. | |
| 2009/0089797 A1* | 4/2009 | Kukreja et al. .............. | 719/314 |
| 2009/0099981 A1 | 4/2009 | Heuler et al. | |
| 2009/0099982 A1 | 4/2009 | Heuler et al. | |
| 2009/0100344 A1 | 4/2009 | Heuler et al. | |
| 2009/0100402 A1 | 4/2009 | Heuler et al. | |
| 2009/0158237 A1* | 6/2009 | Zhang et al. .................. | 717/100 |
| 2009/0165115 A1 | 6/2009 | Toumura et al. | |
| 2010/0077386 A1* | 3/2010 | Akkiraju et al. ............. | 717/136 |

OTHER PUBLICATIONS

Kho, W., Using WebSphere Developer for zSeries V6 to Create a CICS Web service in CICS Transaction Server for z/OS V3.1, IBM developerWorks, Nov. 23, 2005, 11 pages, [retrieved on Jun. 22, 2012], Retrieved from the Internet: <URL: http://www.ibm.com/developerworks/websphere/library/techarticles/0511_kho/0511_kho.html>.*

International Search Report for International Application PCT/US 2008/79316 dated Dec. 9, 2008.

Written Opinion of the International Search Authority for International Application PCT/US 2008/79316 dated Dec. 9, 2008.

International Preliminary Report on Patentability for International Application PCT/US 2008/79316 dated Apr. 13, 2010.

Jacobson, Carl, "Internet Tools Access Administrative Data", Cause/Effect Magazine, vol. 18, No. 3, Fall 1995, pp. 1-8.

Kernochan, Wayne, "Mainframe Conversion to Web Services", SearchDataCenter.com, Jul. 5, 2006, pp. 1-5.

Kernochan, Wayne, "Web Services Development Needs the Mainframe", SearchDataCenter.com, Apr. 19, 2006, pp. 1-6.

"SOA Development Tools Utilize Existing Mainframe Resources", Mar. 28, 2006 and "GT Software Makes Service-Oriented Architecture Available for the Mainframe", Feb. 27, 2006, accessed from ThomasNet Industrial Newsroom®, 2007, pp. 1-5.

"COBOL sp2, The 100% COBOL Solution for Graphical User Interface Development", accessed from http://www.flexus.com/cobolsp2.html on Mar. 30, 2007, pp. 1-14.

Wetzel, Doug, "STSC CrossTalk—Managing the Changing Mainframe Environment", Mar. 2000, accessed from http://www.stsc.hill.af.mil/crossTalk/2000/03/wetzel.html on Mar. 30, 2007, pp. 1-5.

Kirzner, Rikki, "IBM's Enterprise Generation Language Leverages Existing Business Developers Skills to Expedite Java/J2EE and SOA Development", accessed from http://www.devx.com/ibm/Article/31574/4047 on Mar. 30, 2007, pp. 1-5.

Myers, Brad A., "User Interface Software Tools", Aug. 1994, CMU-CS-94-182, pp. 1-57 as accessed from http://www.google.com/search?q=cache:geUYgYz0x9wJ:www3.cc.gatech.edu/classes/AY2002/cs4470_fall/CMU-CS-94-182.
pdf+mainframe+user+interface+construction+tool&hl=en
&ct=clnk&cd=35&gl=us on Mar. 29, 2007.

U.S. Appl. No. 12/688,515, filed Jan. 15, 2010.
U.S. Appl. No. 12/688,528, filed Jan. 15, 2010.
Office Action mailed Jan. 31, 2012 in U.S. Appl. No. 12/248,403.
Office Action mailed May 3, 2011 in U.S. Appl. No. 12/248,249.
Office Action mailed Dec. 16, 2011 in U.S. Appl. No. 12/248,249.
Advisory Action mailed Feb. 24, 2012 in U.S. Appl. No. 12/248,249.
Office Action mailed May 3, 2011 in U.S. Appl. No. 12/248,278.
Office Action mailed Nov. 30, 2011 in U.S. Appl. No. 12/248,278.
Advisory Action mailed Feb. 3, 2012 in U.S. Appl. No. 12/248,278.
Office Action mailed Aug. 16, 2011 in U.S. Appl. No. 12/248,177.

* cited by examiner

DATE: 03/30/2007          XML PROPERTIES BUILDER          TIME: 14:54:17
CHAPTER NAME: NAPINDEX          SCREEN 1          MAX SIZE: 47,979
SEQUENCE NBR: _____1____                          REGION: CIQR

```
                                                  <-------- COBOL -------->
FLD                         OFF      FIELD   OCCURS         FLD  COB  GRP  RULE
SEQ  FIELD NAME             SET      LEN     NUM   DEPTH    TYP  LVL  IND  IND

0001 NAPINDEX               0000000  0033886 00000 000           01        N
0002 G360-USER-REQUIRED-FIELD 0000000 0000137 00000 000           05   G    N
0003 USER-KEY               0000000  0000040 00000 000      A    10   G    N
0004 SUBMITTER-LOGIN        0000040  0000007 00000 000      A    10        N
0005 SUBMITTER-OPERID       0000047  0000003 00000 000      A    10        N
0006 G360ID                 0000050  0000016 00000 000      A    10        N
0007 BPM-FUNCTION           0000066  0000005 00000 000      A    10        N
0008 BPM-SOURCE             0000071  0000008 00000 000      A    10        N
0009 BPM-SOURCE-TYPE        0000079  0000001 00000 000      A    10        N
0010 BPM-TRAN-GROUP         0000080  0000004 00000 000      A    10        N
0011 BPM-ACTION             0000084  0000001 00000 000      A    10        N
0012 BPM-TRANSACTION        0000085  0000004 00000 000      A    10        N
0013 TRAN-STATUS            0000089  0000001 00000 000      A    10        N
0014 TRAN-DESC              0000090  0000020 00000 000      A    10        N
```

CLEAR: CANCEL   ENTER: SAVE   F3: SAVE/RETURN   F7/F8: UP/DOWN   F10/F11: LEFT/RIGHT

*FIG. 4A*

| | | XML PROPERTIES BUILDER | | TIME: 14:55:31 | | |
|---|---|---|---|---|---|---|
| DATE: 03/30/2007 | | SCREEN 2 | | MAX SIZE: 47,979 | | |
| CHAPTER NAME: NAPINDEX | | | | REGION: CIQR | | |
| SEQUENCE NBR: 1 | | | | | | |
| FLD SEQ | FIELD NAME | TAG TYP | XML TAG NAME | | JST IND | PAD CHR |
| 0001 | NAPINDEX | __ | _____ | | _ _ | __ |
| 0002 | G360 - USER - REQUIRED - FIELD | __ | _____ | | _ _ | __ |
| 0003 | USER - KEY | __ | userKey_____ | | _ _ | __ |
| 0004 | SUBMITTER - LOGIN | __ | OperId_____ | | _ _ | __ |
| 0005 | SUBMITTER - OPERID | __ | amtOperId_____ | | _ _ | __ |
| 0006 | G360ID | __ | G360ID_____ | | _ _ | __ |
| 0007 | BPM - FUNCTION | __ | bpmFunction____ | | _ _ | __ |
| 0008 | BPM - SOURCE | __ | bpmSource_____ | | _ _ | __ |
| 0009 | BPM - SOURCE - TYPE | __ | bpmSourceType__ | | _ _ | __ |
| 0010 | BPM - TRAN - GROUP | __ | bpmTranGrp_____ | | _ _ | __ |
| 0011 | BPM - ACTION | __ | bpmAction_____ | | _ _ | __ |
| 0012 | BPM - TRANSACTION | __ | bpmTrans_____ | | _ _ | __ |
| 0013 | TRAN - STATUS | __ | tranStatus_____ | | _ _ | __ |
| 0014 | TRAN - DESC | __ | transactionDesc | | _ _ | __ |

CLEAR : CANCEL   ENTER : SAVE   F3 : SAVE / RETURN   F7 / F8 : UP / DOWN   F10 / F11 : LEFT / RIGHT

*FIG. 4B*

DATE: 03/30/2007          XML PROPERTIES BUILDER                TIME: 14:56:12
CHAPTER NAME: NAPINDEX              SCREEN 3                    MAX SIZE: 47,979
SEQUENCE NBR:    1                                              REGION: CIQR

| FLD  | FIELD NAME                          | SUP | CNV | DFT | DEFAULT VALUE   | CNV |
| SEQ  |                                     | IND | TYP | TYP |                 | DIR |
|------|-------------------------------------|-----|-----|-----|-----------------|-----|
| 0001 | NAPINDEX                            | —   | —   | —   |                 | —   |
| 0002 | G360 - USER - REQUIRED - FIELD      | —   | —   | —   |                 | —   |
| 0003 | USER - KEY                          | —   | —   | —   |                 | —   |
| 0004 | SUBMITTER - LOGIN                   | —   | —   | —   |                 | —   |
| 0005 | SUBMITTER - OPERID                  | —   | —   | —   | IDD             | —   |
| 0006 | G360ID                              | —   | —   | —   |                 | —   |
| 0007 | BPM - FUNCTION                      | —   | —   | —   | BPM             | —   |
| 0008 | BPM - SOURCE                        | —   | —   | —   |                 | —   |
| 0009 | BPM - SOURCE - TYPE                 | —   | —   | —   |                 | —   |
| 0010 | BPM - TRAN - GROUP                  | —   | —   | —   |                 | —   |
| 0011 | BPM - ACTION                        | —   | —   | —   |                 | —   |
| 0012 | BPM - TRANSACTION                   | —   | —   | —   | ACCOUNT OWNER   | —   |
| 0013 | TRAN - STATUS                       | —   | —   | —   |                 | —   |
| 0014 | TRAN - DESC                         | —   | —   | —   |                 | —   |

CLEAR : CANCEL   ENTER : SAVE   F3 : SAVE / RETURN   F7 / F8 : UP / DOWN   F10 / F11 : LEFT / RIGHT

| DATE: 03/30/2007 | XML PROPERTIES BUILDER | | | TIME: 14:56:40 | |
| --- | --- | --- | --- | --- | --- |
| CHAPTER NAME: NAPINDEX | SCREEN 4 | | | MAX SIZE: 47,878 | |
| SEQUENCE NBR: 1 | | | | REGION: CIQR | |

| FLD SEQ | FIELD NAME | MND IND | EDIT TBL # | VLD TYP | SYST VARB | CONV VARB |
| --- | --- | --- | --- | --- | --- | --- |
| 0001 | NAPINDEX | | | | | |
| 0002 | G360 - USER - REQUIRED - FIELD | | | | | |
| 0003 | USER - KEY | | | | | |
| 0004 | SUBMITTER - LOGIN | | | | | |
| 0005 | SUBMITTER - OPERID | | | | | |
| 0006 | G360ID | | | | | |
| 0007 | BPM - FUNCTION | | | | | |
| 0008 | BPM - SOURCE | | | | | |
| 0009 | BPM - SOURCE - TYPE | | | | | |
| 0010 | BPM - TRAN - GROUP | | | | | |
| 0011 | BPM - ACTION | | | | | |
| 0012 | BPM - TRANSACTION | | | | | |
| 0013 | TRAN - STATUS | | | | | |
| 0014 | TRAN - DESC | | | | | |

CLEAR : CANCEL    ENTER : SAVE    F3 : SAVE / RETURN    F7 / F8 : UP / DOWN    F10 / F11 : LEFT / RIGHT

*FIG. 4D*

03/30/2007 AOR: CIQR; TBL: 4983 - THIS IS THE NEW ACCOUNT PROPOSAL IN 03:01:00

[SELECT] [FIND] [MAX DOWN] [MAX UP] [TBL DEF] [COL DEF] [AUDIT TRAIL] [SORT] [HELP]

| KEY | TBL # | ST | KEY T | T/F CLCTN | BEFORE CL | BX | AFTER CL | AX | CCSTB | JSTBL | G |
|---|---|---|---|---|---|---|---|---|---|---|---|
| NAPBENE | 5475 | S | | G360TRFS | NAPBFRUL | N | NAPAFTRU | N | 4525 | 4601 | |
| NAPCDUDL | 5437 | S | | G360TRFS | | | NAPAFTRU | D | 4525 | 5767 | |
| NAPCIPEN | 5217 | S | | G360TRFS | | | NAPAFTRU | F | 4525 | 5767 | |
| NAPCIPID | 5215 | S | | G360TRFS | NAPBFRUL | C | NAPAFTRU | C | 4525 | 5767 | |
| NAPCSTEN | 5217 | S | | G360TRFS | | | NAPAFTRU | F | 4525 | 5767 | |
| NAPCSTID | 5215 | I | | G360TRFS | NAPBFRUL | C | NAPAFTRU | C | 4525 | 5767 | |
| NAPFOTO1 | 5015 | S | | | | | | | 4525 | 4601 | |
| NAPHOME | 5401 | U | | G360TRFS | NAPBFRUL | A | NAPAFTRU | A | 4525 | 5767 | |
| NAPISUMM | 5355 | U | | G360TRFS | NAPBFRUL | B | NAPAFTRU | B | 4525 | 4601 | |
| NAPKYCAD | 5465 | U | | G360TRFS | NAPBFRUL | H | NAPAFTRU | H | 4525 | 4601 | |
| NAPKYCEN | 5471 | U | | G360TRFS | NAPBFRUL | L | NAPAFTRU | L | 4525 | 4601 | |
| NAPKYCFE | 5467 | S | | G360TRFS | NAPBFRUL | J | NAPAFTRU | J | 4525 | 5767 | |
| NAPKYCGN | 5447 | U | | G360TRFS | NAPBFRUL | G | NAPAFTRU | G | 4525 | 4601 | |
| NAPKYCIB | 5449 | U | | G360TRFS | NAPBFRUL | I | NAPAFTRU | I | 4525 | 4601 | |
| NAPKYCNP | 5469 | U | | G360TRFS | NAPBFRUL | K | NAPAFTRU | K | 4525 | 4601 | |
| NAPKYCSF | 5473 | U | | G360TRFS | NAPBFRUL | M | NAPAFTRU | M | 4525 | 4601 | |

F1: HELP; F3: RETURN; F7/F8: UP/DOWN; F10/F11: LEFT/RIGHT; F9: REFRESH; F12: EXIT

FIG. 5

03 / 30 / 2007  AOR : CIQR;    TBL : 5215 - NAP CUSTOMER INFORMATION PAGE FOR I    03 : 04 : 32

| SELECT | FIND | MAX DOWN | MAX UP | TBL DEF | COL DEF | AUDIT TRAIL | SORT | HELP |

| KEY | OBJECT TYP | OBJECT ID | T - TBL | RUL # | PCK | JFK |
|-----|------------|-----------|---------|-------|-----|-----|
| 010 | mainContent |  |  |  |  |  |
| 020 | template | banner | 5489 |  | 010 |  |
| 025 | template | cip section heading | 5585 |  | 010 |  |
| 050 | label | patriot act label |  |  | 010 |  |
| 060 | template | x | 5469 |  | 010 |  |
| 070 | chkBoxHTML2 | capacities |  |  | 010 |  |
| 100 | br |  |  |  | 010 |  |
| 105 | fieldset |  |  |  | 010 |  |
| 130 | legend |  |  |  | 105 |  |
| 135 | input | first name    input & label |  |  | 105 |  |
| 145 | input | middle name  input & label |  |  | 105 |  |
| 155 | input | last name     input & label |  |  | 105 |  |
| 160 | br |  |  |  | 010 |  |
| 295 | radiohtml | customer citizenship |  |  | 010 |  |
| 296 | div | ssndiv |  |  | 010 |  |
| 300 | input | ssn field |  |  | 296 |  |

F1 : HELP;   F3 : RETURN;   F7 / F8 : UP / DOWN;   F10 / F11 : LEFT / RIGHT;   F9 : REFRESH;   F12 : EXIT

03/30/2007 AOR: CIQR; TBL: 5215 - NAP CUSTOMER INFORMATION PAGE FOR I 03:05:22

| SELECT | FIND | MAX DOWN | MAX UP | TBL DEF | COL DEF | AUDIT TRAIL | SORT | HELP |

KEY  RGI  ATTRS  PTBL#  PKEY  T-TIP  LABEL  CLASS  STYLE  ONCLK  MAP TO TAG

| KEY | RGI | ATTRS | PTBL# | PKEY | T-TIP | LABEL | CLASS | STYLE | ONCLK | MAP TO TAG |
|---|---|---|---|---|---|---|---|---|---|---|
| 010 | | | | | | | | | | |
| 020 | | | | | | | | | | |
| 025 | | | | | | | | | | |
| 050 | | | | | | | | | | |
| 060 | | | 4471 | 071 | | 1261 | | | | atCIPCustInd |
| 070 | | | | | | 1544 | | | | xab |
| 100 | | | | | | | | | | |
| 105 | | | | | | 1262 | | | | WcustFirstName |
| 130 | | | | | | 1263 | | | | WcustMidName |
| 135 | | | | | | 1264 | | | | WcustLastName |
| 145 | | | 4471 | 030 | | 1265 | | | | |
| 155 | | | | | | 1266 | | s208 | | WcustCitizenCd |
| 160 | | | | | | | | | | ssndiv |
| 295 | | | | | | 1267 | | | o069 | WcustTIN |
| 296 | | | | | | | | | | |
| 300 | | | | | | | | | | |

F1: HELP; F3: RETURN; F7/F8: UP/DOWN; F10/F11: LEFT/RIGHT; F9: REFRESH; F12: EXIT

← 632

03 / 30 / 2007  AOR : CIQR;  TBL : 5489 - NAP BANNR                    03 : 07 : 23

| SELECT | FIND | MAX DOWN | MAX UP | TBL DEF | COL DEF | AUDIT TRAIL | SORT | HELP |

| KEY | OBJECT TYP | OBJECT ID | T-TBL | RULE # | PCK | JFK |
|-----|------------|-----------|-------|--------|-----|-----|
| 001 | TABLE | OUTER TABLE | | | 001 | |
| 002 | TR | | | | 002 | |
| 003 | TD | | | | 003 | |
| 004 | CENTER | | | | 004 | |
| 010 | TABLE | | | | 010 | |
| 015 | TR | | | | 015 | |
| 020 | TD | | | | 020 | |
| 025 | LABEL | ACCT TYPE DESC LABEL | | | 015 | |
| 030 | TD | | | | 030 | |
| 035 | LABEL | ACCT TYPE DESC | | | 015 | |
| 036 | TD | | | | 036 | |
| 037 | LABEL | ACCT TYPE OF CUSTOMER | | | 010 | |
| 040 | TR | | | | 040 | |
| 045 | TD | | | | 045 | |
| 050 | LABEL | ACCOUNT NAME LABEL | | | 040 | |
| 055 | TD | | | | | |

F1 : HELP;  F3 : RETURN;  F7 / F8 : UP / DOWN;  F10 / F11 : LEFT / RIGHT;  F9 : REFRESH;  F12 : EXIT

*FIG. 6C*

03/30/2007   AOR : CIQR;   TBL : 5189 - CASH RECEIPTS SCREEN 03            03 :10 : 53

[SELECT] [FIND] [MAX DOWN] [MAX UP] [TBL DEF] [COL DEF] [AUDIT TRAIL] [SORT] [HELP]

| KEY | OBJECT TYP | OBJECT ID | T-TBL | RUL # | PCK | JFK |
|-----|------------|-----------|-------|-------|-----|-----|
| 075 | LABEL      |                     |   | A42 | 020 |   |
| 079 | TABLE      |                     |   | A42 | 020 |   |
| 080 | TR         |                     |   |     | 079 |   |
| 095 | TD         |                     |   |     | 080 |   |
| 100 | INPUT      | COR ACCOUNT ENTRY   |   |     | 095 |   |
| 105 | TD         |                     |   |     | 080 |   |
| 110 | LABEL      | OR LABEL            |   |     | 105 |   |
| 115 | TD         |                     |   |     | 080 |   |
| 120 | PICKLIST   | BENEPICKLIST        |   | A46 | 115 |   |
| 125 | BR         |                     |   |     | 010 |   |
| 130 | TABLE      |                     |   |     | 020 |   |
| 135 | TR         | DDAINFO             |   |     | 130 |   |
| 140 | TH         | ACCTTYPEHEADER      |   |     | 135 |   |
| 145 | TH         | ACCTNAMEHEADER      |   |     | 135 |   |
| 150 | TH         | AVAILBALHEADER      |   |     | 135 |   |
| 155 | TH         | LEDGERBALHEADER     |   |     | 135 |   |

F1 : HELP;  F3 : RETURN;  F7 / F8 : UP / DOWN;  F10 / F11 : LEFT / RIGHT;  F9 : REFRESH;  F12 : EXIT

EAI BUSINESS RULES ENGINE BUILDER

| G360TRFS | GLOBAL 360 TRUE/FALSE COLLECTION |

SHOW ONLY RULES STARTING WITH? [ > ] SELECT RULE:

[ ADD NEW RULE ]  [ UPDAT ]

708

PRI:001 A01 ACCOUNT NUMBER VALIDATION RULE
PRI:001 A02 AMTRUST ACCOUNT CONSOLIDATION RULE
PRI:001 A03 AMTRUST ACCOUNT CLOSED RULE
PRI:001 A04 UNAUTHORIZED ACCESS ON AMTRUST ACCOUNT R
PRI:001 A05 AMTRUST SYSTEM UNAVAILABLE ERROR RULE
PRI:001 A06 WIRE RECEIPT DISPLAY BUTTON RULE
PRI:001 A07 SUB-ACCOUNT VALIDATION RULE
PRI:001 A08 WIRE TRUST BANK VALIDATION TO THE TRUST
PRI:001 A09 WMG RECEIPT TAX CODE PICKLIST FOR WIRE N
PRI:001 A10 WHG ACH RECEIPT TAX CODE PICKLIST FOR NO
PRI:001 A11 WHG WIRE/ACH RECEIPT TAX CODE PICKLIST F
PRI:001 A12 I I G RECEIPT TAX CODE PICKLIST
PRI:001 A13 IDENTIFY ACCOUNTING METHOD 3 OR 4
PRI:001 A14 IDENTIFY ACCOUNTING METHOD AS DUAL CASH
PRI:001 A16 TAX CODE PICKLIST FROM CODE SET
PRI:001 A15 DISPLAY RECEIPT TAX CODE BOUNDED PICKLIS
PRI:001 A17 INVALID ASSET RESPONSE CODE FROM TRSITAS
PRI:001 A18 ENTER PAYOR
PRI:001 A19 SELECT PAYOR
PRI:001 A20 IS RECEIPT CURR INDEX < 1
PRI:001 A21 IS RECEIPT CURR INDEX > 0
PRI:001 A22 DISPLAY MULTIPLE RECEIPTS FIELDS FOR CA
PRI:001 A23 IDENTIFY WIRE RULE
PRI:001 A24 IDENTIFY ACH RULE
PRI:001 A25 IDENTIFY CHECK RECEIPT RULE
PRI:001 A26 IDENTIFY DDA - TST TRX RULE
PRI:001 A27 HIDE SAVE AS NEW RECEIPT BUTTON
PRI:001 A28 BROA IS NULL
PRI:001 A29 IDENTIFY BUTTON ON CHECK RECEIPT ENTRY S

DONE

FIG. 7D

EAI BUSINESS RULES ENGINE BUILDER

COLLECTION NAME: [G360TRFS]　RULE ID: [A42]　RULE DESCRIPTION: [DISPLAY D2T ENTRY FIELDS ▽]

TYPE: [H - SET TRUE / FALSE ONLY (NO ACTION TAKEN) ▽]　PRIORITY: [1]　TRIGGER OPER: [GT ▽]　TRIGGER LVL: [0]　SET VAR: [　]

RULE DATA:

```
+ - ADD TO AN INCOPY/OUTCOPY FIELD
- - SUBTRACT FROM AN INCOPY / OUTCOPY FIELD
A - SET APPLICATION VARIABLE
B - BUILD OUTPUT OBJECT (XML) - OR ALL OBJS
C - EAI FRAMEWORK CONVERSION (TAB 2285)
D - SET INCOPY / OUTCOPY DATA FIELD
E - ERROR RULE
F - SET NEW FORM RULE (SMART SCRIPT)
G - SET GLOBAL VARIABLE
H - SET TRUE / FALSE ONLY (NO ACTION TAKEN)
I - INDIVIDUAL ARRAY ELEMENT TRUE / FALSE
J - REMOVE STORE AND FORWARD
K - SET NEXT FORM AND LEAVE (NRULE+LRULE)
L - EXIT RULE PROCESSING
M - SEND EMAIL
N - SET NEXT FORM FOR EAI - XSLT FRAMEWORK
O - SET EAI FRAMEWORK OUTCOPY
Q - PLACE INPUT MESSAGE ON MQ - QUEUE
R - RESET APPLICATION FIELD
S - STORE AND FORWARD USING EAI FRAMEWORK
T - TRANSLATION
U - SET USER MESSAGE
W - DELETE OCCURENCE
X - SET AND LINK TO EXIT PROGRAM
0 - RIGHT JUSTIFY AND ZERO FILL
```

RULE DATA TYPE: [　]

| CND# | TYPE | AND/OR | FIELD | OPER | TAG/VALUE | TYPE | POINTS |
|------|------|--------|-------|------|-----------|------|--------|
| 001 ☐ | LIT ▽ | AND ▽ | AUTHRESPONSE ▽ | EQ ▽ | A | LIT ▽ | 1 |
| 002 ☐ | ▽ | ▽ | ▽ | ▽ | | ▽ | 0 |
| 003 ☐ | ▽ | ▽ | ▽ | ▽ | | ▽ | 0 |
| 004 ☐ | ▽ | ▽ | ▽ | ▽ | | ▽ | 0 |

UE ... M THE DROP DOWN PROVIDED. THEN CUT AND PASTE TO THE APPROPRIATE LOCATION.

AG NAME HELP [ ▽ ]

[UPDATE RULE] [BACK] [DELETE RULE]

*FIG. 7E*

EAI BUSINESS RULES ENGINE BUILDER

COLLECTION NAME: G360TRFS  RULE ID: A42  RULE DESCRIPTION: DISPLAY O2T ENTRY FIELDS

TYPE: H-SET TRUE/FALSE ONLY (NO ACTION TAKEN) ▼  PRIORITY: 1  TRIGGER OPER: GT ▼  TRIGGER LVL: 0  SET VAR: [ ]

RULE DATA: [ ]

RULE DATA TYPE: ▼

| CND# | DEL | FIELD | OPER | TAG/VALUE | TYPE | AND/OR | FIELD |
|------|-----|-------|------|-----------|------|--------|-------|
| 001  | ☐   | BROA  | GT ▼ |           | LIT ▼| AND ▼  | AUTHRESPONSE ▼ |
| 002  | ☐   |       | ▼    |           | ▼    | ▼      | ▼ |
| 003  | ☐   |       | ▼    |           | ▼    | ▼      | ▼ |
| 004  | ☐   |       | ▼    |           | ▼    | ▼      | ▼ |

TO OBTAIN A TAG NAME, SELECT FROM THE DROP DOWN PROVIDED, THEN CUT AND PASTE

XML TAG NAME HELP ▼

[UPDATE RULE] [BACK] [DELETE RULE]

---

A - APPLICATION VARIABLE
B - EXIT PROGRAM (PROGRAMS NAME)
C - CNV TYP FROM TAB 2285 + DIR LEFT / RIGHT
D - INCOPY / OUTCOPY DATA FIELD
E - EXIT PROCESS (PROCESS NAME, EDIT TABLE #)
F - FORMULA
G - GLOBAL VARIABLE
I - INTRINSIC FUNCTION
J - EDIT TABLE LOOKUP
L - LITERAL
S - STORE - N=FWD hh:mm:ss.nnn;nnn=max attempts
O - OUTPUT OBJ nnnn(xxx) nnnn=tb#,xxx=key
P - INPUT POSITIONAL VARIABLE
Q - EXIT PROGRAM PROCESSING VIA MQ
R - REMOVE STORE AND FORWARD
S - SYSTEM VARIABLE
T - EDIT TABLE TRANSLATION
V - INPUT DELIMITED VARIABLE
X - INPUT XML VARIABLE
Y - OCCURENCE
Z - OCCURENCE WORKAREA

*FIG. 7F*

| 03 / 30 / 2007 | eBUSINESS APPLICATION INTEGRATION<br>LOGGING UTILTIY | | | 03 : 20 : 45 | |
|---|---|---|---|---|---|
| USER ID -:<br>TIME -: | _:_:_ | MESSAGE ID -: DSSMESSAGE<br>TASK -: | | DATE -: 03 / 30 / 2007<br>(ENTER "=" CURR DT) | |

| I/O | USER ID | MESSAGE ID | DATE | TIME IN | TIME OUT | TASK NUMBER |
|---|---|---|---|---|---|---|
| — | | DSSMESSAGE | 03 / 30 / 2007 | 08 : 20 : 3688 | | 0002679 |
| — | | DSSMESSAGE | 03 / 30 / 2007 | 08 : 20 : 5730 | | 0002681 |
| — | | DSSMESSAGE | 03 / 30 / 2007 | 08 : 21 : 0198 | | 0002684 |
| — | | DSSMESSAGE | 03 / 30 / 2007 | 08 : 21 : 0746 | | 0002687 |
| — | | DSSMESSAGE | 03 / 30 / 2007 | 08 : 21 : 1641 | | 0002691 |
| — | | DSSMESSAGE | 03 / 30 / 2007 | 08 : 21 : 2170 | | 0002693 |
| — | | DSSMESSAGE | 03 / 30 / 2007 | 08 : 22 : 3940 | | 0002723 |
| — | | DSSMESSAGE | 03 / 30 / 2007 | 08 : 23 : 3280 | | 0002744 |
| — | | DSSMESSAGE | 03 / 30 / 2007 | 08 : 27 : 2059 | | 0002796 |
| — | | DSSMESSAGE | 03 / 30 / 2007 | 08 : 27 : 2491 | | 0002798 |
| — | | DSSMESSAGE | 03 / 30 / 2007 | 08 : 33 : 1444 | | 0002894 |
| — | | DSSMESSAGE | 03 / 30 / 2007 | 08 : 33 : 2699 | | 0002896 |
| — | | DSSMESSAGE | 03 / 30 / 2007 | 08 : 33 : 4056 | | 0002918 |
| — | | DSSMESSAGE | 03 / 30 / 2007 | 08 : 33 : 5071 | | 0002920 |

TYPE 'I' INPUT; 'O' OUTPUT; 'C' CONTROL INFO; F3: PREV SCREEN; F 7/8: UP / DOWN

FIG. 8

| 03 / 30 / 2007 | eBUSINESS APPLICATION INTEGRATION | 03 : 21 : 05 |
|---|---|---|
| | INPUT MESSAGE DISPLAY | |

| USER ID  : | | MESSAGE ID  : | DSSMESSAGE | TIMEIN  : | 08 : 20 : 3688 |
|---|---|---|---|---|---|
| DATE  : | 03 / 30 / 2007 | TASK  : | 0002679 | TIMEOUT  : | |

```
- <dss>
    <Reqld>DSSMESSAGE</ Reqld>
    <userKey></ userKey>
    <Operld>PP11679</ Operld>
    <amtOperld>IEH</ amtOperld>
    <sessionId>NAPINDEX</ sessionId>
    <screenId>NAPSTART</ screenId>
    <screenCtlTblId>4983</ screenCtlTblId>
    <supervisor></ supervisor>
    <returnCode/ >
    <returnText/ >
    <xmlData/ >
</dss>
```

F3:PREV;  F4:SWAP;  F5:FIND;  F7/8:UP/DN;  F9:FORMAT;  F10/11:LT/RT;  F12:EXIT

*FIG. 9*

```
03 / 30 / 2007          eBUSINESS APPLICATION INTEGRATION                03 : 22 : 13
                            OUTPUT  MESSAGE DISPLAY

USER ID  -:  XXXXXXXX      MESSAGE ID  -:  EAIBREMSG      TIMEIN   -:  08 : 20 : 4134
DATE     -:  03 / 30 / 2007   TASK    -:  0002679        TIMEOUT  -:

- <object type="label">
                <label>Evaluating . . . </ label>
           </ object>
       </ object>
     - <object type="div">
         - <attrs>
              <attr name="id value=" theScreen" />
           </attrs>
         - <object type="mainContent" objId="X0001x"   mapTo="" visibility="tru
              <attrs></attrs>
           - <object type=" fieldset"  objId="X0002Account" mapTo="" visibili
              - <attrs>
                   <attr name=" class" value=" groupSection" />
                </attrs>
              - <object type=" legend"  objId=" X0003Account mapTo="" visibi
                 - <attrs>

F3 : PREV;   F4 : SWAP;   F5 : FIND;   F7 / 8 : UP / DN;   F9 : FORMAT;   F10 / 11 : LT / RT;   F12 : EXIT
```

NEW ACCOUNT PROPOSAL

ACCOUNT TYPE: 14-PAMA - INVESTMENT ADVISOR (INDIVIDUAL)
SHORT TITLE:

CUSTOMER INFORMATION PROGRAM

FOR PURPOSES OF PATRIOT ACT COMPLIANCE, YOUR CUSTOMER IS AN INDIVIDUAL

CHECK ALL THAT APPLY:
☐ BENEFICIARY ☐ GRANTOR ☐ DONEE
☐ SPRINKLE ☐ GUARDIAN ☐ SETTLOR
☐ CUSTODIAN ☐ TRUSTEE ☐ PNC INTERESTED PARTY
☐ SETTLOR

CHECK ALL THAT APPLY
☐ BENEFICIARY ☐ GRANTOR ☐ DONEE ☐ SPRINKLE
☐ GUARDIAN ☐ SETTLOR

CUSTOMER NAME
FIRST [        ] MI [  ] LAST [        ]
CUSTOMER CITIZENSHIP: ○ NON-RESIDENT ALIEN ○ RESIDENT ALIEN ○ US CITIZEN
DO YOU RESIDE IN US? ○ NO ○ YES
COUNTRY OF CITIZENSHIP: [        ]
WAS REQUIRED W-8 OBTAINED? ○ NO ○ YES
DID THE CUSTOMER APPEAR IN PERSON TO OPEN THE ACCOUNT? ○ NO ○ YES

FIG. 13

03 / 30 / 2007  AOR : CIQR;  TBL : 5215 - NAP CUSTOMER INFORMATION PAGE FOR I   03 : 29 : 31

[SELECT] [FIND] [MAX DOWN] [MAX UP] [TBL DEF] [COL DEF] [AUDIT TRAIL] [SORT] [HELP]

| KEY | OBJECT TYP | OBJECT ID | | T-TBL | RUL # | PCK | JFK |
|---|---|---|---|---|---|---|---|
| 010 | MAINCONTENT | | | | | 010 | |
| 020 | TEMPLATE | BANNER | | 5489 | | 010 | |
| 025 | TEMPLATE | CIP SECTION HEADING | | 5585 | | 010 | |
| 050 | LABEL | PATRIOT ACT LABEL | | | | 010 | |
| 060 | TEMPLATE | X | | | | 010 | |
| 070 | CHKBOXHTML2 | CAPACITIES | | | | 010 | |
| 100 | BR | | | | | 010 | |
| 105 | FIELDSET | | | | | 105 | |
| 130 | LEGEND | | | | | 105 | |
| 135 | INPUT | FIRST NAME | INPUT & LABEL | | | 105 | |
| 145 | INPUT | MIDDLE NAME | INPUT & LABEL | | | 105 | |
| 155 | INPUT | LAST NAME | INPUT & LABEL | | | 105 | |
| 160 | BR | | | | | 010 | |
| 295 | RADIOHTML | CUSTOMER CITIZENSHIP | | 5469 | | 010 | |
| 296 | DIV | SSNDIV | | | | 010 | |
| 300 | INPUT | SSN FIELD | | | | 296 | |

F1 : HELP;  F3 : RETURN;  F7 / F8 : UP / DOWN;  F10 / F11 : LEFT / RIGHT;  F9 : REFRESH;  F12 : EXIT

| 03 / 30 / 2007 AOR : CIQR; TBL : 4471 - EAI RADIO CONTROL PARM TABLE | | | | | | | | | | | 03 : 30 : 03 |
|---|---|---|---|---|---|---|---|---|---|---|---|
| SELECT | FIND | MAX DOWN | MAX UP | TBL DEF | | COL DEF | | AUDIT TRAIL | | SORT | HELP |
| KEY | DVT# | CDVTK | RI | DI | YI | BI | SC | CB | TP | TDP | DDP | DDL |
| 066 | 5795 | | Y | | | | | | | | | |
| 067 | 0025 | | Y | V | Y | Y | | Y | Y | 033 | 001 | 030 |
| 068 | 1001 | | | 3 | | | | | | | | |
| 070 | 5805 | | Y | 4 | Y | Y | Y | Y | Y | 043 | 001 | 040 |
| 071 | 0029 | | Y | | | | | | | | | |
| 163 | 0163 | | | | | | | | | | | |

F1 : HELP;  F3 : RETURN;  F7 / F8 : UP / DOWN;  F10 / F11 : LEFT / RIGHT;  F9 : REFRESH;  F12 : EXIT

07 / 23 / 2007  AOR : CIQR;  TBL : 5227 - EAI (B)USINESS (R)ULES (E)NGINE UPD          09 : 26 : 24

[SELECT] [FIND] [MAX DOWN] [MAX UP] [TBL DEF] [COL DEF] [AUDIT TRAIL] [SORT] [HELP]

| KEY | OBJECT TYP | OBJECT ID | T - TBL | RUL # | PCK | JFK |
|-----|------------|-----------|---------|-------|-----|-----|
| 265 | MPICKLIST  | FIELD2           |   |     | 260 |   |
| 270 | TD         | TDFOROPER2       |   |     | 200 |   |
| 275 | MPICKLIST  | OPER2            |   |     | 270 |   |
| 280 | TD         | TDFORVALUE2      |   |     | 200 |   |
| 285 | INPUT      | VALUE2           |   |     | 280 |   |
| 290 | TD         | TDFORVALUETYPE2  |   |     | 200 |   |
| 295 | MPICKLIST  | VALUETYPE2       |   |     | 290 |   |
| 300 | TD         | TDFORPOINTS      |   |     | 200 |   |
| 305 | INPUT      | POINTS           |   |     | 300 |   |
| 310 | BR         | BR               |   | AAB | 000 |   |
| 315 | LABEL      | TAGHELPMESSAGE   |   | AAB | 000 |   |
| 320 | BR         | BR               |   | AAB | 000 |   |
| 325 | FIELDSET   | TAGHELPFIELDSET  |   | AAB | 000 |   |
| 327 | LEGEND     | TAGHELPLEGEND    |   |     | 325 |   |
| 330 | PICKLIST   | TAGPICKLIST      |   |     | 325 |   |
| 335 | INPUT      | CUTANDPASTE      |   |     | 325 |   |

F1 : HELP;  F3 : RETURN;  F7 / F8 : UP / DOWN;  F10 / F11 : LEFT / RIGHT;  F9 : REFRESH;  F12 : EXIT

*FIG. 16*

EAI BUSINESS RULES ENGINE BUILDER — 1702

1706 — COLLECTION NAME: [BREGLBLR] RULE ID: [AAB] RULE DESCRIPTION: [IS SCHEMA NAME > SPACES] — 1704

TYPE: [H-SET TRUE/FALSE ONLY (NO ACTION TAKEN) ▾] PRIORITY: [1] TRIGGER OPER: [GT ▾] TRIGGER LVL: [1] SET VAR: [ ▾]

RULE DATA: [ ] RULE DATA TYPE: [ ▾]

| CND# | DEL | FIELD | OPER | TAG/VALUE | TYPE | AND/OR | FIELD | OPER | TAG/VALUE | TYPE | POINTS |
|------|-----|-------|------|-----------|------|--------|-------|------|-----------|------|--------|
| 001  | ☐   | SCHEMANAME ▾ | GT ▾ |  | LIT ▾ | ▾ | ▾ | ▾ |  | ▾ | 1 |
| 002  | ☐   | ▾ | ▾ |  | ▾ | ▾ | ▾ | ▾ |  | ▾ | 0 |
| 003  | ☐   | ▾ | ▾ |  | ▾ | ▾ | ▾ | ▾ |  | ▾ | 0 |
| 004  | ☐   | ▾ | ▾ |  | ▾ | ▾ | ▾ | ▾ |  | ▾ | 0 |

TO OBTAIN A TAG NAME, SELECT FROM THE DROP DOWN PROVIDED. THEN CUT AND PASTE TO THE APPROPRIATE LOCATION.

XML TAG NAME HELP [ ▾] — 1708

[UPDATE RULE] [BACK] [DELETE RULE]

```
https://webqa.eai.pncbank.co
m
/eai/EaiLogonServlet?
ReqId=INITSRVREQ
&reasonProduct=CSV
&reasonGroup=CU
&reasonDetail=14
&OperId=PP08920
&cifKey=SUPPO0C3J000
```

*FIG.21*

| 11/25/2002 | eBUSINESS APPLICATION INTEGRATION<br>INPUT MESSAGE DISPLAY | | 11:30:07 |
|---|---|---|---|
| USER ID : ~~03157<br>DATE : 10/02/2002 | MESSAGE ID : INITSRVREQ<br>TASK : 0003157 | TIMEIN : : :<br>TIMEOUT : : : | 15:08:4726<br>15:08:4910 |

```
- <?xml version="1.0" encoding="UTF-8" ?>
 - <message>
     <reasonProduct>CSV</reasonProduct>
     <ReqId>INITSRVREQ</ReqId>
     <cifKey>SUPPoOc3J000</cifKey>
     <reasonDetail>14</reasonDetail>
     <OperId>PP08920</OperId>
     <reasonGroup>CU</reasonGroup>
   </message>
```

| 4B | :00.2 | | 04/13 |
|---|---|---|---|
| F3: PREV SCREEN ; F4: SWAP ; F5: FORMAT ; F7/8: UP/DWN; F10/11: LFT/RT ; F12: EXIT |

FIG. 22

11/26/2002  eBUSINESS APPLICATION INTEGRATION  08:40:17
                OUTPUT MESSAGE DISPLAY

USER ID : ~~03157        MESSAGE ID : INTSRVREQ    TIMEIN  : 15:08:4726
DATE    : 10/02/2002     TASK       : 0003157      TIMEOUT : 15:08:4910

```
<custAddr1>1121 Chartiers St</custAddr1>
<custAddr2>Bridgeville, PA 15017</custAddr2>
<reasonGroupDesc>Client Maintenance</reasonGroupDesc>
<reasonDetailDesc>Address change only</reasonDetailDesc>
<contactDate>0000000000</contactDate>
<operName>RUSSELL, MARK</operName>
<operMailCode>P6-PUSX-36-1</operMailCode>
<operFaxNumber>(888) 405-7040</operFaxNumber>
<operMailCode2>P6-PUSX-36-1</operMailCode2>
<cifAddr1>1121 CHARTIERS ST</cifAddr1>
<custCity>BRIDGEVILLE</custCity>
<custState>PA</custState>
<custZip>15017</custZip>
<custZipsuffix>0000</custZipsuffix>
<oldPhone>(412) 257-4152</oldPhone>
<oldBphone>(412) 762-2655</oldBphone>
```

F3: PREV SCREEN; F4: SWAP; F5: FORMAT; F7/8: UP/DWN; F10/11: LFT/RT; F12: EXIT

*FIG. 23*

```
<!--
  OLD / NEW ADDRESS
-->
<TABLE CLASS="outer-tbl" CELLSPACING="0">
<TR>
<TD WIDTH="300" CLASS="inner-tbl">
<TABLE CLASS="no-border" CELLSPACING="3">
<TR>
<TD>Addr:</TD>
<TD COLSPAN="5">
<TABLE CLASS="field-tbl" CELLSPAC1NG="0">
<TR>
<TD STYLE="width: 225;">
<xsl:value-of select="CCTCNTRL/replyCustAcctInfo/cifAddr1" />
</TD>
```

*FIG.24*

```
<!-- OLD / NEW ADDRESS -->
<TABLE CLASS="outer-tbl" CELLSPACING="0">
<TR>
<TD WIDTH="300" CLASS="inner-tbl">
<TABLE CLASS="no-border" CELLSPACING="3">
 <TR>
<TD>Addr:</TD>
<TD COLSPAN="5">
<TABLE CLASS="field-tbl" CELLSPACING="0">
<TR>
<TD STYLE="width: 225;">
      1121 CHARTIERS ST
</TD>
```

*FIG.25*

```
var etb1001Key = new
Array("","AK","AL","AR","AZ","CA","CO","CT","DC",
"DE","FC","FL","GA","HI","IA","ID","IL","IN","KS","KY","LA","MA",
"MD","ME","MI","MN","MO","MS","MT","NC","ND","NE","NH","NJ"
,"NM","NV","NY","OH","OK","OR","PA","PR","RI","SC","SD","TN",
"TX","UT","VA","VI","VT","WA","WI","WV","WY");

var etb1001Dsc = new
Array("","ALASKA","ALABAMA","ARKANSAS","ARIZONA",
"CALIFORNIA","COLORADO","CONNECTICUT","DISTRICT OF
COLUMBIA",
"DELAWARE","FOREIGN
COUNTRY","FLORIDA","GEORGIA","HAWAII","IOWA",
"IDAHO","ILLINOIS","INDIANA","KANSAS","KENTUCKY","LOUI
SIANA",
"MASSACHUSETTS","MARYLAND","MAINE","MICHIGAN","MIN
NESOTA","MISSOURI",
"MISSISSIPPI","MONTANA","NORTH CAROLINA","NORTH
DAKOTA","NEBRASKA",
"NEW HAMPSHIRE","NEW JERSEY","NEW
MEXICO","NEVADA","NEW YORK","OHIO",
"OKLAHOMA","OREGON","PENNSYLVANIA","PUERTO
RICO","RHODE ISLAND",
"SOUTH CAROLINA","SOUTH
DAKOTA","TENNESSEE","TEXAS","UTAH","VIRGINIA",
"VIRGIN
ISLANDS","VERMONT","WASHINGTON","WISCONSIN","WEST
VIRGINIA",
"WYOMING");

var etb1001Len = etb1001Key.length;
```

| Menu | Utilities | Compilers | Help |

```
BROWSE   PP11679.C1#1TMPL.EE09B.LIST                  Line 00000024 Col 001 080
Command ===>                                          Scroll ===> CSR
+00         01  CCTPCSRQ-AREA.
+00             05  PCSR-INPUT-AREA.
+00                 10  PCSR-OPER-ID           PIC X(08).
+00                 10  PCSR-CIF-KEY           PIC X(12).
+00                 10  PCSR-BANK-ID           PIC X(03).
+00                 10  PCSR-BRANCH-ID         PIC X(05).
+00                 10  PCSR-ACCT-TYPE         PIC X(03).
+00                 10  PCSR-ACCT-NUMBER       PIC X(20).
+00                 10  FILLER                 PIC X(10).
+00             05  PCSR-OUTPUT-AREA.
+00                 10  PCSR-ERROR-TYPE        PIC X(01).
+00                 10  PCSR-MAJOR-CODE        PIC 9(04).
+00                 10  PCSR-MINOR-CODE        PIC 9(04).
+00                 10  PCSR-USER-MESSAGE      PIC X(80).
+00
+00                 10  PCSR-CARD-NUM-ITEMS    PIC 9(04).
+00
+00                 10  PCSR-CARD-TABLE.
```

```
Menu  Utilities  Compilers  Help

BROWSE    PP11679.C1#1TMPL.EE09B.LIST              Line 00000044 Col 001 080
Command ===>  ___                                          Scroll ===> CSR
  +01         15  PCSR-CARD-ENTRY                 OCCURS 50 TIMES.
  +00             20  PCSR-CARD-NO                PIC X(18).
  +00             20  PCSR-CARD-STATUS            PIC X(08).
  +00             20  PCSR-CARD-OPEN-DATE         PIC X(10).
  +00             20  PCSR-CARD-NAME              PIC X(26).
  +00             20  PCSR-CARD-PRI-ACCT          PIC X(18).
  +01             20  PCSR-HOT-CODE-IND           PIC X(01).
%+02              20  PCSR-WARM-CODE-IND          PIC X(01).
%+02              20  PCSR-CARD-BANK-ID           PIC X(03).
%+02              20  FILLER                      PIC X(15).
******************************Bottom of Data********************************
```

```
 File   Edit   Edit_Settings   Menu   Utilities   Compilers   Test   Help

EDIT        PP11679.RJH.CNTL (GENVC500) - 01.99                Columns 00001 00072
Command ===> SUB                                                  Scroll ===> CSR
000021 //J006          EXEC RESPPTST, TYPRUN=P CLEAN UP QA DATASETS
000022 //*
000023 //J010   EXEC EAIPC500,
000024 //         DSI01='PRD.QAST',                    ENDEVOR COPYLIB FOR COPYBOOK
000025 //         HLQ01='EAIPCVO',                     QA INPUT VSAM
000026 //         HLQ02='EAIPCVB',                     QA OUTPUT DSNS
000027 //         HLQ99='PNCPPTB',                     QA PARMLIB
000028 //         PRM01='CCTPCSRQ',                    INPUT COPYBOOK NAME
000029 //         UNT01='BATDA'
000030 //*
000031 //SCRNMAP   DD   DSN=ENDPCPB.N.PRD.QAST.COPYLIB3(&PRM01.),
000032 //              DISP=SHR
000033 //*CRNMAP   DD   DSN=CIFPCVO.N.CIFFRBU.COPYBOOK(&PRM01.),
000034 //              DISP=SHR
000035 //*CRNMAP   DD   DSN=COSPCTB.N.LEVJ.COPYLIB(&PRM01.),
000036 //              DISP=SHR
000037 //*CRNMAP   DD   DSN=PP11679.RJH.COPYLIB(&PRM01.),
000038 //              DISP=SHR
000039 //*CRNMAP   DD   DSN=PP11679.RJH.SOURCE (&PRM01.),
000040 //*             DISP=SHR
```

FIG. 31

| Date: | | XML PROPERTIES BUILDER | | | | | Time: 09:32:11 | | |
|---|---|---|---|---|---|---|---|---|---|
| Chapter Name: RCNPCSRP | | SCREEN 1 | | | | | Max Size: 13,131 | | |
| Sequence Nbr: 1 | | | | | | | Region: TP30 | | |
| | | <----------- | | | C O B O L | | -----------> | | |
| Fld | Field Name | Off | Field | Occurs | | Fld | COB | Grp | Rule |
| Seq | | Set | Len | Num Depth | | Typ | Lvl | Ind | Ind |
| 0001 | CCTPCSRQ-AREA | 0000000 | 0005154 | 00000 000 | | | 01 | | N |
| 0002 | PCSR-INPUT-AREA | 0000000 | 0000061 | 00000 000 | | | 05 | G | N |
| 0003 | PCSR-OPER-ID | 0000000 | 0000008 | 00000 000 | | A | 10 | | N |
| 0004 | PCSR-CIF-KEY | 0000008 | 0000012 | 00000 000 | | A | 10 | G | N |
| 0005 | PCSR-BANK-ID | 0000020 | 0000003 | 00000 000 | | A | 10 | | N |
| 0006 | PCSR-BRANCH-ID | 0000023 | 0000005 | 00000 000 | | A | 10 | | N |
| 0007 | PCSR-ACCT-TYPE | 0000028 | 0000003 | 00000 000 | | A | 10 | | N |
| 0008 | PCSR-ACCT-NUMBER | 0000031 | 0000020 | 00000 000 | | A | 10 | | N |
| 0009 | FILLER01 | 0000051 | 0000010 | 00000 000 | | | 10 | | N |
| 0010 | PCSR-OUTPUT-AREA | 0000061 | 0005093 | 00000 000 | | | 05 | G | N |
| 0011 | PCSR-ERROR-TYPE | 0000061 | 0000001 | 00000 000 | | A | 10 | | N |
| 0012 | PCSR-MAJOR-CODE | 0000062 | 0000004 | 00000 000 | | N | 10 | | N |
| 0013 | PCSR-MINOR-CODE | 0000066 | 0000004 | 00000 000 | | N | 10 | | N |
| 0014 | PCSR-USER-MESSAGE | 0000070 | 0000080 | 00000 000 | | A | 10 | | N |
| CLEAR:Cancel | | ENTER:Save | F3:Save/Return | | | F7/F8:Up/Down | | | F10/F11:Left/Right |

FIG. 32A

| Date: | | XML PROPERTIES BUILDER | | Time: 09:32:25 |
|---|---|---|---|---|
| Chapter Name: RCNPCSRP | | SCREEN 2 | | Max Size: 13,131 |
| Sequence Nbr: 1 | | | | Region: TP30 |

| Fld Seq | Field Name | Tag Typ | XML Tag Name | Jst Ind | Pad Chr |
|---|---|---|---|---|---|
| 0001 | CCTPCSRQ-AREA | | PlasticCardReply | L | -- |
| 0002 | PCSR-INPUT-AREA | | | L | -- |
| 0003 | PCSR-OPER-ID | | OperId | L | -- |
| 0004 | PCSR-CIF-KEY | | CifKey | L | -- |
| 0005 | PCSR-BANK-ID | | BankId | L | -- |
| 0006 | PCSR-BRANCH-ID | | BranchId | L | -- |
| 0007 | PCSR-ACCT-TYPE | | AcctType | L | -- |
| 0008 | PCSR-ACCT-NUMBER | | AcctNbr | R | 0 |
| 0009 | FILLER01 | | | L | -- |
| 0010 | PCSR-OUTPUT-AREA | | | L | -- |
| 0011 | PCSR-ERROR-TYPE | | ErrorType | L | -- |
| 0012 | PCSR-MAJOR-CODE | | MajorCode | R | 0 |
| 0013 | PCSR-MINOR-CODE | | MinorCode | R | 0 |
| 0014 | PCSR-USER-MESSAGE | | UserMessage | L | -- |

CLEAR:Cancel    ENTER:Save    F3:Save/Return    F7/F8:Up/Down    F10/F11:Left/Right

FIG. 32B

Date: _____
Chapter Name: RCNPCSRP                XML PROPERTIES BUILDER                Time: 09:32:38
Sequence Nbr:    15                         SCREEN 1                    Max Size: 13,131
                                                                        Region: TP30
                          <------------------ C O B O L ------------------>
Fld  Field         Off      Field     Occurs              Fld  COB   Grp  Rule
Seq  Name          Set      Len       Num    Depth        Type Lvl   Ind  Ind 0015 PCSR-CARD-NUM-ITEMS   0000150  0000004  00000  000    N    10         N
0016 PCSR-CARD-TABLE       0000154  0005000  00000  000         10    G    N
0017 PCSR-CARD-ENTRY       0000154  0000100  00050  001         15    G    N
0018 PCSR-CARD-NO          0000154  0000018  00050  001    A    20         N
0019 PCSR-CARD-STATUS      0000172  0000008  00050  001    A    20         N
0020 PCSR-CARD-OPEN-DATE   0000180  0000010  00050  001    A    20         N
0021 PCSR-CARD-NAME        0000190  0000026  00050  001    A    20         N
0022 PCSR-CARD-PRI-ACCT    0000216  0000018  00050  001    A    20         N
0023 PCSR-HOT-CODE-IND     0000234  0000001  00050  001    A    20         N
0024 PCSR-WARM-CODE-IND    0000235  0000001  00050  001    A    20         N
0025 PCSR-CARD-BANK-ID     0000236  0000003  00050  001    A    20         N
0026 FILLER02              0000239  0000015  00050  001    A    20         N THIS IS THE LAST PAGE
CLEAR:Cancel    ENTER:Save    F3:Save/Return       F7/F8:Up/Down       F10/F11:Left/Right

FIG. 33A

```
 File   Edit   Edit_Settings   Menu   Utilities   Compilers   Test   Help

EDIT       PP18931.EAI.CNTL(JAVAGRCN) – 01.37                              Columns 00001 00072
Command ===> sub ___                                                       Scroll ===> CSR
000064 //***
000065 //***********************************************************
000066 //** EXEC EAIBOBJ                                         **
000070 //***********************************************************
000160 //*
000180 //*
000181 //J005            EXEC PGM=EAIBOBJ,
000182 //                PARM='RCNPCSRQ, RCNPCSRP, plastic     , card
000183 //                REGION=4096K
000187 //*
000188 //OUTFILE    DD   DSN=PP18931.PCS.PROC.JAVA,
000189 //                DISP=(NEW,CATLG,DELETE),
000190 //                SPACE=(TRK,(15, 15),RLSE),
000191 //                DCB=(RECFM=FB,LRECL=120,BLKSIZE=0)
000195 //OUTFIL2    DD   DSN=PP18931.PCS.REPLY.JAVA,
000196 //                DISP=(NEW,CATLG,DELETE),
000197 //                SPACE=(TRK,(15, 15),RLSE),
000198 //                DCB=(RECFM=FB,LRECL=120,BLKSIZE=0)
000199 //OUTFIL3    DD   DSN=PP18931.PCS.XML.JAVA,
000200 //                DISP=(NEW,CATLG,DELETE),
```

FIG. 34

```
Menu   Utilities   Compilers   Help

BROWSE    PP18931.PCS.PROC.JAVA              Line 00000000 Col 001 080
Command ===>                                            Scroll ===> CSR
********************************Top of Data**********************************
/**
 * @author PPEAI
 *
 * To change the template for this generated type comment go to
 * Window> Preferences>Java>Code Generation>Code and Comments
 *
 * Note:  This code has been generated !!!!!
 *
 * In total, the purpose of this document and its sibling documents is to be a fa
 * that can be used to build a WEB SERVICES front end to a PNC EAI(z/OS) register
 *
 * The document herein (the processor) is the main control:  an outline of execut
 *
 * 1) Make XML from the request object.
 * 2) Invoke EAI RequestProcessor (a JMS wrapper).  i.e. Request the Service
 * 3) When the request is returned parse the reply XML into the reply object
 */
package com.pnc.rcb.eai.ejb.plastic.card;
```

FIG. 35A

```
Menu   Utilities   Compilers   Help

BROWSE    PP18931.PCS.PROC.JAVA                    Line 00000020 Col 001 080
Command ===>                                                  Scroll ===> CSR import java.io.Serializable;
import java.io.StringReader;
import java.text.DecimalFormat;
import java.text.ParseException;
import java.text.SimpleDateFormat;
import java.util.Date;
import java.util.Locale;
import java.util.ResourceBundle;

import com.pnc.tps.mis.atg.resourcebundle.DynamicsResourceBundle;
import org.apache.log4j.*;
import org.apache.regexp.*;
import org.jdom.Attribute;
import org.jdom.Document;
import org.jdom.Element;
import org.jdom.input.JDOMParseException;
import org.jdom.input.SAXBuilder;

import com.pnc.rcb.eai.processor.EaiRequestProcessor;
```

FIG. 35B

```
 Menu   Utilities   Compilers   Help

BROWSE    PP18931.PCS.PROC.JAVA                          Line 00000040 Col 001 080
 Command ===> _                                           Scroll ===> CSR import com.pnc.rcb.eai.processor.EaiRequestProcessorPool;
 import com.pnc.rcb.eai.reply.Plastic.CardReply;
 import com.pnc.rcb.eai.request.PlasticCardRequest;
 import com.pnc.rcb.eai.xml.PlasticCardBody;

public class PlasticCardProcessor {
     private javax.ejb.SessionContext mySessionCtx = null;
     private static Logger logger = Logger.getLogger (PlasticCardProcessor.clas
     protected final static transient long DEFAULT_PROCESSOR_WAIT = 300001;
     protected static final transient EaiRequestProcessorPool  pool = EaiReques
     //public static final transient EaiRequestProcessorPool  pool = EaiRequest
     protected static ResourceBundle props = ResourceBundle.getBundle ("Plastic
     //protected static final transient AcctDetailXml adxml = AcctDetailXml..;

Public  PlasticCardReply processPlasticCardRequest (PlasticCardRequest pcre

String xml = createXML (pcreq);
         String procWait = props.getString("JmsTimeout");
         EaiRequestProcessor eaireq = pool.getProcessor(
             (procWait==null?DEFAULT_PROCESSOR_WAIT:Long.parseLong(procWait
```

FIG. 35C

```
Menu   Utilities   Compilers   Help

BROWSE    PP18931.PCS.PROC.JAVA                              Line 00000060 Col 001 080
Command ===>                                                      Scroll ===> CSR
        try {
            String xmlResult = eaireq.processRequest (xml);
            Document doc = parseXML (xmlResult);
            createReplyFromXml (pcrep, doc);
        }
        catch (Exception ex) {
            logger.error ("PlasticCardRequest exception occurred" + ex);
            ex.printStackTrace ();
        }
        finally {
            pool.freeProcessor (eaireq);
            eaireq = null;
        }
        return pcrep;
    }
    public String createXML (PlasticCardRequest pcreq)  {

StringBuffer results = new StringBuffer ();
        results.append("<?xml version=\"1.0\" encoding=\"UTF-8\" ?
        PlasticCardBody  adbxml = new PlasticCardBody(pcreq);
```

FIG. 35D

```
Menu   Utilities   Compilers   Help
─────────────────────────────────────────────────────────────────────
BROWSE    PP18931.PCS.PROC.JAVA                Line 00000080 Col 001 080
Command ===>                                              Scroll ===> CSR
          adbxml.formatRequest();

//StringBuffer xmlBody = new StringBuffer ();
    //xmlBody.append(adbxml.toString() );
    results.append(adbxml.toXml() );

return results.toString ();
}
protected Document parseXML (String xml)
        throws Exception {
    Document result = null;
    try
    {
        SAXBuilder builder = new SAXBuilder ();
        StringReader reader = new StringReader (xml);
        result = builder.build(reader);
    }
    catch(JDOMParseException pe)
    {
        logger.warn(pe);
```

FIG. 35E

```
Menu   Utilities   Compilers   Help

BROWSE    PP18931.PCS.PROC.JAVA                          Line 00000100 Col 001 080
Command ===>                                                   Scroll ===> CSR // We encountered a parse exception – most likely, this was
         // Try to replace all standalone ampersands with "&"
         org.apache.regexp.RE re = new org.apache.regexp.RE ("&\\s+");
         xml = re.subst (xml, "& ", org.apache.regexp.RE.REPLACE_AL // Try again to parse the XML (if it fails again, oh well…)
         SAXBuilder builder = new SAXBuilder ();
         result = builder.build(new StringReader(xml));
      }
      catch(Exception e)
      {
         logger.error(e);
         throw new Exception(e.toString() );
      }
      return result;
   }
   public PlasticCardReply createReplyFromXml(PlasticCardReply pcrep, Docume
      SimpleDateFormat df = new SimpleDateFormat ("MM/dd/yyyy", Locale.US
      Date date = new Date ();
      DecimalFormat decimalFormat = new DecimalFormat ("$###, ###, ###, ###.
```

FIG. 35F

```
Menu   Utilities   Compilers   Help

BROWSE    PP18931.PCS.PROC.JAVA                    Line 00000120 Col 001 080
Command ===>                                                  Scroll ===> CSR DecimalFormat rateFormat = new DecimalFormat ("##.##");
        double money;
        double rate;

try {

Element xrcnpcsrpRoot = doc.getRootElement ();
        Element temp = null;

Element xoperId = xrcnpcsrpRoot.getChild("OperId");
        String operId = xoperId.getText ();
        if ((operId != null)
        && (operId.length () > 0 )) {
            pcrep.setOperId(operId);
        }
        else {
            if (logger.isDebugEnabled () )
                logger.debug ("operId is null");
        }
```

FIG. 35G

Menu   Utilities   Compilers   Help

```
BROWSE    PP18931.PCS.PROC.JAVA                   Line 00000140 Col 001 080
Command ===>                                      Scroll ===> CSR Element xcifKey = xrcnpcsrpRoot.getChild("CifKey");
          String cifKey = xcifKey.getText ();
          if ((cifKey != null)
          && (cifKey.length () > 0 ) ) {
               pcrep.setCifKey(cifKey);
          }
          else {
               if (logger.isDebugEnabled() )
                    logger.debug("cifKey is null");
          }

Element xbankId = xrcnpcsrpRoot.getChild("BankId");
          String bankId = xbankId.getText();
          if ((bankId != null)
          && (bankId.length () > 0 ) ) {
               pcrep.setBankId(bankId);
          }
          else {
               if (logger.isDebugEnabled() )
                    logger.debug("bankId is null");
          }
```

FIG. 35H

```
Menu   Utilities   Compilers   Help

BROWSE    PP18931.PCS.PROC.JAVA                    Line 00000358 Col 001 080
Command ===>                                                  Scroll ===> CSR }
           else {
              if (logger.isDebugEnabled() )
                 logger.debug("warmCode is null");
           } current = root.getChild("CardBankId");
           String cardBankId = current.getText ();
           if ((cardBankId != null)
              && cardBankId.length() > 0 )) {
              childElem.setCardBankId(cardBankId);
           }
           else {
              if (logger.isDebugEnabled() )
                 logger.debug("cardBankId is null");
           } return childElm;

```
Menu   Utilities   Compilers   Help

BROWSE     PP18931.PCS.REPLY.JAVA                              Line 00000000 Col 001 080
Command ===>                                                               Scroll ===> CSR
****************************Top of Data***********************************************
/**
 * @author PPEAI
 *
 * To change the template for this generated type comment go to
 * Window>Preferences>Java>Code Generation>Code and Comments
 *
 * Note:  This code has been generated !!!!!
 *
 * In total the purpose of this document and its sibling documents is to be a fa
 * that can be used to build a WEB SERVICES front end to a PNC EAI(z/OS) register
 *
 * This is the Reply Class.  Please build getters and setters.
 */
package com.pnc.rcb.eai.reply.plastic;

import com.pnc.rcb.eai.ejb.plastic.card.*;
import java.util.Date;
import java.util.Vector;
```

FIG. 35J

Menu  Utilities  Compilers  Help

```
BROWSE     PP18931.PCS.REPLY.JAVA                          Line 00000020 Col 001 080
Command ===>                                                       Scroll ===> CSR
import java.io.*;
import org.apache.log4j.Logger;

public class PlasticCardReply implements Serializable {
    private static Logger logger = Logger.getLogger (PlasticCardReply.class);
    private String operId;
    private String cifKey;
    private String bankId;
    private String branchId;
    private String acctType;
    private String acctNbr;
    private String errorType;
    private Integer majorCode;
    private Integer minorCode;
    private String userMessage;
    private Integer numItems;
    private Vector pCSTable;
}
****************************************** Bottom of Data ******************************************
```

FIG. 35K

```
Menu  Utilities  Compilers  Help

BROWSE    PP18931.PCS.XML.JAVA                    Line 00000000 Col 001 080
Command ===>                                               Scroll ===> CSR
********************************* Top of Data **********************************
/**
 * @author PPEAI
 *
 * To change the template for this generated type comment go to
 * Window>Preferences>Java>Code Generation> Code and Comments
 *
 * Note:  This code has been generated !!!!!
 *
 * In total the purpose of this document and its sibling documents is to be a fa
 * that can be used to build a WEB SERVICES front end to a PNC EAI(z/OS) register
 *
 * Super "request" class (all requests have a ReqId whose "build XML element" is
 */
package com.pnc.rcb.eai.xml;

import java.text.*;
import com.pnc.rcb.eai.ejb.plastic.card.*;
import com.pnc.rcb.eai.request.PlasticCardRequest;
```

FIG. 35L

```
Menu   Utilities   Compilers   Help

BROWSE    PP18931.PCS.XML.JAVA                           Line 00000020 Col 001 080
Command ===>                                                      Scroll ===> CSR
public abstract class PlasticCardXml extends AbstractXmlRequest implements java.

public PlasticCardRequest pcr;

public PlasticCardXml (PlasticCardRequest pcr) {
        super ();
        this.pcr = pcr;
    } public void formatRequest () {
        openElement ("Request");
        addElement("ReqId", pcr.getReqId() );
        addBody();
        closeElement ("Request");
    } public abstract void addBody ();
    /**
     * @return
     */
```

FIG. 35M

```
Menu   Utilities   Compilers   Help

BROWSE    PP18931.PCS.XML.JAVA                         Line 00000040 Col 001 080
Command ===>                                                       Scroll ===> CSR
           public PlasticCardRequest getPcr() {
              return pcr;
           }

/**
            * @param request
            */
           public void setPcr (PlasticCardRequest pcr) {
              this.pcr = pcr;
           }
        }
****************************** Bottom of Data ******************************
```

FIG. 35N

```
 Menu    Utilities    Compilers    Help

BROWSE     PP18931.PCS.BODY.JAVA                           Line 00000000 Col 001 080
 Command ===>                                                          Scroll ===> CSR
 ********************************* Top of Data **********************************
 /**
  *
  * @author PPEAI
  *
  * To change the template for this generated type comment go to
  * Window>Preferences>Java>Code Generation>Code and Comments
  *
  * Note:  This code has been generated !!!!!
  *
  * In total the purpose of this document and its sibling documents is to be a fa
  * that can be used to build a WEB SERVICES front end to a PNC EAI (z/OS) register
  *
  * Sub "request" class that builds required elements as generated from the EAI r
  */
 package com.pnc.rcb.eai.xml;

import com.pnc.rcb.eai.request.PlasticCardRequest;

public class PlasticCardBody extends PlasticCardXml implements java.io.Serializa
```

FIG. 35O

```
Menu  Utilities  Compilers  Help

BROWSE    PP18931.PCS.BODY.JAVA                      Line 00000020 Col 001 080
Command ===>                                              Scroll ===> CSR public PlasticCardBody (PlasticCardRequest pcr) {
    super (pcr);
}
public void addBody () {
    openElement ("Card");
        addElement ("operId", this.getPcr().getOperId() );
        addElement ("cifKey", this.getPcr().getCifKey() );
        addElement ("bankId", this.getPcr().getBankId() );
        addElement ("branchId", this.getPcr().getBranchId() );
        addElement ("acctType", this.getPcr().getAcctType() );
        addElement ("acctNbr", this.getPcr().getAcctNbr() );
    closeElement ("Card");
}
}
******************************** Bottom of Data ************************************
```

FIG. 35P

```
 Menu   Utilities   Compilers   Help

BROWSE   PP18931.PCS.REQUEST.JAVA                    Line 00000000 Col 001 080
 Command ===>                                                  Scroll ===> CSR
 ******************************** Top of Data **********************************
 /**
  * @author PPEAI
  *
  * To change the template for this generated type comment go to
  * Window>Preferences>Java>Code Generation> Code and Comments
  *
  * Note:  This code has been generated !!!!!
  *
  * In total the purpose of this document and its sibling documents is to be a fa
  * that can be used to build a WEB SERVICES front end to a PNC EAI (z/OS) register
  *
  * "request" class with all the required attributes as generated from the EAI re
  */
 package com.pnc.rcb.eai.request.plastic;

import com.pnc.rcb.eai.ejb.plasticcard.*;
 import java.util.Date;
 import java.util.Vector;
```

FIG. 35Q

```
Menu   Utilities   Compilers   Help

BROWSE    PP18931.PCS.REQUEST.JAVA               Line 00000020 Col 001 080
Command ===>                                              Scroll ===> CSR
import java.io.*;
import org.apache.log4j.Logger;

public class PlasticCardRequest implements Serializable {
    private static Logger logger = Logger.getLogger(PlasticCardRequest.class)
    private String reqId;
    private String operId;
    private String cifKey;
    private String bankId;
    private String branchId;
    private String acctType;
    private String acctNbr;
}
****************************** Bottom of Data ********************************************************
```

FIG. 35R

```
Menu   Utilities   Compilers   Help

BROWSE    PP18931.PCS.JAVA                                    Line 00000000 Col 001 080
Command ===>                                                       Scroll ===> CSR
********************************* Top of Data **********************************
/**
 * @author PPEAI
 *
 * To change the template for this generated type comment go to
 * Window>Preferences>Java>Code Generation>Code and Comments
 *
 * Note:  This code has been generated !!!!!
 *
 * In total the purpose of this document and its sibling documents is to be a fa
 * that can be used to build a WEB SERVICES front end to a PNC EAI (z/OS) register
 *
 * Remote interface for Enterprise Bean:PlasticCard
 */
package com.pnc.rcb.eai.ejb.plastic.card;

import com.pnc.rcb.eai.reply.*;
import com.pnc.rcb.eai.request.*;
```

FIG. 35S

```
Menu  Utilities  Compilers  Help

BROWSE    PP18931.PCS.JAVA                              Line 00000020 Col 001 080
Command ===>                                                  Scroll ===> CSR
public interface PlasticCard extends javax.ejb.EJBObject { public PlasticCardReply plasticCardRequest (PlasticCardRequest pcreq)
        throws javax.ejb.EJBException, java.rmi.RemoteException;
}
****************************** Bottom of Data *********************************
```

FIG. 35T

```
Menu  Utilities  Compilers  Help

BROWSE    PP18931.PCS.BEAN.JAVA                          Line 00000000 Col 001 080
Command ===>                                                    Scroll ===> CSR
********************************* Top of Data **********************************
/**
 * @author PPEAI
 *
 * To change the template for this generated type comment go to
 * Window>Preferences>Java>Code Generation>Code and Comments
 *
 * Note:  This code has been generated !!!!!
 *
 * In total the purpose of this document and its sibling documents is to be a fa
 * that can be used to build a WEB SERVICES front end to a PNC EAI (z/OS) register
 *
 * Bean implementation class for Enterprise Bean:PlasticCard
 */
package com.pnc.rcb.eai.ejb.plastic.card;

import org.apache.log4j.Logger;

import com.pnc.rcb.eai.reply.PlasticCardReply;
```

FIG. 35U

```
Menu  Utilities  Compilers  Help

BROWSE    PP18931.PCS.BEAN.JAVA                    Line 00000020 Col 001 080
Command ===>                                               Scroll ====> CSR
import com.pnc.rcb.eai.request.PlasticCardRequest;

public class PlasticCardBean implements javax.ejb.SessionBean {
    private javax.ejb.SessionContext mySessionCtx;
    private static Logger logger = Logger.getLogger (PlasticCardBean.class);
    public PlasticCardReply plasticCardRequest (PlasticCardRequest pcreq)
        throws javax.ejb.EJBException {
    PlasticCardReply pcrep = new PlasticCardReply ();
    try {
        PlasticCardProcessor pcproc = new PlasticCardProcessor ();
        if (logger.isDebugEnabled () )
            logger.debug ("invoking PlasticCardRequest");
        pcrep = pcproc.processPlasticCardRequest (pcreq, pcrep);
    }
    catch (Exception e) {
        logger.error(e);
        e.printStackTrace();
    }
    return adrep;
```

FIG. 35V

```
Menu  Utilities  Compilers  Help

BROWSE   PP18931.PCS.BEAN.JAVA                      Line 00000040 Col 001 080
Command ===>                                            Scroll ===> CSR
{
/**
 * getSessionContext
 */
public javax.ejb.SessionContext getSessionContext () {
    return mySessionCtx;
}
/**
 * SetSessionContext
 */
public void setSessionContext (javax.ejb.SessionContext ctx) {
    mySessionCtx = ctx;
}
/**
 * ejbCreate
 */
public void ejbCreate() throws javax.ejb.CreateException {
}
/**
 * ejbActivate
```

FIG. 35W

```
Menu   Utilities   Compilers   Help

BROWSE    PP18931.PCS.BEAN.JAVA                    Line 00000060 Col 001 080
Command ===>                                       Scroll ===> CSR
         */
            public void ejbActivate() {

}
         /**
          * ejbPassivate
          */
            public void ejbPassivate () {

}
         /**
          * ejbRemove
          */
            public void ejbRemove () {

}
}
****************************** Bottom of Data ******************************
```

FIG. 35X

```
Menu   Utilities   Compilers   Help

BROWSE    PP18931.PCS.HOME.JAVA                    Line 00000000 Col 001 080
Command ===>                                                Scroll ===> CSR
********************************* Top of Data **********************************
/**
 * @author PPEAI
 *
 * To change the template for this generated type comment go to
 * Window>Preferences>Java>Code Generation> Code and Comments
 *
 * Note:  This code has been generated !!!!!
 *
 * In total the purpose of this document and its sibling documents is to be a fa
 * that can be used to build a WEB SERVICES front end to a PNC EAI (z/OS) register
 *
 * Home interface for Enterprise Bean:PlasticCard
 */
package com.pnc.rcb.eai.ejb.plastic.card;

public interface PlasticCardHome extends javax.ejb.EJBHome   {
        public com.pnc.rcb.eai.ejb.plastic.card.PlasticCard create()
```

FIG. 35Y

```
Menu  Utilities  Compilers  Help

BROWSE    PP18931.PCS.HOME.JAVA                    Line 00000020 Col 001 080
Command ===> _                                           Scroll ===> CSR
     throws javax.ejb.CreateException, java.rmi.RemoteException;
}
****************************** Bottom of Data ******************************
```

FIG. 35Z

```
File   Edit   Edit_Settings   Menu   Utilities   Compilers   Test   Help

EDIT       PP18931.EAI.CNTL (JAVAGRCN) - 01.37              Columns 00001 00072
Command ===> sub                                            Scroll ===> CSR
004200 //S005      EXEC PGM=FTP,
004300 //               PARM='10.19.nnn.nnn'
004400 //INPUT     DD   *
004500     xsl xsl
004600     PUT  'PP18931.PCS.PROC.JAVA' PlasticCardProcessor.java
004700     PUT  'PP18931.PCS.XML.JAVA' PlasticCardXml.java
004800     PUT  'PP18931.PCS.REPLY.JAVA' PlasticCardReply.java
004900     PUT  'PP18931.PCS.REQUEST.JAVA' PlasticCardRequest.java
005000     PUT  'PP18931.PCS.BODY.JAVA' PlasticCardBody.java
005100     PUT  'PP18931.PCS.HOME.JAVA' PlasticCardHome.java
005200     PUT  'PP18931.PCS.BEAN.JAVA' PlasticCardBean.java
005300     PUT  'PP18931.PCS.JAVA' PlasticCard.java
005400     PUT  'PP18931.PCSTABLE.JAVA' PlasticCardTable.java
005500     QUIT
005600 /*
005700 //OUTPUT   DD  SYSOUT=*
005800 //SYSPRINT DD  SYSOUT=*
005900 //SYSOUT   DD  SYSOUT=*
006000 //*
****************************** Bottom of Data ******************************
```

```
PLASTICCARDBEAN.JAVA

*
 * IN TOTAL THE PURPOSE OF THIS DOCUMENT AND ITS SIBLING DOCUMENTS IS TO BE A FAIRLY
 * THAT CAN BE USED TO BUILD A WEB SERVICES FRONT END TO A PNC EAI (Z/OS) REGISTERED (R
 *
 * BEAN IMPLEMENTATION CLASS FOR ENTERPRISE BEAN:PLASTICCARD
 */

PACKAGE COM.PNC.RCB.EAI.EJB.PCS;

IMPORT ORG.APACHE.LOG4J.LOGGER;

IMPORT COM.PNC.RCB.EAI.REPLY.PCS.*;
IMPORT COM.PNC.RCB.EAI.REQUEST.PCS.*;

PUBLIC CLASS PLASTICCARDBEAN IMPLEMENTS JAVAX.EJB.SESSIONBEAN {
    PRIVATE JAVAX.EJB.SESSIONCONTEXT MYSESSIONCTX;
    PRIVATE STATIC LOGGER LOGGER = LOGGER.GETLOGGER (PLASTICCARDBEAN.CLASS);

PUBLIC PLASTICCARDREPLY PLASTICCARDREQUEST (PLASTICCARDREQUEST PCREQ, PCSTABLE
        THROWS JAVAX.EJB.EJBEXCEPTION {
        PLASTICCARDREPLY PCREP = NEW PLASTICCARDREPLY ();
```

PROJECT EXPLORER

- DEPLOYMENT DESCRIPTOR: WEBSERV
- EJBMODULE
  - COM.IBM.EJS.CONTAINER
  - COM.PNC.RCB.EAI.EJB.PCS
    - PLASTICCARDBEAN.JAVA
  - META-INF
- COM.IBM.MQ.JAR - WEBSERVICEEJB
- COM.IBM.MQBIND.JAR - WEBSERVICEE
- COM.IBM.MQJMS.JAR - WEBSERVICEE
- COMMONS-LOGGING.JAR - WEBSERVIC
- JDOM_B9.JAR - WEBSERVICEEJBEAR
- JMS.JAR - WEBSERVICEEJBEAR/LIB
- LOG4J-1.2.13.JAR - WEBSERVICEEJB
- PNCDRBUNDLEF-3.2.0.JAR - WEBSE
- PNCJMSF-3.1.0.JAR - WEBSERVICEE
- PNCLOGGINGF-3.1.1.JAR - WEBSERV
- PNCWEBSSOFRAMEWORK.JAR - WEB
- SAXPATH.JAR - WEBSERVICEEJBEAR
- XALAN_2.5.2.JAR - WEBSERVICEEJB
- XERCESIMPL_2.5.0.JAR - WEBSERVIC
- XML-APIS_1.1.JAR - WEBSERVICEEJB

FIG. 41A

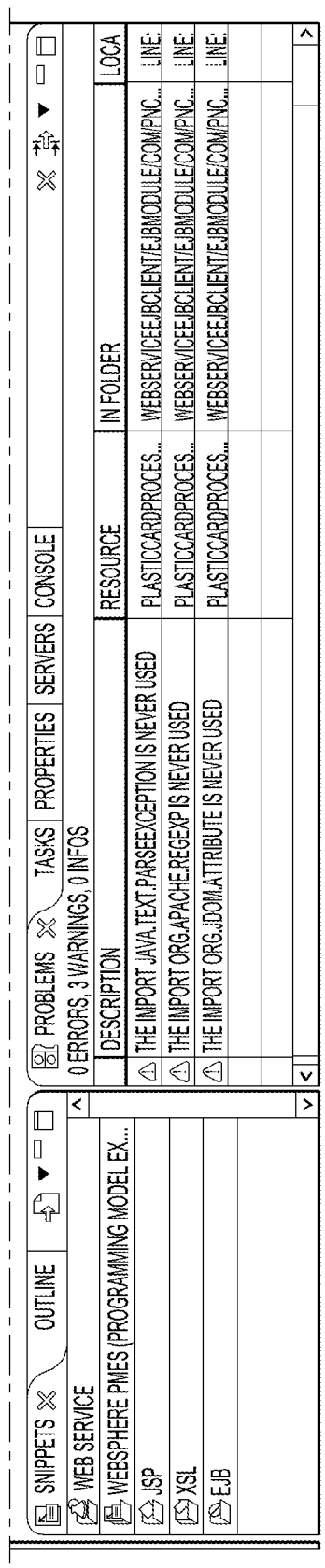
FIG. A1B

| SNIPPETS | OUTLINE | | | |
|---|---|---|---|---|
| WEB SERVICE | | | | |
| WEBSPHERE PMES (PROGRAMMING MODEL EX... | | | | |
| JSP | | | | |
| XSL | | | | |
| EJB | | | | |

| PROBLEMS | TASKS | PROPERTIES | SERVERS | CONSOLE |
|---|---|---|---|---|
| 0 ERRORS, 52 WARNINGS, 0 INFOS | | | | |
| DESCRIPTION | | | RESOURCE | IN FOLDER |
| ⚠ THE IMPORT JAVA.IO.SERIALIZABLE IS NEVER USED | | | _EJSWRAPPER_STU... | WEBSERV/CEE.JB/EJBMODULE/COM/IBM/EJS/C... |
| ⚠ THE IMPORT JAVA.RMI.REMOTE IS NEVER USED | | | _EJSWRAPPER_STU... | WEBSERV/CEE.JB/EJBMODULE/COM/IBM/EJS/C... |
| ⚠ THE IMPORT JAVA.IO.SERIALIZABLE IS NEVER USED | | | _EJSWRAPPER_TIE... | WEBSERV/CEE.JB/EJBMODULE/COM/IBM/EJS/C... |
| ⚠ THE IMPORT JAVA.RMI.REMOTE IS NEVER USED | | | _EJSWRAPPER_TIE... | WEBSERV/CEE.JB/EJBMODULE/COM/IBM/EJS/C... |
| ⚠ THE IMPORT JAVA.RMI.REMOTEEXCEPTION IS NEVER USED | | | _EJSREMOTESTATE... | WEBSERV/CEE.JB/EJBMODULE/COM/PNC/RCB/... |
| ⚠ THE IMPORT JAVA.RMI.REMOTE IS NEVER USED | | | _EJSREMOTESTATE... | WEBSERV/CEE.JB/EJBMODULE/COM/PNC/RCB/... |
| ⚠ THE IMPORT JAVA.RMI.REMOTEEXCEPTION IS NEVER USED | | | _EJSREMOTESTATE... | WEBSERV/CEE.JB/EJBMODULE/COM/PNC/RCB/... |

*FIG. 43B*

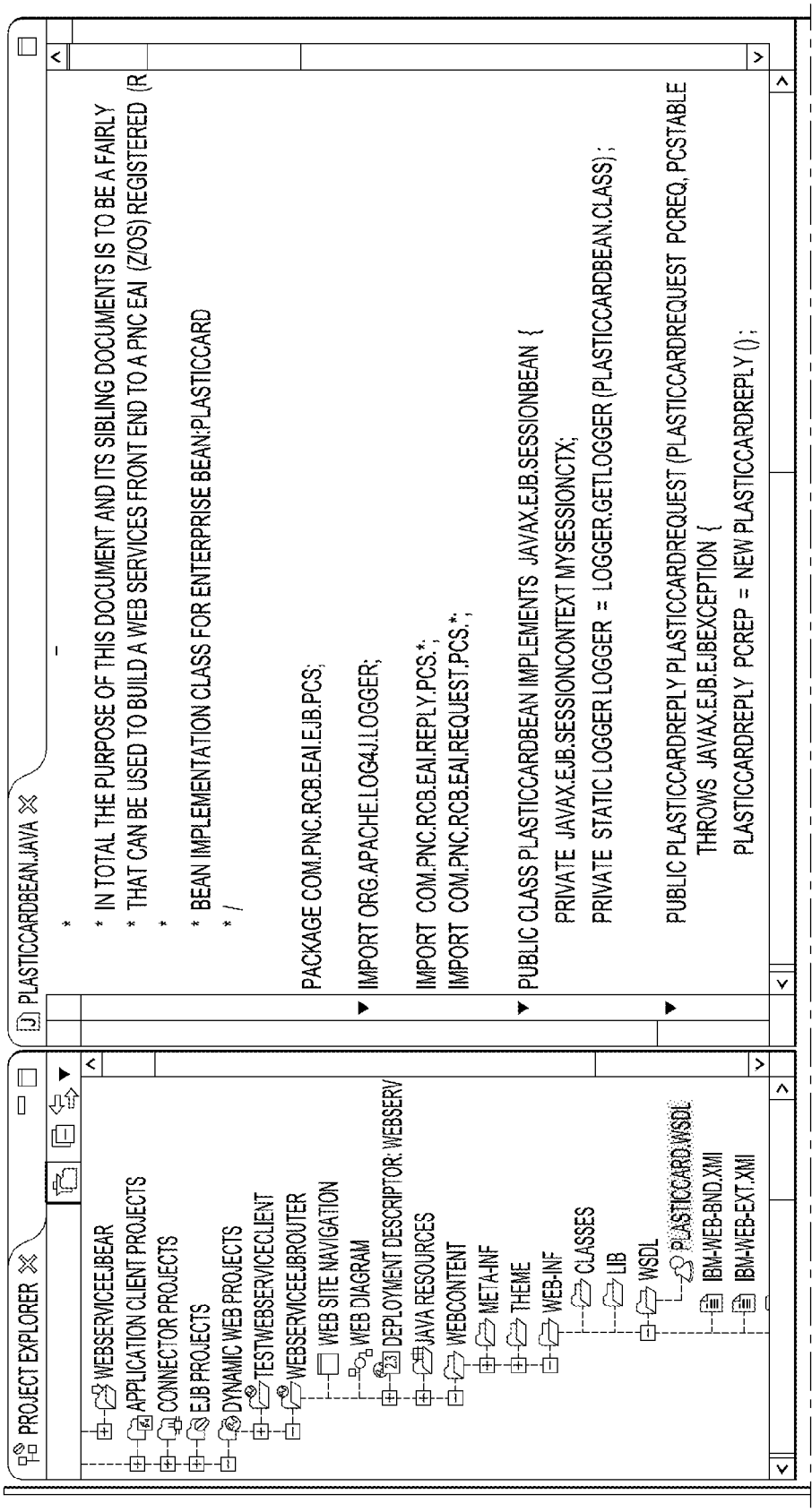
FIG. 48A1

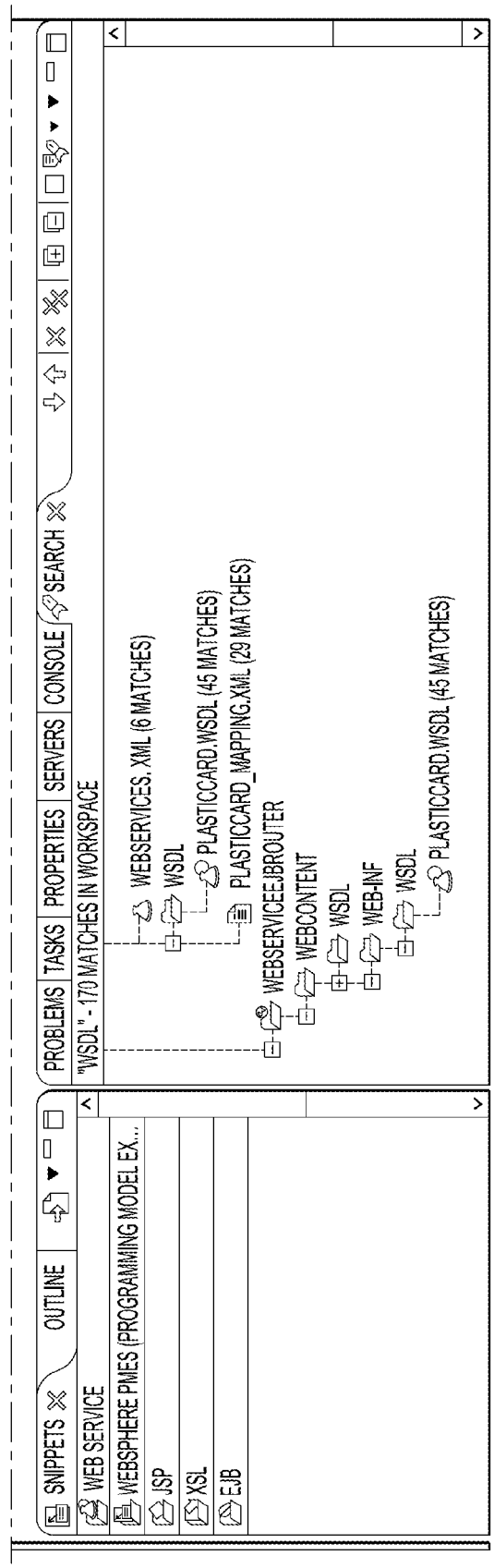
FIG. 48A2

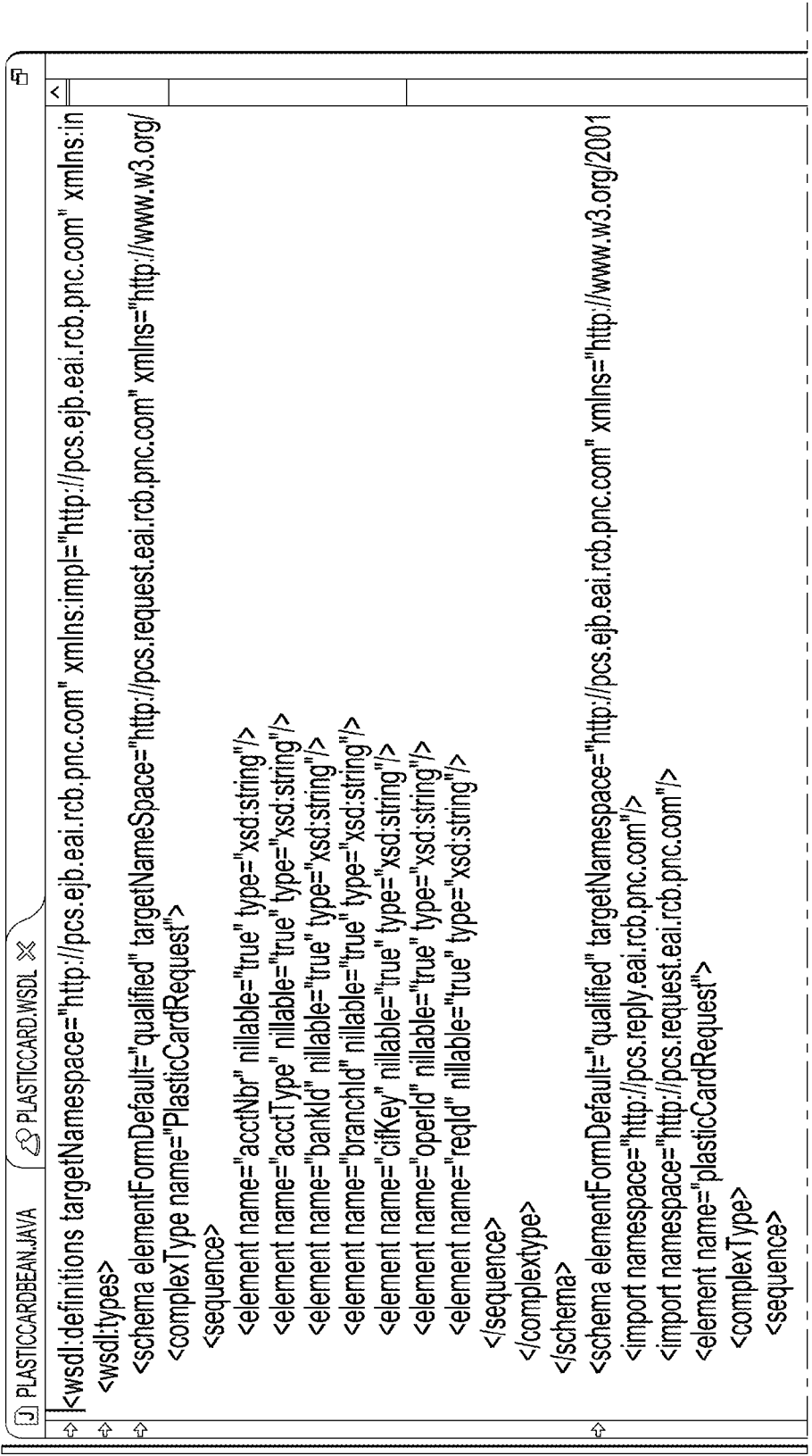
FIG. 48B1

```
<element name="pcreq" nillable="true" type="tns2:PlasticCardRequest"/>
<element name="pt" nillable="true" type="tns3:PCSTable"/>
</sequence>
</complexType>
</element>
<element name="plasticCardRequestResponse">
<complexType>
<sequence>
<element name="plasticCardRequestReturn" nillable="true" type="tns3:PlasticCardReply"/>
</sequence>
</complexType>
</element>
```

SOURCE GRAPH

MAINFRAME-BASED WEB SERVICE DEVELOPMENT ACCELERATOR

CROSS-REFERENCE TO RELATED APPLICATIONS/PRIORITY CLAIM

The present application is a continuation-in-part of: U.S. patent application Ser. No. 12/248,403, filed on Oct. 9, 2008, which claims priority to U.S. Provisional Patent Application Ser. No. 60/979,499, filed on Oct. 12, 2007; U.S. patent application Ser. No. 12/248,249, filed on Oct. 9, 2008, which claims priority to U.S. Provisional Patent Application Ser. No. 60/979,500, filed on Oct. 12, 2007; U.S. patent application Ser. No. 12/248,278, filed on Oct. 9, 2008, which claims priority to U.S. Provisional Patent Application Ser. No. 60/979,503, filed on Oct. 12, 2007; and, U.S. patent application Ser. No. 12/248,177, filed on Oct. 9, 2008, which claims priority to U.S. Provisional Patent Application Ser. No. 60/979,508, filed on Oct. 12, 2007. The contents of the foregoing applications are hereby incorporated by reference in their entirety into the present application.

FIELD OF THE INVENTION

The invention generally relates to systems, processes, tools and strategies for building, configuring and processing applications in a computer-based environment. In various embodiments, the invention more particularly relates to construction and implementation of computer-based applications in connection with a mainframe-based computing platform or environment.

BACKGROUND

To keep pace with competitors, business entities such as financial institutions often need to convert their business processes or workflows into more efficient and productive information technology solutions. Implementing even a seemingly basic change to information technology infrastructure, however, may require involvement by multiple functional layers of the business including accounting, finance, customer service, information technology functions, or possibly other areas.

For example, traditional approaches to building or modifying web-based applications that assist with the client interface or client access aspects of business operations usually involve engaging many technicians with a variety of skill sets and backgrounds. Such conventional approaches may employ end user applications, web servers, ad hoc programming, or other components that compound their functions with existing information architecture to make the information technology system of the business even more complex and difficult to maintain.

Even when considering only the information technology function, multiple personnel must be identified and made available for a given application development task: a skilled HTML programmer may be needed to develop a user interface or browser; a graphics designer may be needed to develop screen presentation; a Java or .NET programmer may be needed to program application server functions; and/or an integration specialist who understands HTTP or other like protocols may be needed to facilitate communications among different computer systems. In addition, with particular regard to mainframe computing environments, mainframe development expertise may be necessary to ensure effective data communications, transactions and other functionality associated with accessing the mainframe system. Furthermore, the effort involved in functionally testing a proposed modification such as a new web-based application is typically significant, often consuming substantial time and resources across many different functional areas of the business.

Industry movement away from mainframe-focused architecture to distributed application server-based architecture has had further significant disadvantages, especially in view of the issues described above. For example, with respect to data originally stored and communicated from a mainframe system, the data must be pushed to and synchronized with the application servers that ultimately present the data to clients or users. In addition, modifications to applications or data on the mainframe system must likewise be updated for any distributed systems that depend on such mainframe applications or data. Also, copying portions of data or applications from the mainframe to a distributed application server environment can negatively impact security, control, and processing speed for data transactions.

In view of the issues described above, more effective and efficient systems, processes, tools and strategies are needed to build and configure applications and generally to enhance data communication and processing within computer-based environments, especially computing environments which are at least partially dependent on a mainframe computer system.

BRIEF DESCRIPTION OF THE FIGURES

The utility of the embodiments of the invention will be readily appreciated and understood from consideration of the following description of the embodiments of the invention when viewed in connection with the accompanying drawings, wherein:

FIGS. 4A through 6D include examples of interfaces configured for browsing portions of a mainframe system;

FIGS. 7A through 7F include examples of screen displays illustrating various aspects of an interface that can be used as business rules engine builder to access a business rules engine of a mainframe system;

FIG. 8 includes an example of a screen display illustrating a logging utility that can be used by an EAI framework to track messages communicated through a mainframe system;

FIG. 9 shows an example of an initiation message that can be processed by a mainframe system;

FIG. 10 shows an example of an output message matched with an XSLT transformation;

FIGS. 11A, 11B and 12 include examples of output screens which may be generated or configured by a user;

FIG. 13 includes a screen display presenting an example of an edit table associated with the output screen of FIG. 12;

FIG. 14 includes a screen display of a table in a mainframe system which controls lists for screens and interfaces;

FIG. 15 displays an example of an update rule screen;

FIG. 16 includes an example of a mainframe-based screen;

FIG. 17 includes an example of an update rule screen;

FIG. 18 illustrates an example of a modified update rule screen;

FIG. 21 includes an example of a URL search string;

FIG. 22 illustrates an example of the URL search string of FIG. 21 as converted into XML;

FIG. 23 includes an example of an XML reply which may be communicated in accordance with certain embodiments of the invention;

FIG. 24 displays a transformed version of the XML reply of FIG. 23;

FIG. 25 includes an example of HTML generated in association with the transformed reply of FIG. 24;

FIG. 26 shows a sample of an appended JavaScript file;

FIG. 27 includes an example of screen interface displayed as a result of DHTML communicated back to a customer or data communication channel;

FIGS. 30A through 36 include screen displays that illustrate examples of various operational aspects of a mainframe system operative within an EAI framework;

FIGS. 37 through 43B include screen displays that illustrate examples of the use and operation of an application development tool;

FIGS. 48A1-48A2 and 48B1-48B2 illustrate an example of a WSDL file generated in accordance with various embodiments of the invention;

DESCRIPTION

In various embodiments, the inventions described herein provide systems, processes, tools and devices that offer technical and non-technical personnel the ability to build and modify screens, interfaces, or web-based applications by using configurable parameters rather than traditional computer programming code. Complex rules and rule extensions can be accessed by users, and this reduces reliance on receiving skilled assistance from technical professionals. In addition, embodiments of the inventions leverage the computing power, control, security and other beneficial aspects of including a mainframe-based platform in a computing environment. In general, embodiments of the invention offer more effective and efficient systems, processes, tools and strategies to build and configure applications and enhance data communication and data processing within computer-based environments which may at least partially depend on the operation of a mainframe computer system.

Various embodiments of the invention offer tools for a service provider operating in a distributed computing environment to leverage the processing power of a mainframe-based computing environment. For example, use of the invention can allow a web service provider operating a distributed network of web-based computer servers to employ and harness the benefits of a mainframe-based computer system in constructing and employing web services on the network.

As applied herein the term "EAI" means enterprise application integration which may include a set of computer system components that allow different system platforms and business areas to communicate effectively with each other. For example, in various embodiments of the invention, an "OS/390" EAI framework may be employed as a gateway for data communicated to or from a mainframe or mainframe-based system.

As applied herein, the term "XSLT" means extensible stylesheet language transformation which may be a program and/or protocol that facilitates the conversion of one data format to another (e.g., such as converting XML to HTML).

As applied herein, the term "MQ" generally refers to a network communication technology allowing independent and potentially non-concurrent applications on a distributed system to communicate with each other (one example of "MQ" is "Websphere MQ" offered by IBM Corporation). MQ may be employed on many different platforms including a "z/OS" mainframe platform, for example.

As applied herein, the term "CICS" (Customer Information Control System) may represent a transaction server that operates primarily on mainframe systems under "z/OS" or "z/VSE" operating systems, for example.

Figure 1:
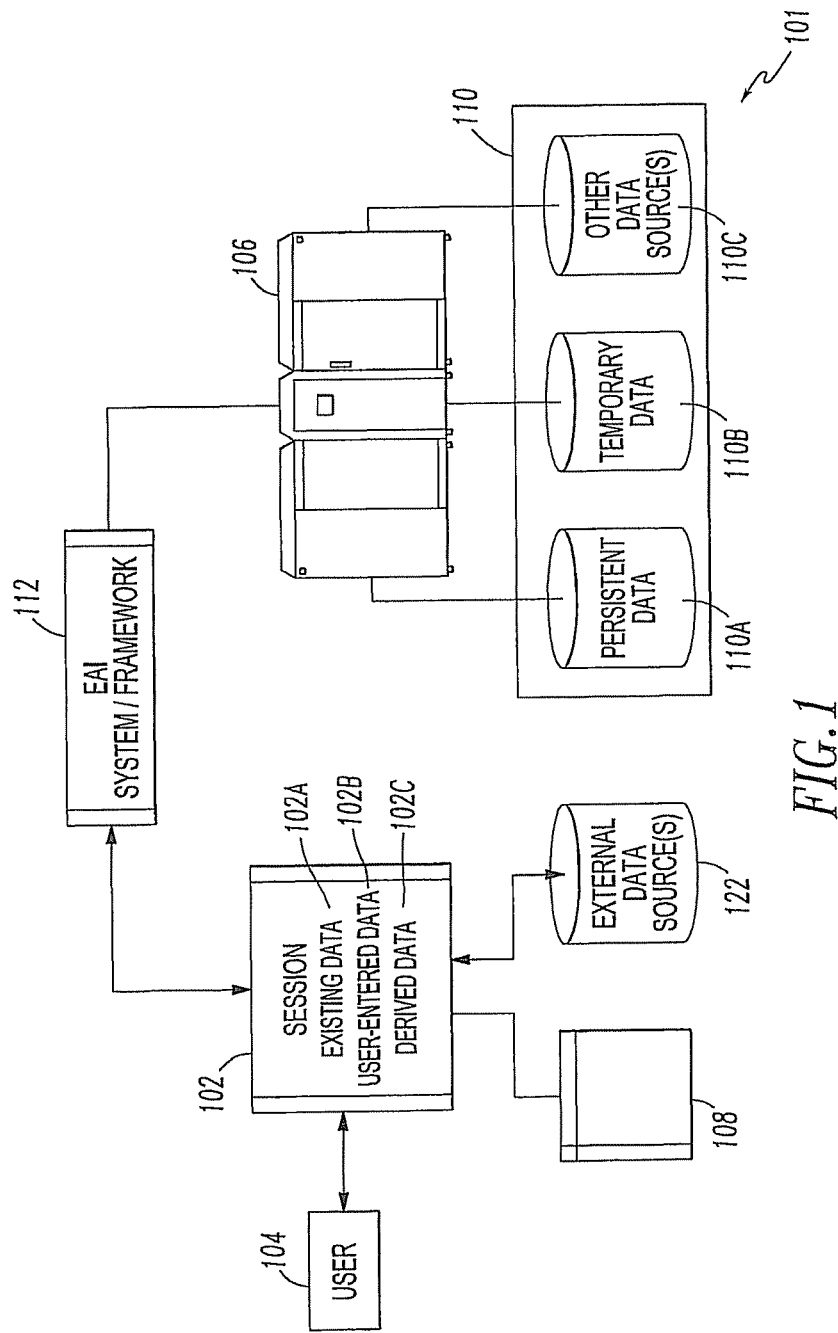
FIG. 1 illustrates an example of a computing architecture or general framework with which various embodiments of the invention may be employed or operatively associated.

FIG. 1 illustrates an example of a computing architecture 101 or general framework with which various embodiments of the invention may be employed or operatively associated. In a given session 102, a user 104 may interact with a mainframe system 106, for example, such as through use of a screen, browser or an interface 108 that allows the user 104 to manipulate, modify or enter data for processing by the mainframe system 106. The session 102 may have a beginning state when the user 104 initially begins data manipulation and an end state when the user 104 completes data manipulation activity. At the end state of the session 102, the mainframe system 106 may store data entered or modified by the user 104, and/or the mainframe system 106 may direct or execute one or more services, business actions, and/or transactions based on the data in the session 102. The data may be stored in the mainframe system 106 in one or more storage media 110, which may represent persistent state data (in a persistency layer) 110A, temporary data 110B, or other data sources 110C. In the context of a financial institution, for example, data stored on the storage media 110 may include customer information stored on an IMS database; account information stored on a VSAM database, and/or customer contact information stored on a DB2 database.

The state data developed or used in association with a given session 102 may include one or more of existing data 102A, user-entered or manipulated data 102B, or derived data 102C. For example, in the context of the business operations of a financial institution, existing data 102A may be data associated with reviewing the checking account of a customer; user-entered or manipulated data 102B may comprise a user-entered configuration or adjustment to be made to the displayed account number; and, derived data 102C may comprise data generated as a result of processing a combination of existing data 102A and/or user-entered data 102B. Upon receiving additional information or embellishment of the session 102 from the user 104, the mainframe system 106 may use the additional data to develop derived data 102C for the checking account as a result of the session 102, such as by modifying a variable which represents how the current account balance will be displayed, for example.

For purposes of the present account information example, processing account data interface configurations or modifications through the mainframe system 106 may include invoking one or more services of an EAI system 112. Services executed by the EAI system 112 may include calling and executing one or more APIs, for example. For example, the EAI system 112 may receive account related data from the user 104, and an account inquiry service may be invoked by the EAI system 112 to retrieve and process data within the mainframe system 106. Subject to the state data associated with the session 102, such as a tag name identified as an account name, the EAI system 112 may return data to the user 104 corresponding to specific aspects of the state data. For example, a service of the EAI system 112 may be invoked to parse retrieved data to select the user ID or user name data for the user 104 from among other stored data. In addition, one or more external data sources 122 may be accessed in addressing user 104 requests. For example, an HTTP or MQ request may be formatted and communicated to external data sources 122 such as an Oracle database or a Lotus Notes database to retrieve and return the requested information to the user 104.

Non-limiting examples of transactions or data processing activities which may be performed by the EAI system 112 include CICS-based protocol conversions (e.g., XML, delimited, NVP, SOAP); transport insulation (e.g., MQ, HTTP); load balancing and message routing; parallel and serial processing; error handling and message logging; message simulation; data conversions and domain validations; custom conversions; synchronized and non-synchronized processing; default settings; COBOL formatting (e.g., justifications, padding, binary and packed fields, etc.); rule-based parsing; tagging; data enrichment; data editing; and/or batch processes including data extraction and aggregation. In certain embodiments, the EAI system 112 may represent a dedicated EAI system, in that each instance runs in its own address space and is configured for a specific function, such as for high volume and/or background transactions. Such a dedicated EAI system may be configured for inquiry-only processing, for example, or other less critical functionality such as IVR marketing and dialer functionality to promote reduced CPU consumption and quicker system response times.

Figure 2:
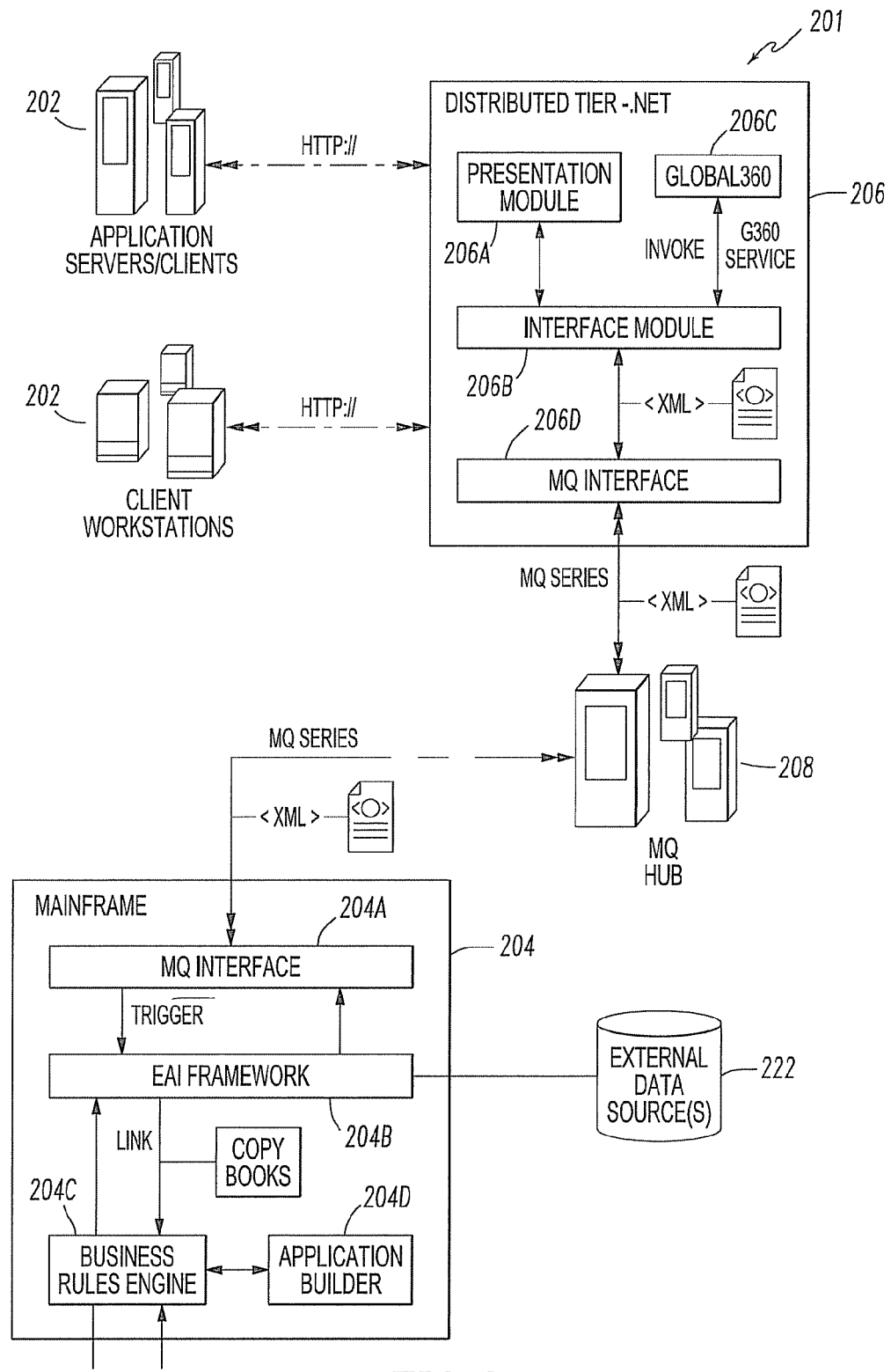
FIG. 2 schematically illustrates an example of a mainframe-based architecture with which various embodiments of the invention may be employed or operatively associated.

With reference to FIG. 2, an example of a mainframe-based architecture 201 is illustrated in which various users 202 may build or develop configurable applications, browse aspects of a mainframe system 204, or perform other tasks or functions through a distributed tier 206. In the example shown, users 202 may use a browser program to type in a URL address for communication to the distributed tier 206 by a protocol such as HTTP, for example. The initiating string of data or state data represented by the URL address may provide an indication of changes or modifications to a screen, interface or other application as may be desired by the user 202. In a financial institution, for example, such applications may include account inquiry applications, funds transfer applications, new account proposal applications, payment applications, or many others. The state data represented by the initiating string data may change from session to session for different users 202. For example, the initiating string data may include the name of an application to be invoked, a user ID, state data (which may specify a starting point for the application to be invoked), and/or other pertinent data.

In the distributed tier 206, the users 202 may access a presentation module 206A which can be configured to generate interfaces and generally manage interaction with the users 202. The distributed tier 206 may include a .NET or WAS server, for example, configured to perform various data processing functions. An interface module 206B may be configured to route or communicate calls to or from the presentation module 206A or a business process management ("BPM") system 206C (e.g., such as a "Global360" or "G360" BPM system). The interface module 206B may also provide MQ abstraction, such as when communicating requests or other data with the mainframe system 204. The business process management system 206C may provide workflow management, imaging, or archiving functions for various aspects of the invention. In operation, a user 202 configuring an application may submit a constructed application (e.g., built by customizing user interfaces or screens, or collecting data for the screens) to the business process management system 206C for approval through another operational area or by management personnel of a financial institution. In various embodiments, a constructed application may be saved in XML format, for example, and then submitted for approval to the business process management system 206C. The XML-formatted application or interface may be derived from state data associated with work performed by the user 202. It can be appreciated that use of state data permits users 202 to return to an application at a prior stage of completion, perhaps to revise or continue work on the application.

Referring again to FIG. 2, data requests or calls may be communicated through an MQ interface 206D of the distributed tier 206 through an MQ hub 208 to the mainframe system 204. In various embodiments, such data requests or calls may be communicated to the mainframe system 204 via a variety of suitable protocols. An MQ interface 204A of the mainframe system 204 receives communications from the MQ hub 208 and passes them to an EAI framework 204B. In various embodiments, the EAI framework 204B may be configured to serve as an MQ connector, an XML generator or translator, and/or a field level data validator for data communicated to and from the mainframe system 204. The EAI framework 204B may be a distributed computing system that operates various functions of an organization or financial institution, such as desktop functions, teller transactions, online banking activities, and many others. In various embodiments, the EAI framework 204B may be configured for communication with one or more external data sources 222, which may include one or more non-mainframe-based data sources. Non-limiting examples of non-mainframe-based data sources 222 include Oracle databases, Lotus Notes databases, and the external data sources 222 may include other types of storage devices or applications maintained or executed on an application server or server cluster.

In operation, the EAI framework 204B may receive XML-formatted state data and call a service in response to the received data. The XML-formatted data may be parsed, validated, or otherwise processed when the called service is executed. The processed data may be compared against a business rules engine 204C of the mainframe system 204. The business rules engine 204C may contain one or more rules that can be triggered based on data processed by the mainframe system 204. An application builder 204D may be operatively associated with the business rules engine 204C. In various embodiments, the application builder 204D may be configured for creating presentation definitions in XML, HTML, or for using custom tags, for example. The business rules engine 204C may be configured to support rule definitions and pre-processing or post-processing of transaction data. Based on the state data contained in the communicated data, the mainframe system 204 may select a blank presentation template for communication back to the user 202 or a preconfigured presentation based on existing state data.

Based on the application invoked and the state data, the mainframe system 204 evaluates the screen, interface or other application, and modifications or revisions thereto, desired by the user 202. In performing this evaluation function, the mainframe system 204 may access one or more before-rules and/or one or more after-rules stored in the business rules engine 204C. For example, if an account number is in the state data of the data communicated to the mainframe system 204, a before-rule may be applied to trigger a number of transactions or data retrieval actions, for example, prior to returning the screen or application to the user 202. Likewise, an after-rule may be configured to determine whether the account number is numeric and then invoke an EAI framework 204B service that retrieves certain data in accordance with the numeric account data. An another example of an after-rule is a rule that navigates from screen to screen based on retrieved data, such as once numeric account data is retrieved or once user authorization is confirmed. In still another example, a subsequent screen can have an associated before-rule that retrieves or authorizes account data or other account information once the screen is activated. In various embodiments, the before-rules and after-rules may be generally considered application logic employed by the mainframe system 204 and may be stored as XML-based data.

In various embodiments, the business rules engine 204C may include one or more configurable screen definitions, each of which define one or more aspects of a given screen, interface or application. For example, screen definitions may determine whether labels, tables, pick lists, drop-down menus, check boxes, radio buttons, or many other elements are displayed or can be accessed on a screen or interface. In addition, the screen definitions may determine whether one or more complex objects are applied to a screen. Such complex objects may employ one or more other individual objects. An example of such a complex object is a pick list, including a label for the pick list, values for the pick list, and actions associated with selecting items in the pick list. Embodiments of the invention may facilitate multiple embellishments such as determining an action when a check box is checked, such as opening access to a new portion of the screen, for example. It can be appreciated that such screen configuration is facilitated without requiring formal programming or coding of scripts by the user 202.

In providing return communications of screens, interfaces, applications or other data to the user 202, an XSLT transformation or translation may be performed in certain embodiments to provide HTML or another suitable protocol which can be viewed on a browser employed by the user 202. Such transformation or translation may be performed by one or more portions of the distributed tier 206, for example, or other components of the system architecture 201.

Figure 3:
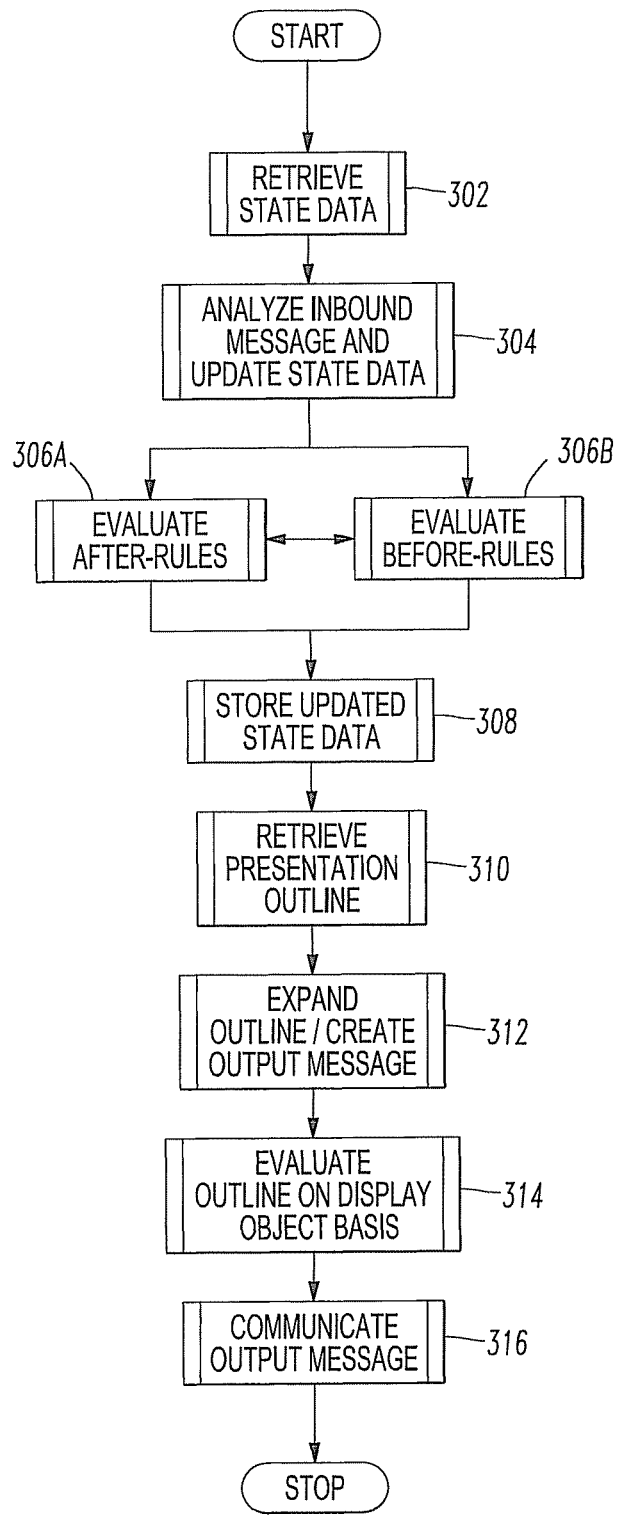
FIG. 3 includes a process flow diagram illustrating a method for communicating and processing data in accordance with embodiments of the invention.

FIG. 3 includes a process flow diagram illustrating an example of processing data between the user 202 and the mainframe system 204. At step 302, state data may be retrieved from the persistency layer or permanent storage of the mainframe system 204. At step 304, input data communicated from the user 202 in the form of an inbound XML message, for example, may be parsed by a called parsing service of the EAI framework 204B to analyze the contents of the communicated XML message and update the state data. The business rules engine 204C may then be invoked at step 306A to evaluate any applicable after-rules associated with the current interface or application of the user 202; likewise the business rules engine 204C may invoked at step 306B to evaluate any applicable before-rules to be applied to the user 202 interface. Application of the before-rules and after-rules at these steps may also trigger events such as changing a field in the state data, invoking a service of the EAI framework 204B to read a database and then update the state data, send an e-mail, or many other actions. At step 308, updated state data associated with the user 202 session may be stored to the persistency layer of the mainframe system 204.

At step 310, the mainframe system 204 may retrieve a user-configured presentation layer outline to be applied as the next user interface. Based on the current state data, the presentation layer outline may be expanded to accommodate the internal structure of the state data at step 312. The mainframe system 204 may then evaluate the presentation layer outline on a display object basis and create an output XML message at step 314. At step 314, each display object may be interrogated to determine one or more of the following: should it be displayed, e.g., based on a business rule?; what is the object type, e.g., static or variable?; what are the object attributes, e.g., static or rule-based?; what are the object properties, e.g., static or rule-based?; how is the object populated, e.g., static from state data, static pick list, dynamic pick list invoking EAI services, defaulted, or other?; what are the object events, e.g., static or rule based?; and/or other considerations. At step 316, the output XML message may be communicated back through the EAI framework 204B ultimately to be transformed and viewed on a browser of the user 202.

Referring now to FIGS. 4A through 4D, examples of interfaces configured for browsing portions of the mainframe system 204 are shown. In these examples, data associated with an application called New Account Proposal (i.e., "NAP") are displayed. With reference to FIG. 4A, the screen 402 displays a COBOL definition of fields 404, including a layout description wherein the whole layout is 33,886 bytes in length; a G360-user-required-field is 137 bytes in length with an offset or displacement of zero; a user-key field is 40 bytes in length, which is a sub-field of the G360-user-required-field and also starting at zero. In this example, the G360-user-required-field comprises a collection of multiple fields.

With reference to FIG. 4B, various components of the EAI framework are displayed in a screen 406, including various XML tag names 408. The screen 406 demonstrates how communicated XML documents can be identified and processed by the mainframe system 204, such as by mapping the XML documents into a layout for execution by a program or application. For example, for a submitter-login field, a value would be provided for a corresponding OperID tag name. FIGS. 4C and 4D show additional aspects of the XML tag names such as default values (see screen 410 of FIG. 4C) and edit table identification (see screen 412 of FIG. 4D) which can be configured for use by the EAI framework 204B of the mainframe system 204.

Referring now to FIG. 5, a screen display 502 illustrates an example of an edit table 504 for the NAP index (described above). The edit table 504 displays screens or interfaces that are registered with the NAP index. Based on the state data of the user 202 communicated to the mainframe system 204, the edit table 504 can be applied to identify a starting point for a given interface or application. In the context of the example of new account proposals, the edit table 504 includes various different starting points and different screens that are registered with a particular application. As shown, the edit table 504 may include designations for true/false rules collections 506, designations for before-rule collections 508, and designations for after-rule collections 510. In general, the edit table 504 may at least partially direct the activity of the mainframe system 204 in determining where to go to find information and what tasks or transactions to perform for a given application.

With reference to FIGS. 6A through 6C, accessing the "NAPCIPID" key on the edit table 504 of FIG. 5 generates screen displays 602, 604 for a NAP customer information page. As shown, the screen display 602 may include object types, object IDs, template table ("T-TBL"), and rule numbers ("RUL#") among other field sets or field values. The objects may elements such as banners or checkboxes, for example, or may be complex objects which comprise a collection or arrangement of individual objects. For example, a "template" may represent a collection of screen components for display on an interface or application. As shown in the screen display 604, fields such as repeating group ("RGI") 606, attributes 608, tool tips 610, labels 612, classes 614, styles 616, on-clicks 618, and map-to tags 620 may be included. For example, the on-clicks 618 may indicate that a task or function is to be performed once a selection is made in a configured screen or interface. The map-to tags 620 may be configured to map to a tag name in the state data; for example, "atCIPCustInd" may be mapped to a corresponding name in the state data. It can be appreciated that state data obtained from various user 202 sessions can be leveraged in connection with embodiments of the invention to direct transactions, call applications, or execute data retrieval functions occurring within the EAI framework 204B or from external data sources 222 by applying definitions naturally embedded within an extensible language such as XML.

FIGS. 6C and 6D show screen displays 632, 634 which result from reviewing the "banner" object presented on the screen display 602. These displays 632, 634 demonstrate that the complex object represented by the "banner" template includes a number of individual objects, such as different labels. In addition, the "banner" template may be a reusable or transferable component for different applications or interfaces constructed by accessing the mainframe system 204.

Figure 7A:
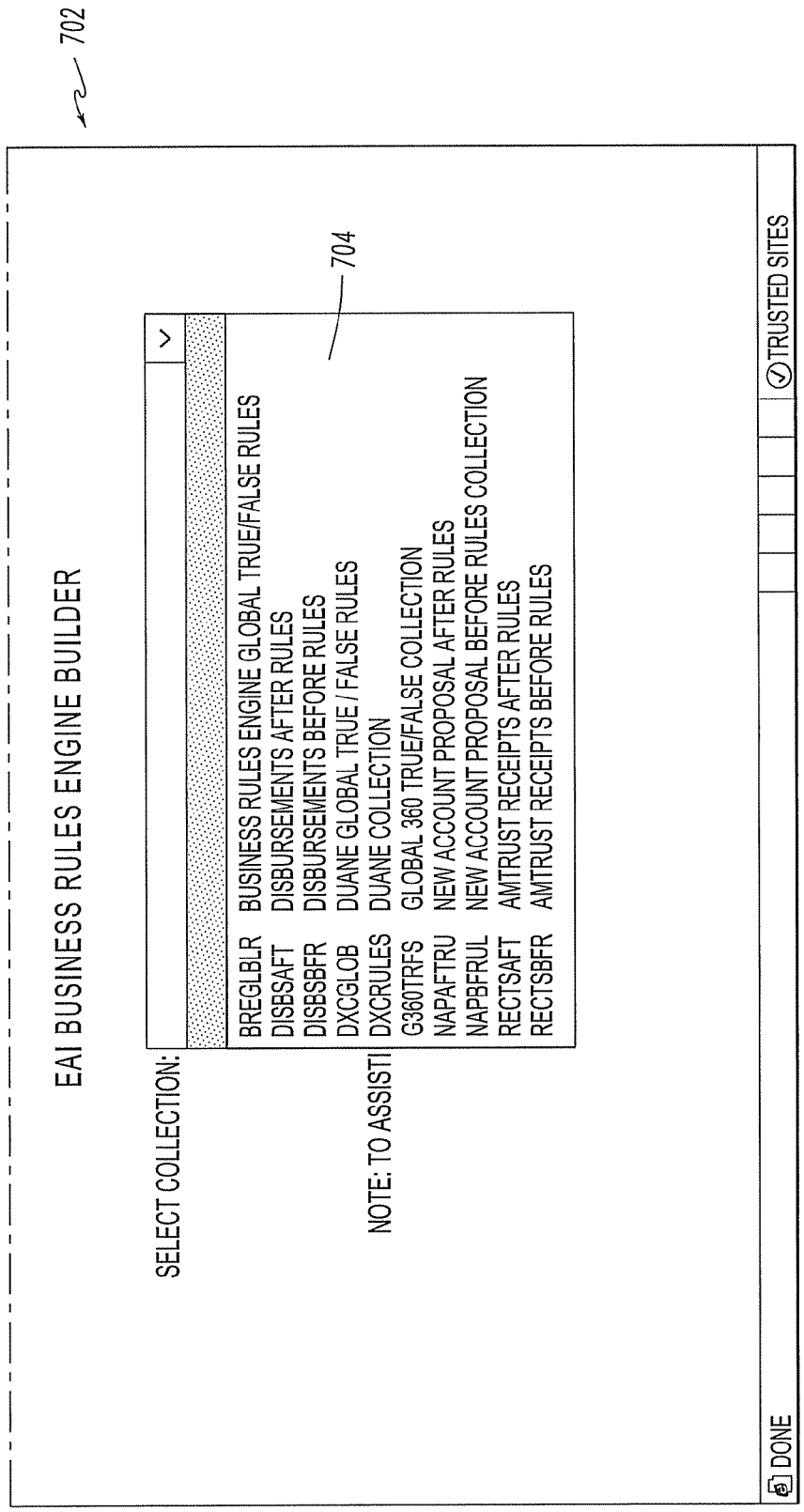
Figure 7B:
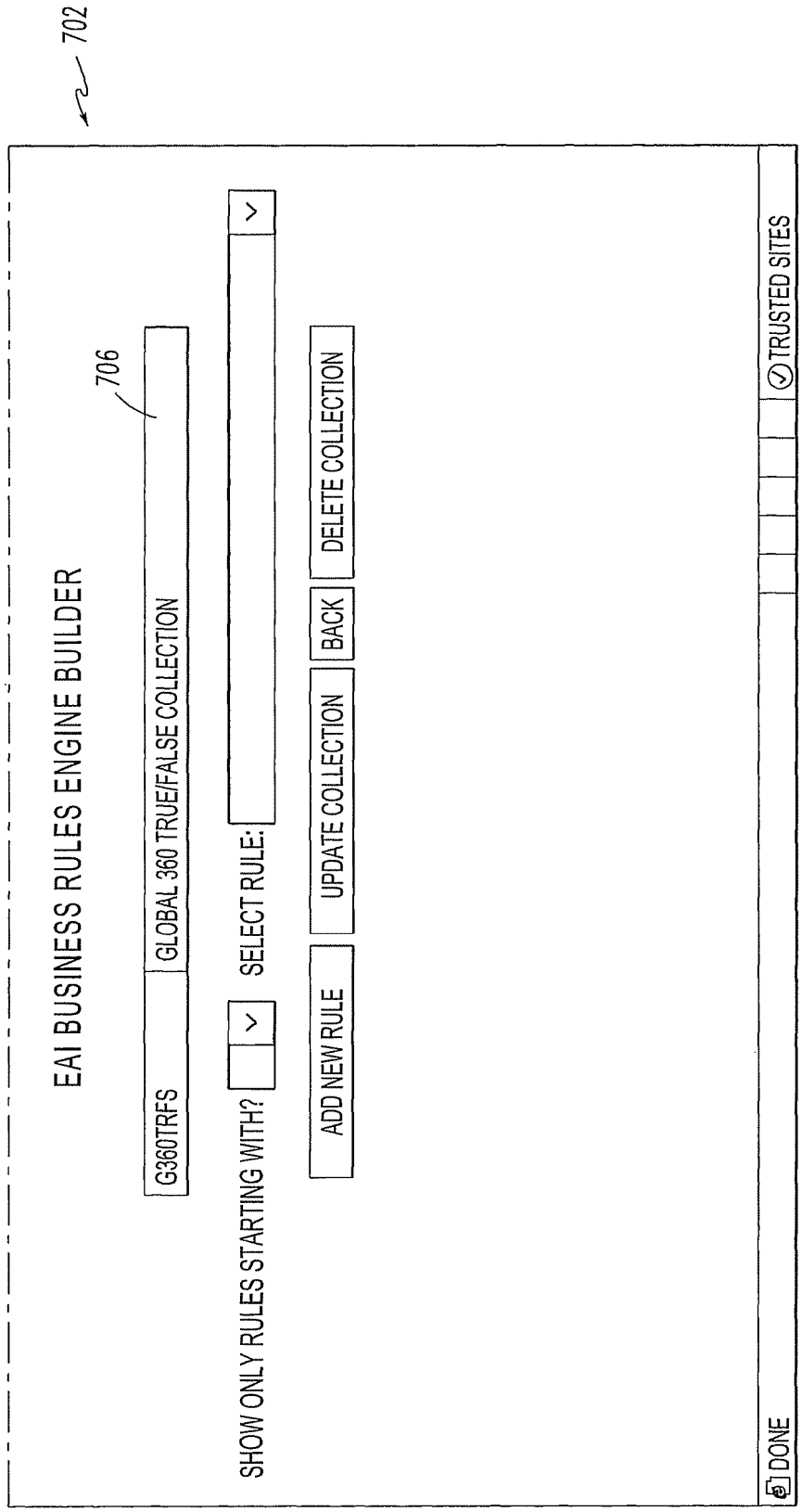

With reference to FIG. 7A, a screen display 702 illustrates an interface that can be used as business rules engine builder to access the business rules engine 204C of the mainframe system 204. The interface permits the user 202 to select from among different rules collections 704 such as by accessing a drop-down menu, as shown. FIG. 7B shows that the "Global 360 True/False Collection" 706 has been selected; and FIG. 7C shows a sampling of the individual rules 708 contained within the "Global 360 True/False Collection" 706. FIG. 7D illustrates that if rule ID "A42" 710 is selected from the list of individual rules 708, various characteristics of the rule can be displayed or modified, such as rule description 712, rule type 714, rule trigger operator 716 (e.g., "greater than" or "less than" or "equal to"), and/or trigger level 718. For example, in the rule shown, if an entry is made in a field called "BROA" (which may represent "bank regional office account"), and the "authResponse" is equal to an "A", then one point is given. Since one point is greater than the trigger level of zero, the rule is activated then the action of "Display D2 entry fields" is executed. In contrast, if the rule has a false condition, then this action is not executed. FIG. 7E illustrates examples of different rule types 714; and FIG. 7F illustrates different examples of rule data types 720. It can be appreciated that rules in the business rules engine 204C may perform a variety of tasks or functions when triggered. For instance, rules may be configured to send e-mails, to set the next screen that should be presented in an application, to add a field to a screen in the application, and/or many others. The rule data types 720 may be used to set a field in the state data based on a lookup into the edit table. For example, if the field value is "PA", then another field in the state data can be connected to the lookup value, which in this case would be "Pennsylvania" for the "PA" field value.

With reference to FIG. 8, a screen display 802 illustrating a logging utility that can be used by the EAI framework 204B to track messages (e.g., DSS messages) communicated through the mainframe system 204. Such messages may be communicated in association with the activity of users 202 in modifying screens, interfaces, or other applications. FIG. 9 shows an example of a specific initiation message and generally illustrates the kinds of messages that can be processed by the mainframe system 204. In various embodiments, the systems described herein may perform message authentication including token processing (e.g., critical messages can be secured, validated through a token or one-time use token, tokens may expire after a configurable time period, standalone token processing—a token routine can be used to authenticate distributed system access between thick and thin client applications); message security and alerts (e.g., alerts configurable by application ID which can be communicated to a pager, consol log, or report); rule-based message publication (e.g., messages can be queued or posted based on content, and a single message can have multiple publication rules, allowing for multiple subscription vehicles or publication clearinghouses); rule-based store and forward which allows EAI applications to store messages for processing at a later time based on message content (e.g., number of attempts and wait interval can be configured).

FIG. 10 shows an example of an output message 1002 matched with an XSLT transformation, wherein an object type equals "div" will be transformed by the XSLT to create a "div" tag in HTML. The output message 1002 may also be reviewed to determine that attributes called "id" and "theScreen" are present in the message 1002. Through the XSLT transformation, source code may be generated, such as in HTML format which can be processed by a browser of the user 202.

An example of an output screen 1102 generated or configured by a user 202 is shown in FIGS. 11A and 11B. The screen display 1104 demonstrates that once "Executorships" is selected in the "Category" field 1106, then an on-click rule is triggered to display only one account type for the "Account Type" field 1108, which is the "1-Executor/Administrator/Ancillary" account type.

Another example of an output screen 1202 is shown in FIG. 12. A section 1204 of the screen 1202 requests that states "check all that apply" with respect to various status identifiers for an individual client of a financial institution (i.e., beneficiary, grantor, donee, sprinkle, guardian and settlor). FIG. 13 includes a screen display 1302 presenting an edit table 1304 associated with the output screen 1202 of FIG. 12. As shown at line 70 of the edit table 1304, there are entries for "chkBoxHTML2" as an object type 1306 and "capacities" as its corresponding object ID 1308. As shown in FIG. 14, a screen display 1402 displays a "Radio Control Parm" table 1404 which controls lists for screens and interfaces. As shown, entry 71 of the table 1404 points to a domain value table of 29; has a positive or "Y" required indicator ("RI"); and has a direction indicator ("DI") value of 4 (which directs the display of 4 boxes across the screen until the next line is reached—as shown in the section 1204 of the output screen 1202, there are 4 boxes displayed on a first line followed by 2 boxes displayed on a second line). The table 1404 is also a dynamic table, which means that the table 1404 is based on one or more dynamic features, such as actual values on the output screen 1202 may change based on user-entered data, for example. In general, it can be appreciated that many changes in screen configurations can be readily and conveniently converted into what otherwise might be complex source code and implemented in a computer system by employing the enhancements offered by embodiments of the invention.

In various embodiments, the business rules engine builder (as described above) may be used to build its own aspects or features. FIG. 15 displays an update rule screen 1502, including definitions for "Rule AAB" 1504, in which the rule 1504 returns a "true" value if the "schemaName" field 1506 is greater than ("GT") blank space. That is, one point ("1") is assigned if "schemaName" 1506 is greater than blank spaces or a blank entry. It can be seen that since one point is greater than zero (which is the trigger level 1508), then the rule would return a "true" value in this scenario. As shown in the mainframe-based screen 1602 of FIG. 16, the "AAB" rule number 1604 ("RUL#") controls whether a tag help message and fieldset section 1508 will appear on the "Update Rule" screen. If the AAB rule returns a "true" value, then objects with keys 310, 315, 320, 325 and all descendants ("PCK") thereof will display on the screen 1502. As shown in the update rule screen 1702 of FIG. 17, the trigger level 1704 for the "AAB" rule 1706 has been changed to a value of "1" which will effectively prevent the rule 1706 from being triggered. That is, in this scenario the condition points value 1708 will never exceed the trigger level value 1704. FIG. 18 illustrates the now modified update rule screen 1802 without the tag help message and fieldset section 1508, because the "AAB" rule 1706 returns a "false" value and the screen builder will not display the objects in the section 1508.

In developing the mainframe-based EAI architecture and framework embodiments described herein, the inventors have discovered the benefits of leveraging existing legacy applications, creating a data synchronization vehicle across disparate platforms and databases, combining disparate data from multiple platforms into the same user interface, facilitating multiple message format brokering, allowing multiple transports (e.g., MQ), and/or allowing multiple message protocols (e.g., XML). Within an EAI framework, legacy integration can be readily accomplished: advanced capabilities can be created including a business rules engine; publish and subscribe functionality and rules-based store and forward processing can be executed; various business areas of a financial institution (e.g., retail and non-retail) can be leveraged; and distributed components can be introduced including web services integration for messages, for example, and an XSLT framework for template-based development.

Figure 19:
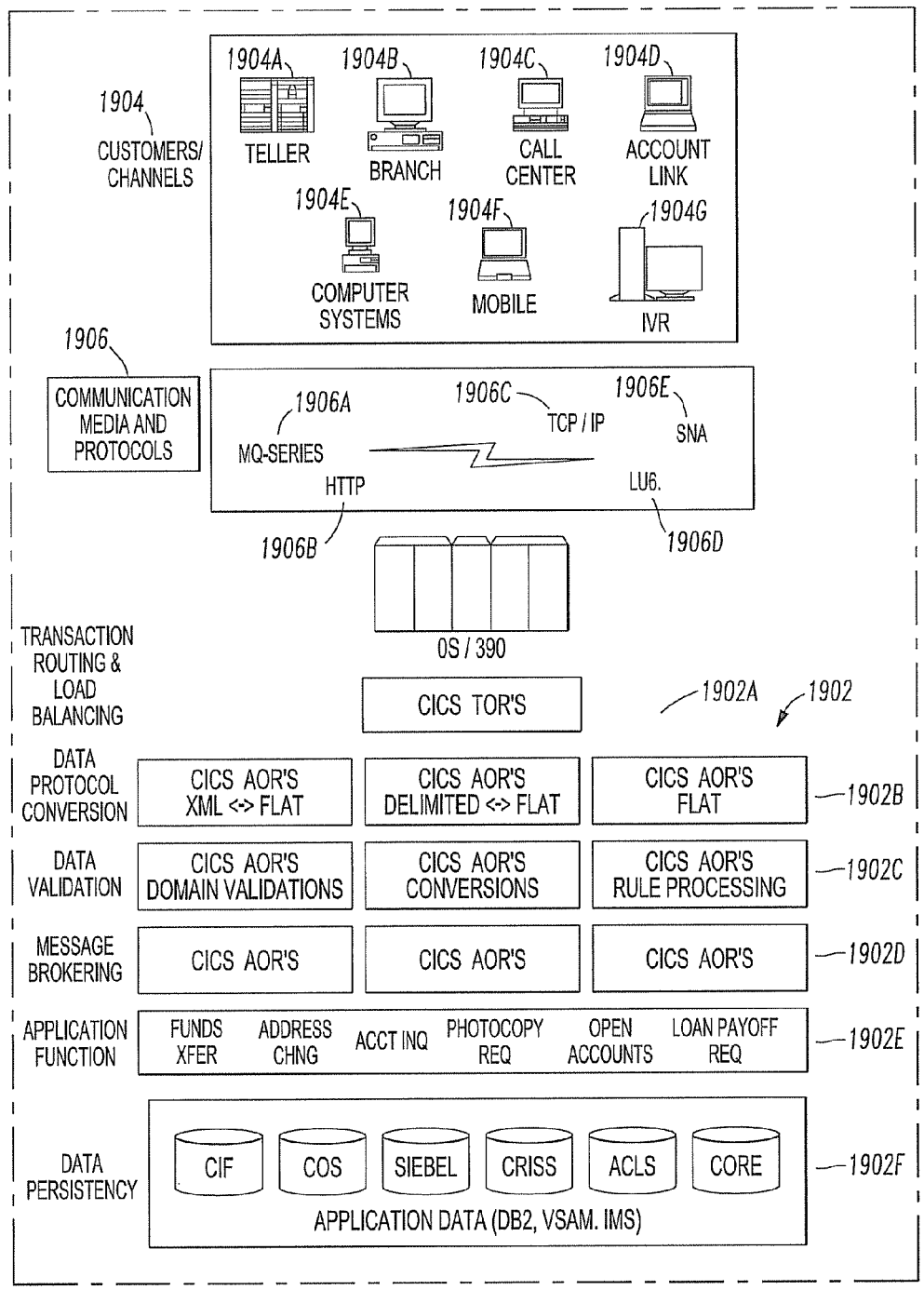
FIG. 19 illustrates an example of an EAI framework structured in accordance with embodiments of the invention.

FIG. 19 illustrates an example of an EAI framework 1902 structured in accordance with embodiments of the invention. Various customers or channels 1904 may interact with the EAI framework 1902 through a variety of communication media and protocols 1906, as shown. In the exemplary context of a financial institution, non-limiting examples of communication channels 1904 include teller systems 1904A, branch systems 1904B, call center systems 1904C, account links 1904D, computer systems 1904E, mobile computer systems or access devices 1904F, and/or interactive voice response (IVR) systems 1904G. Likewise, non-limiting examples of the communication media and protocols 1906 include MQ-Series 1906A, HTTP 1906B, TCP/IP 1906C, LU6 1906D, and SNA 1906E. Within the EAI framework 1902, which may be structured for operation in a mainframe or mainframe-based system, a number of components may be included for various transactions or functions. For example, the EAI framework 1902 may include a transaction routing and load balancing layer 1902A; a data protocol conversion layer 1902B; a data validation layer 1902C; a message brokering layer 1902D; an application function layer 1902E; and/or a data persistency layer 1902F.

Figure 20:
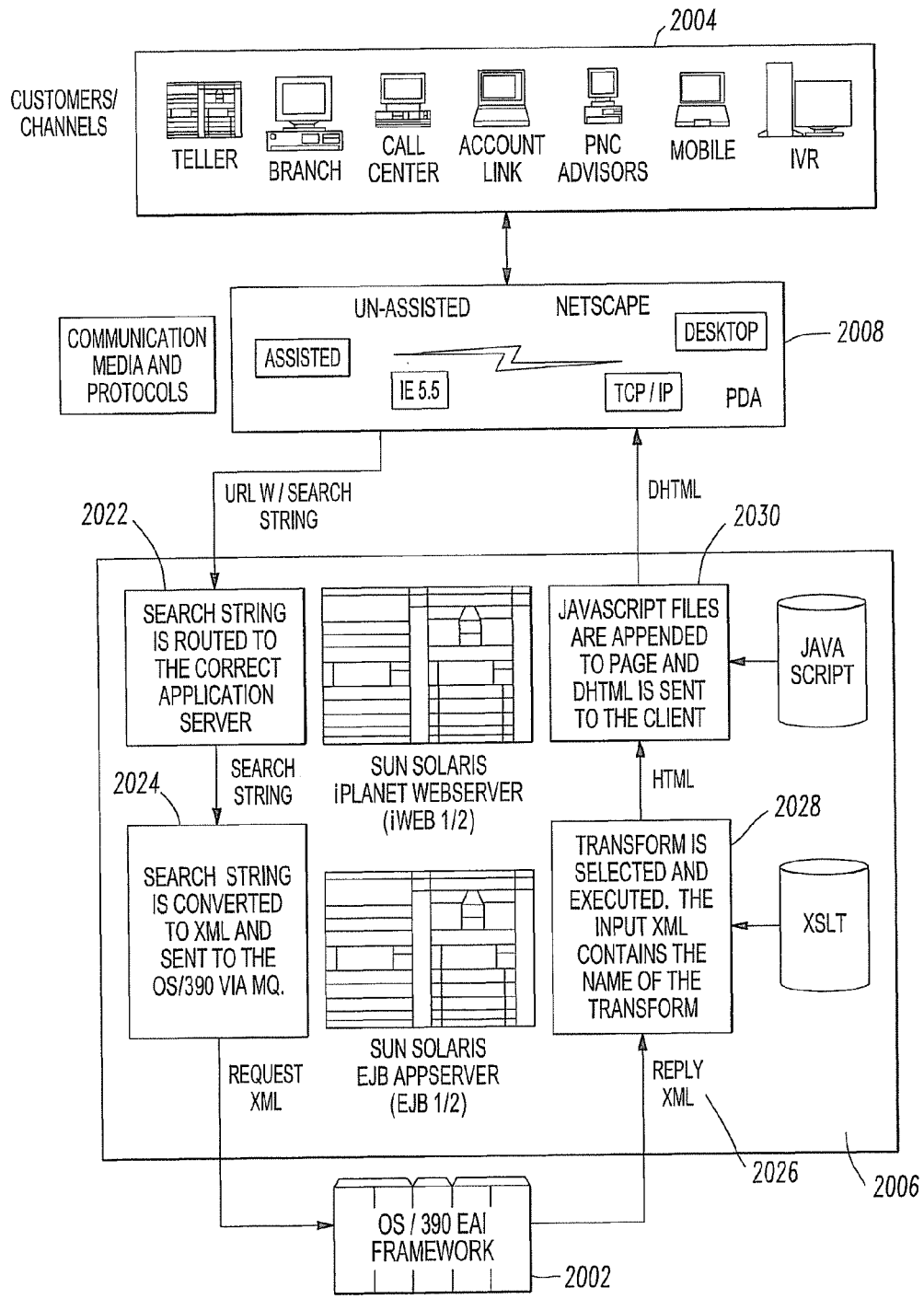
FIG. 20 illustrates an example of an EAI framework structured with a mainframe-based, XML rules-based engine and various associated process steps.

Referring now to FIG. 20, the EAI framework 2002 may be structured with a mainframe-based, XML rules-based engine that assists with data communication and processing with customers or channels 2004 through an application server tier 2006. The channels 2004 may communicate with the application server tier 2006 through one or more types of communication media or protocols 2008, as shown. In conventional mainframe environments, COBOL or another type of programming architecture is usually employed which can be considered "flat" or one-dimensional in the sense that such programming does not fundamentally possess a descriptive language that describes where elements (e.g., objects or complex objects) can be accessed. In contrast, embodiments of the invention may employ a business rules engine expressed using an extensible language such as XML, for example, as a basis for the rules triggered and executed by the system.

At step 2022, a URL search string may be initiated from a customer or channel 2004 through one of the communication media or protocols 2008 for routing to an application server in the application server tier 2006. An example of such a URL search string is illustrated in FIG. 21. At step 2024, the URL search string may be converted into XML (or another suitable language) and then communicated to the EAI framework 2002, such as via MQ. An example of the URL search string as converted into XML is demonstrated in FIG. 22. A reply XML is created or generated in the EAI framework 2002 at step 2026 (an example of the XML reply is shown in FIG. 23). At step 2028, a transformation is selected and executed on the reply XML (an example of which is shown in FIG. 24) and HTML may be generated (an example of which is shown in FIG. 25). At step 2030, JavaScript files may be appended (as shown in FIG. 26) and DHTML may be communicated back to the customer or channel 2004 through the communication media or protocol 2008 (see example screen shown in FIG. 27).

Those skilled in the art will appreciate that the EAI framework of the embodiments of the invention reduce or eliminate the need to rewrite programming or duplicate data into different distributed applications. A core system of financial systems, for example, such as trust systems, CIF systems, customer information systems, and many others can be maintained and accessed through a mainframe system. The EAI framework provides an enterprise service bus which can translate XML, MQ, HTTP, delimited format, and data translations, while insulating or securing data from a distributed application server system. Embodiments of the invention therefore leverage the benefits of power, control and security which arise from using a mainframe system in contrast to excessive use of distributed application servers, while also promoting a significant browser-based experience for customers or channels that access the mainframe system.

Figure 28:
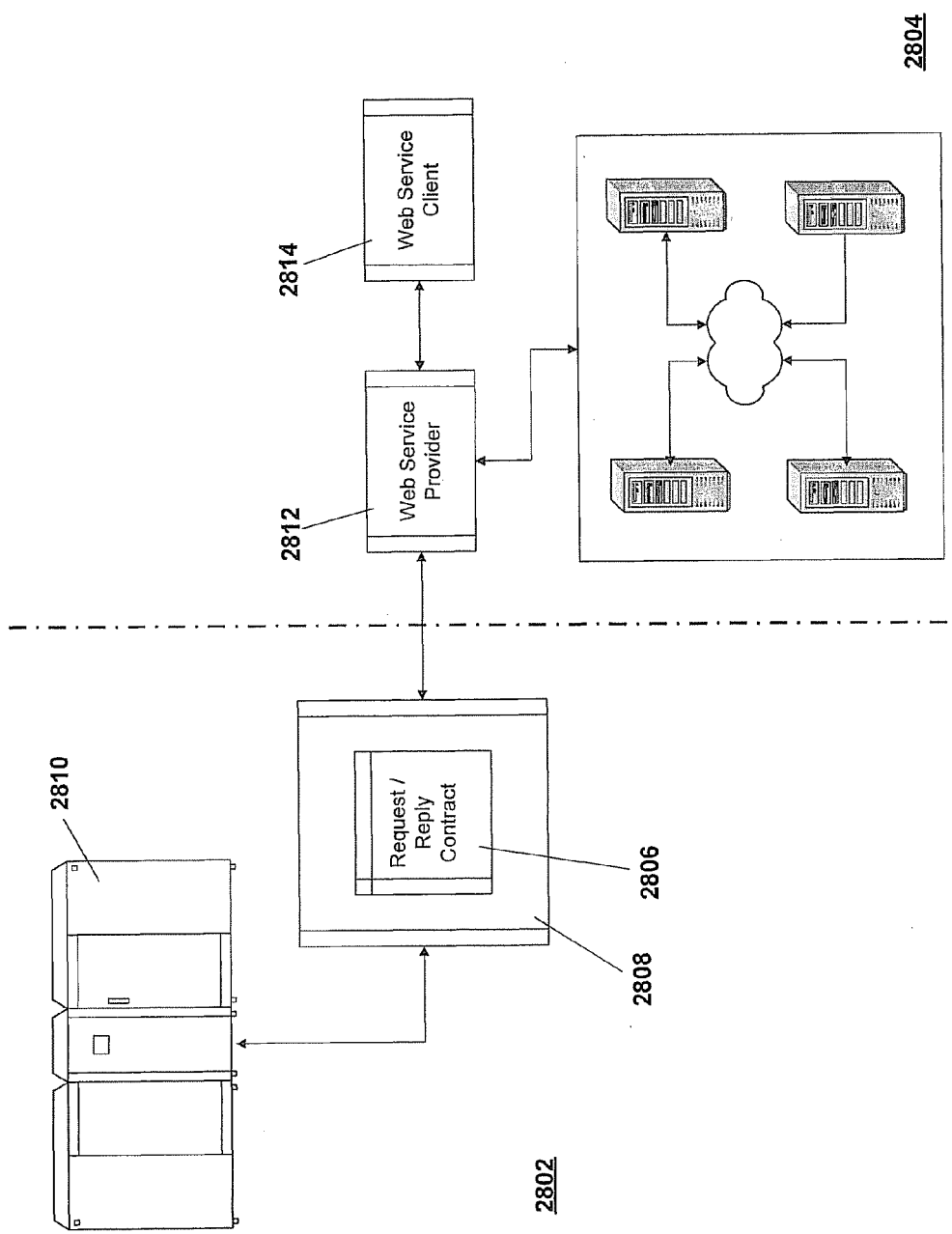
FIG. 28 schematically illustrates one example of an interactive architecture that can be employed as a bridge between a mainframe-based computing environment and a distributed server-based computing environment.

FIG. 28 schematically illustrates one example of an interactive architecture that can be employed as a bridge between a mainframe-based computing environment 2802 and a distributed server-based computing environment 2804. As shown, a request/reply contract 2806 can be expressed in a copybook 2808, such as a COBOL-based copybook of a mainframe computer system 2810, for example. Such request/reply contracts 2806 may include instructions for electronically processing a variety of transactions, such as using an account number to retrieve a name associated with the account, or a balance on the account, for example. Various other types of request/reply transactions are within the scope of the invention, including many types of transactions conducted by financial service providers, for example, with other entities. The request/reply contract 2806 generated in the mainframe computing environment 2802 can be employed as a foundation for creating web-based functionality for a web service provider 2812 in the distributed computing environment 2804. Construction of such web-based functionality or web services can be facilitated through creation of a WSDL (web services definition language) file, for example. Those skilled in the art will appreciate that the WSDL file can be encoded in XML and may describe one or more web services. The WSDL file can specify a location for a web service and the operations or processes that the web service provides. Thus, a web service can be derived from the copybook 2808 contained in the mainframe computer system 2810 by creating and delivering output files to serve as the basis for generating the WSDL file and ultimately for constructing the web service. A web services client 2814 can then subscribe to the web service provider 2812 which possesses web service functionality that has been derived from the mainframe-based request/reply contract 2806. In effect, the web service provider 2812 can be represented as a batch file operation or a CSC on-line transactional type service, for example, executed within the mainframe-based computing environment 2802.

Various embodiments of the invention may employ various features and functions of the EAI framework (previously described herein) to facilitate creation of link-level instructions in a COM (communication) area of the mainframe computer system 2810. For example, a software programmer might write a link-level CSC COBOL program executable by the mainframe system 2810 that accepts the request and returns the reply (i.e., an example of the request/reply contract 2806). From the perspective of the web service provider 2812, it can be appreciated that the WSDL file which is ultimately generated from the mainframe-based request/reply contract is independent of programming languages, network protocol, transmission protocol, or any other computer protocols employed by the recipient of the WSDL file. The WSDL file may be useful to any entity or computer system that is capable of accepting and executing the WSDL file. For example, the web service provider 2812 may employ XML, remquo, HTTP, or other kinds of protocols or programming languages. However, as long as the web service provider 2812 can communicate in terms of web services definition language, then it can make suitable use of the WSDL file, regardless of the fact that the WSDL file has its ultimate origins in the mainframe-based computing environment 2802. Embodiments of the invention thus leverage the functions represented by the request/reply contract 2806 executable in connection with the processing power of the mainframe computer system 2810.

Figure 29:
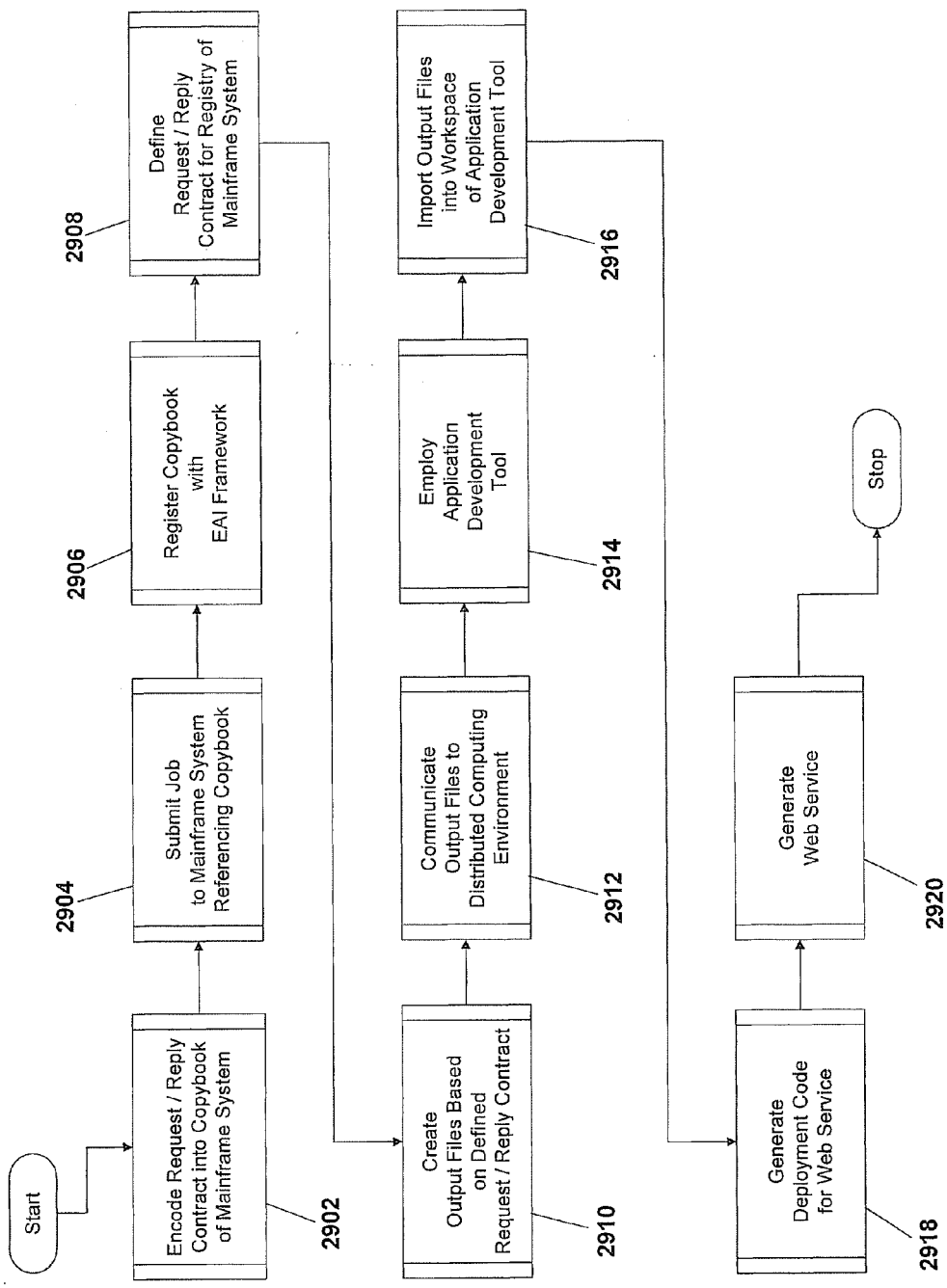
FIG. 29 includes a process flow diagram illustrating a method in accordance with various embodiments of the invention.

With reference to FIGS. 29, 30A and 30B, at step 2902, a request/reply contract can be encoded into a copybook of a mainframe system. FIGS. 30A and 30B include screen displays that provide a view into an example of a COBOL copybook of a mainframe system. In this example, the copybook is named CCTPCSRQ. As shown, the copybook is separated into an input area 3002 (see FIG. 30A) and an output area 3004 (see FIG. 30B), representing the request component and the reply component of a request/reply contract. As can be seen, the request can be configured to receive input or request parameters such as an operator ID ("PCSR-OPER-ID"), a CIF key ("PCSR-CIF-KEY"), a branch ("PCSR-BRANCH-ID"), an account type ("PCSR-ACCT-TYPE"), and an account number ("PCSR-ACCT-NUMBER"). Likewise, certain output or reply parameters are returned by the mainframe system based on processing the request parameters associated with the request/reply contract. As shown in the present example, the reply includes returning parameters such as card number ("PCSR-CARD-NO"), an opening date for the card ("PCSR-CARD-OPEN-DATE"), and a name on the card ("PCSR-CARD-NAME"), and other output parameters. In the present example, the request/reply contract can be employed in the context of PCS (Plastic Card System) transactions, such as may be employed in connection with credit cards, debit cards, or other types of purchase cards employed by financial institutions.

As graphically illustrated in the screen display of FIG. 31, at step 2904 a job can be submitted (e.g., through use of JCL (Job Control Language)) to the mainframe system referencing the copybook (i.e., "CCTPCSRQ"—described above at step 2902). After the job is submitted, the copybook can be registered with the EAI framework of the mainframe system at step 2906. Once registered with the EAI framework, the copybook can be considered to have an EAI representation within the EAI framework. During the registration process, the request/reply contract may be divided into separate request and reply components, while retaining the same copybook for both components.

At step 2908, the request/reply contract can be defined for the registry of the mainframe system, such as by assigning one or more tag names (e.g., XML tag names) to the fields (e.g., COBOL fields) of the request and reply components, for example. The tag names can be associated with the EAI framework fields for various functional reasons, such as to identify a length of the field, text justification, whether the field should include pre-entered data (e.g., filled with zeros), and many other types of parameters. In this manner, the various aspects of the request/reply contract can be mapped and identified for processing within the EAI framework. The screen displays of FIGS. 32A and 32B illustrate examples of how the request or input portion of the request/reply contract can be defined for the registry of the mainframe system. In addition, the screen displays of FIGS. 33A and 33B illustrate examples of how the reply or output portion of the request/reply contract can be defined.

At step 2910, a build object job can be executed in the mainframe system to create multiple output files based on the copybook and the EAI definition registry entries for the request/reply contract. The screen display of FIG. 34 illustrates an example of executing the build object job at step 2910. As shown in FIGS. 35A-35Z, and in the context of the present example, the output files of may be generated as Java-class files such as "proc.java" (see FIGS. 35A-35I); "reply.java" (see FIGS. 35J and 35K); "xml.java" (see FIGS. 35L-35N); "body.java" (see FIGS. 35O and 35P); "request-.java" (see FIGS. 35Q and 35R); "pcs.java" (see FIGS. 35S and 35T); "bean.java" (see FIGS. 35U-35X); and, "home-.java" (see FIGS. 35Y and 35Z). It can be appreciated that the output files can serve as the foundation for constructing the desired web service. As described above, various embodiments of the invention can be used to create Java software code through a mainframe-based program (e.g., COBOL) that generates the components needed to build the desired web service.

At step 2912, the output files obtained from step 2910 can be communicated, such as through an appropriate file transfer protocol (e.g., FTP), to a destination location, such as a computer server included within a distributed network computing environment, for example. FIG. 36 includes a screen display illustrating an example of submitting a file transfer command to the mainframe system to communicate the output files to the distributed computing environment.

Figure 37:
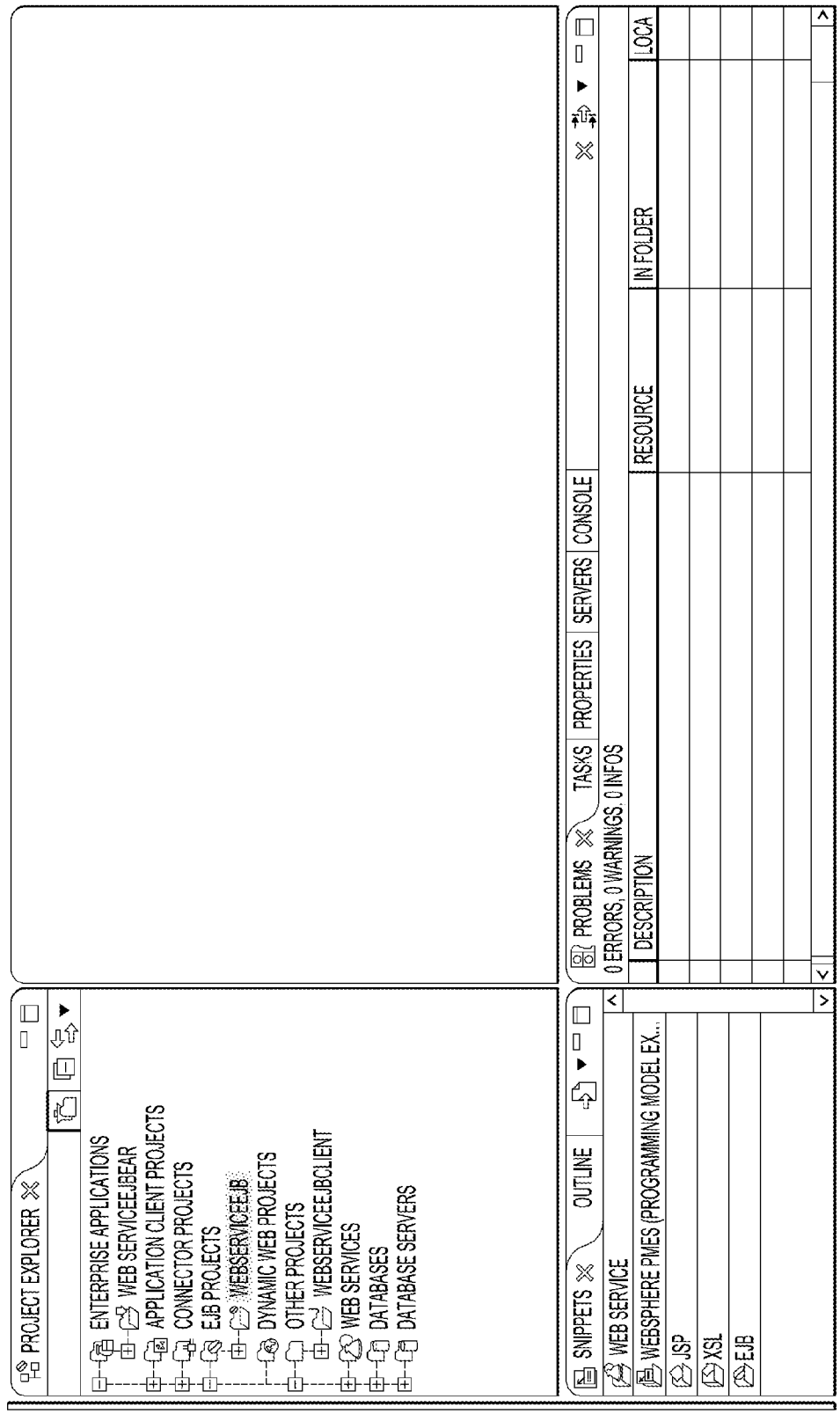
Figure 38:
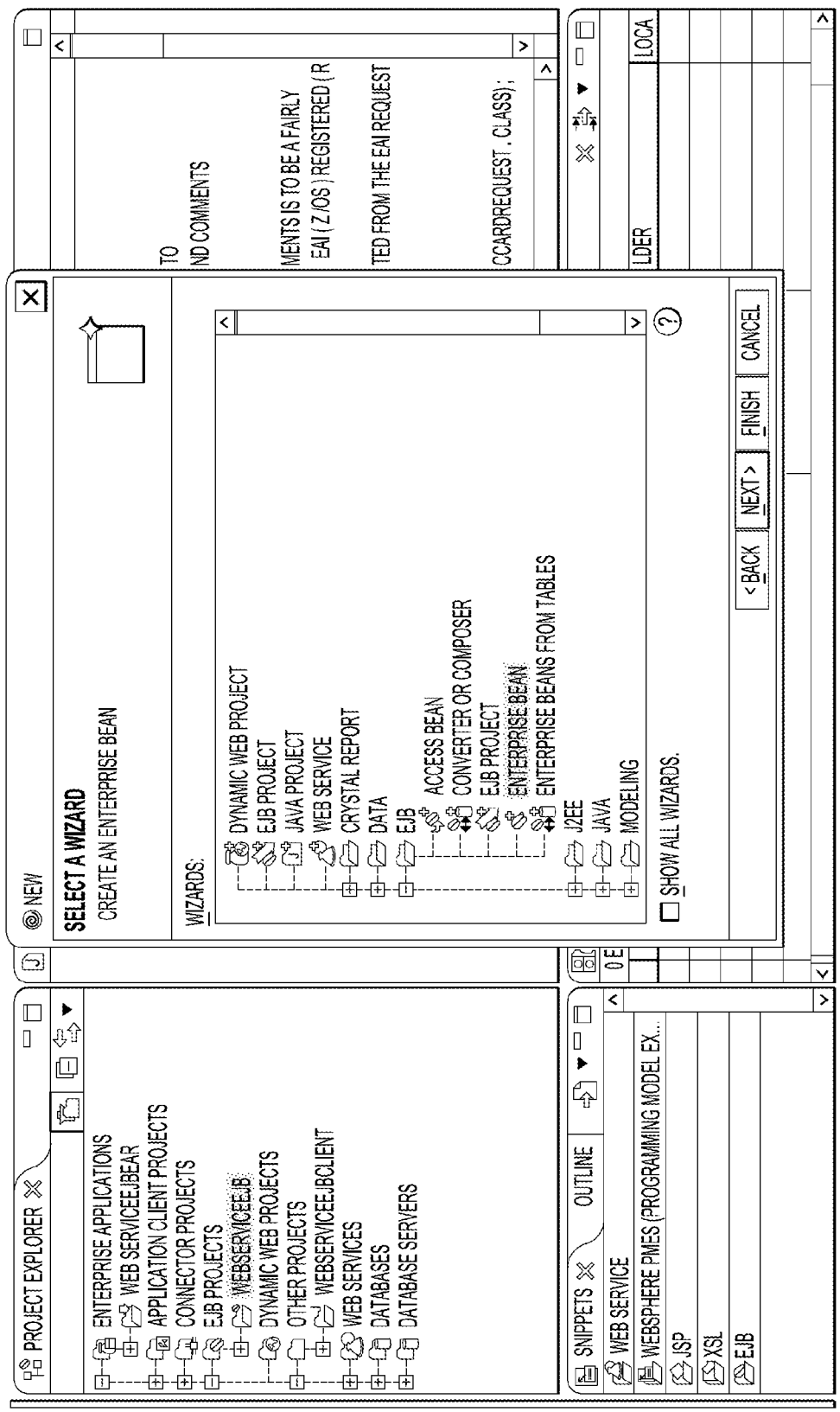
Figure 39:
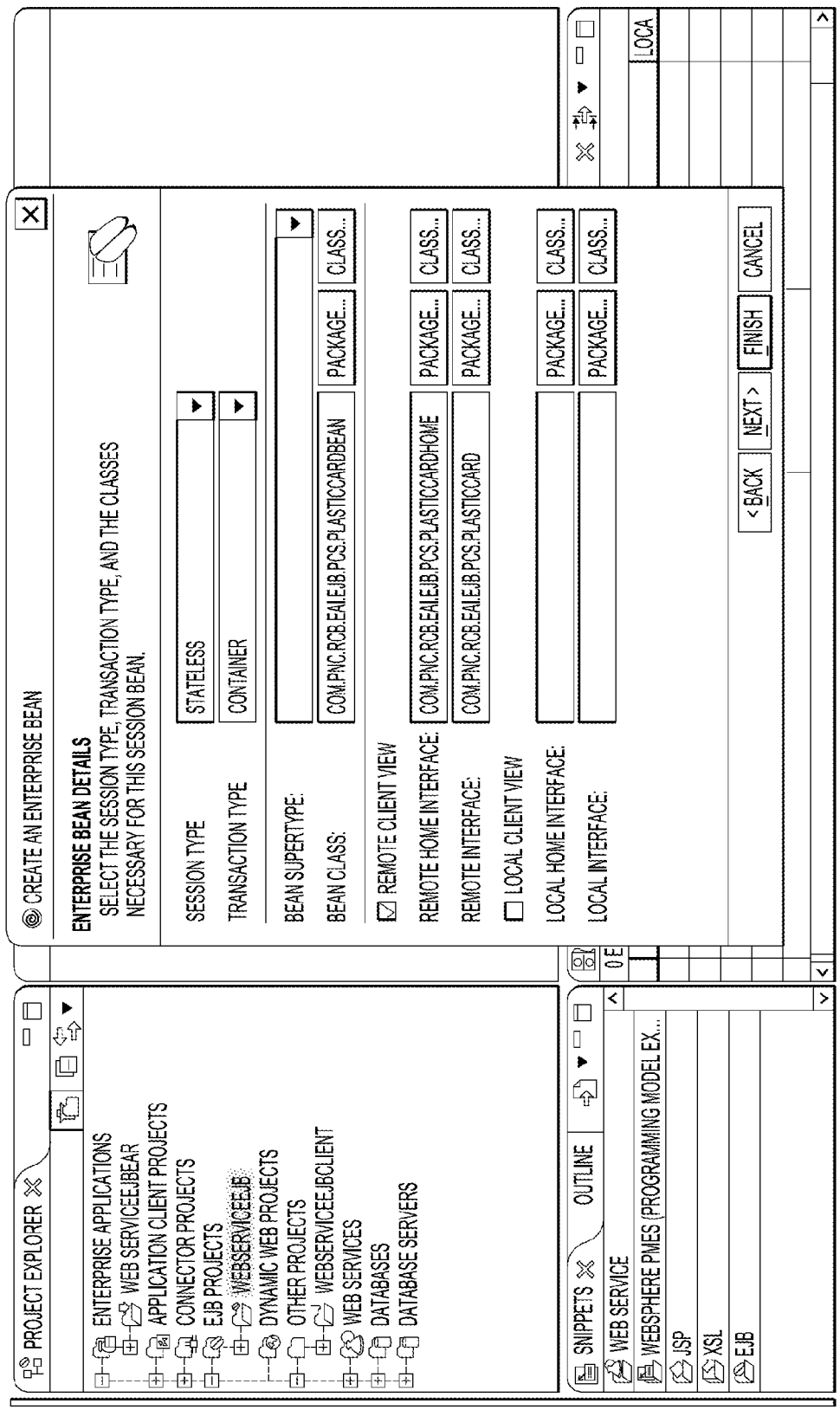
Figure 40B:
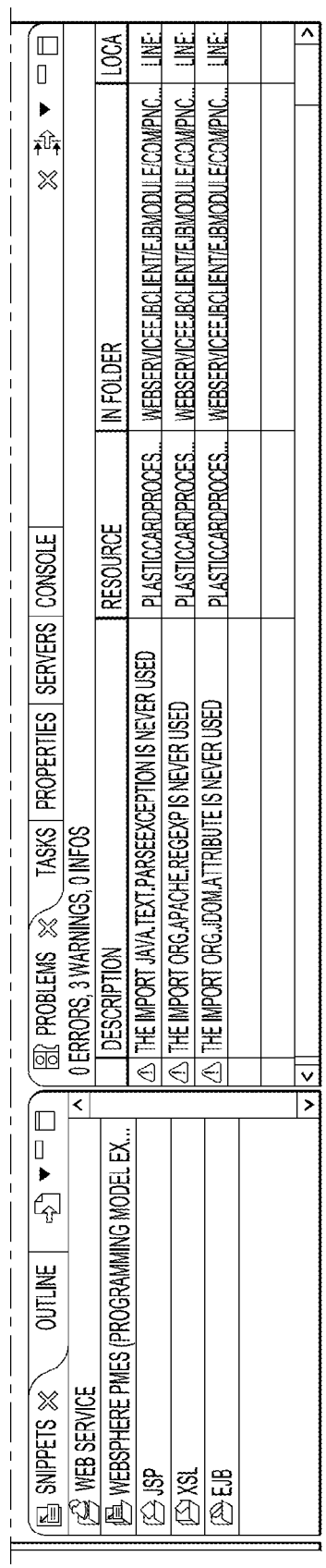
Figure 42A:
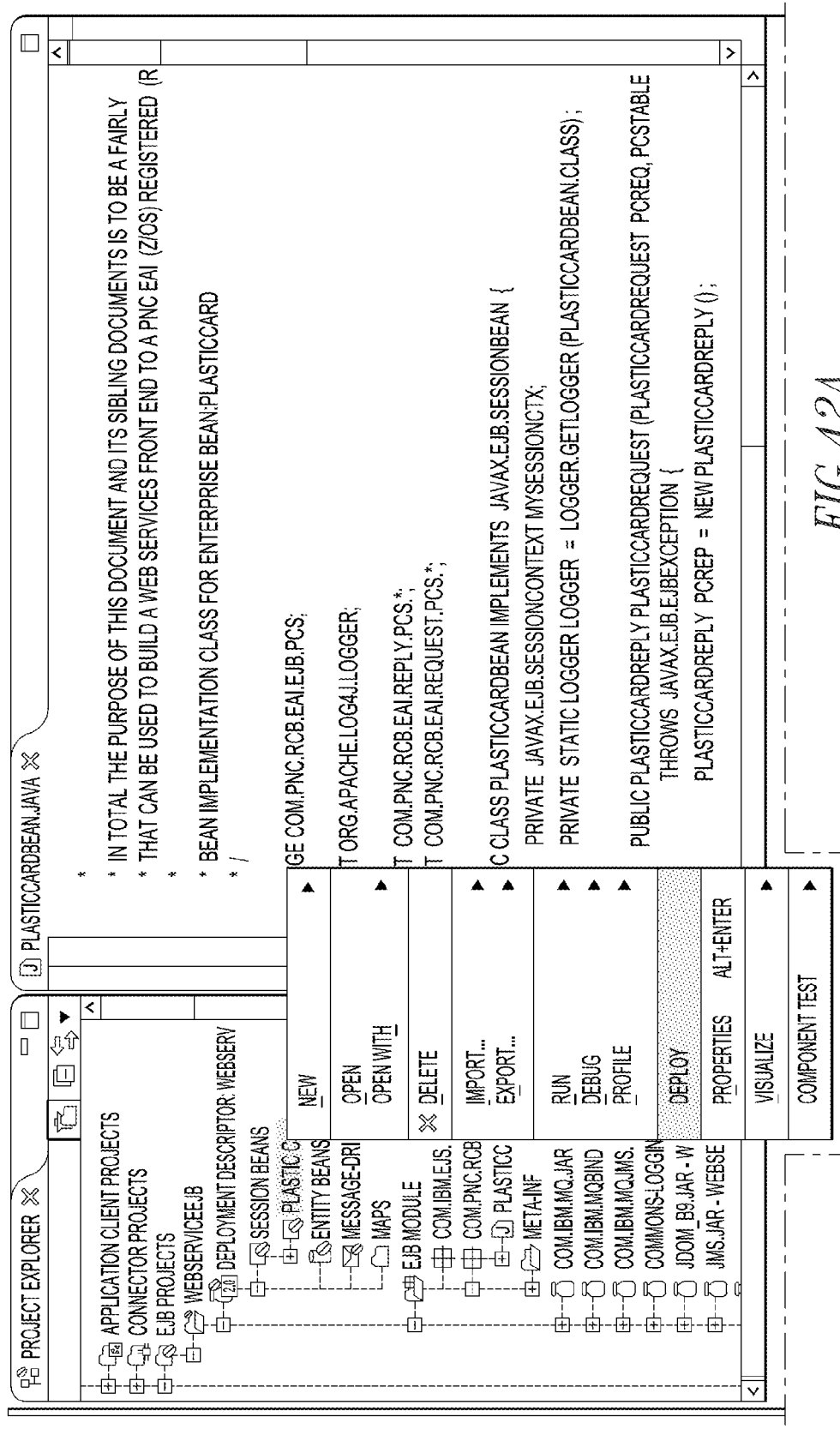
Figure 42B:
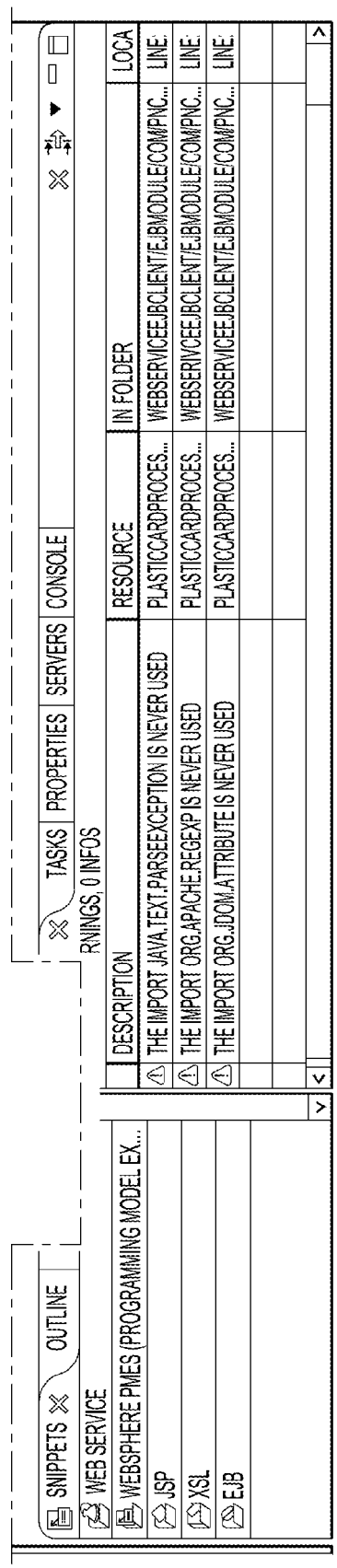
Figure 43A:
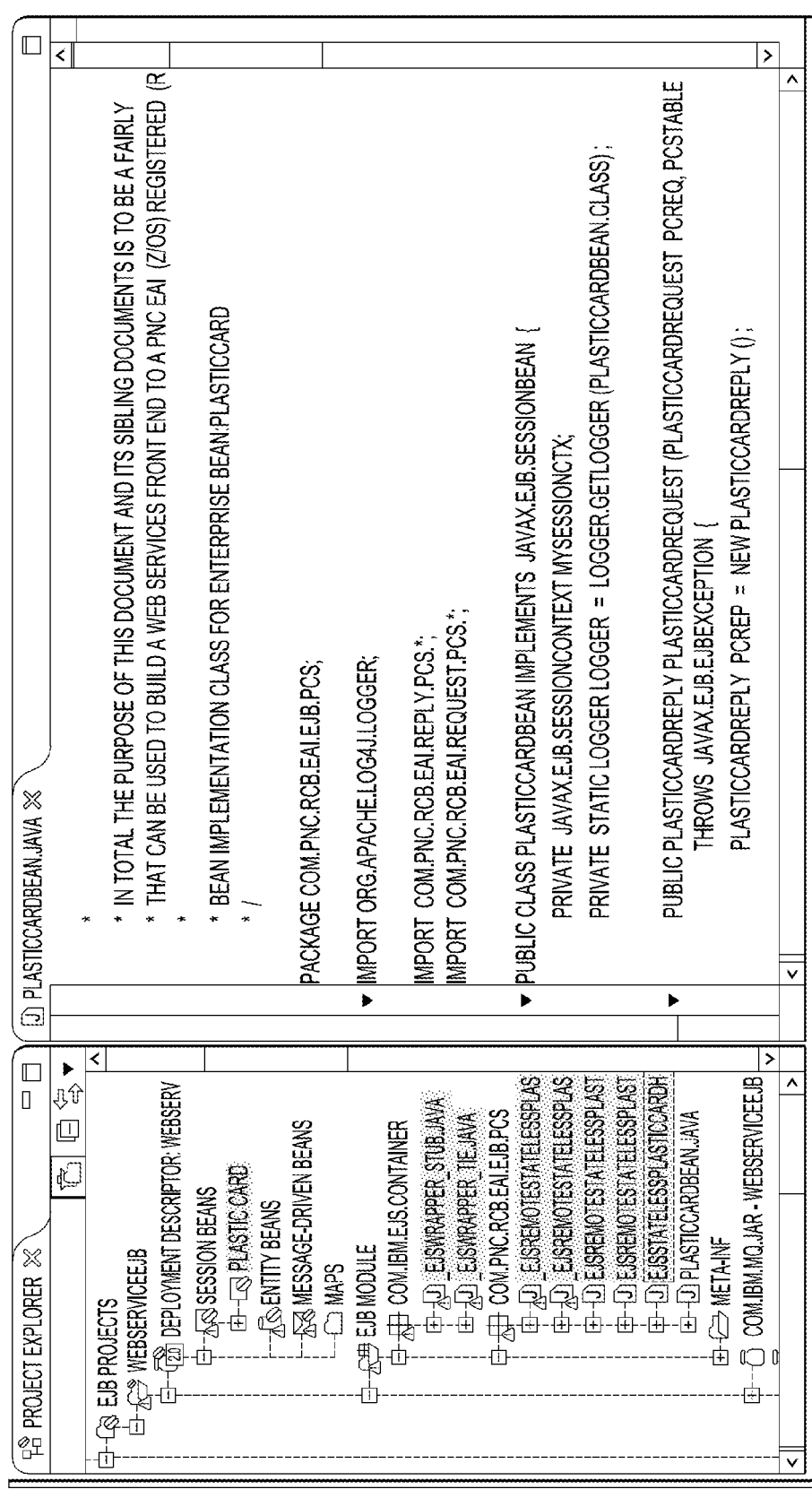
Figure 44A:
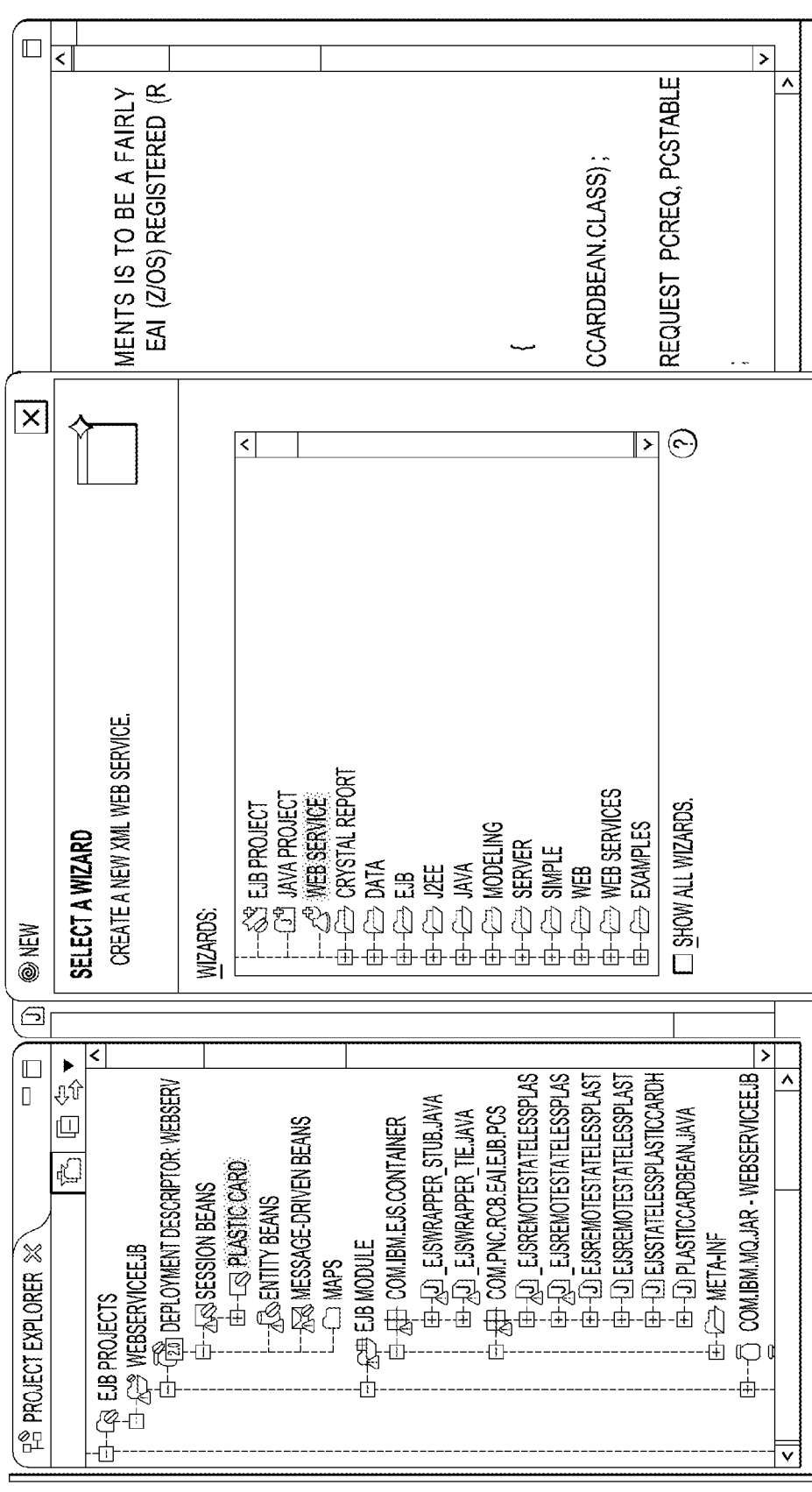
FIGS. 44A-47B illustrate examples of generating a web service in accordance with various embodiments of the invention.
Figure 44B:
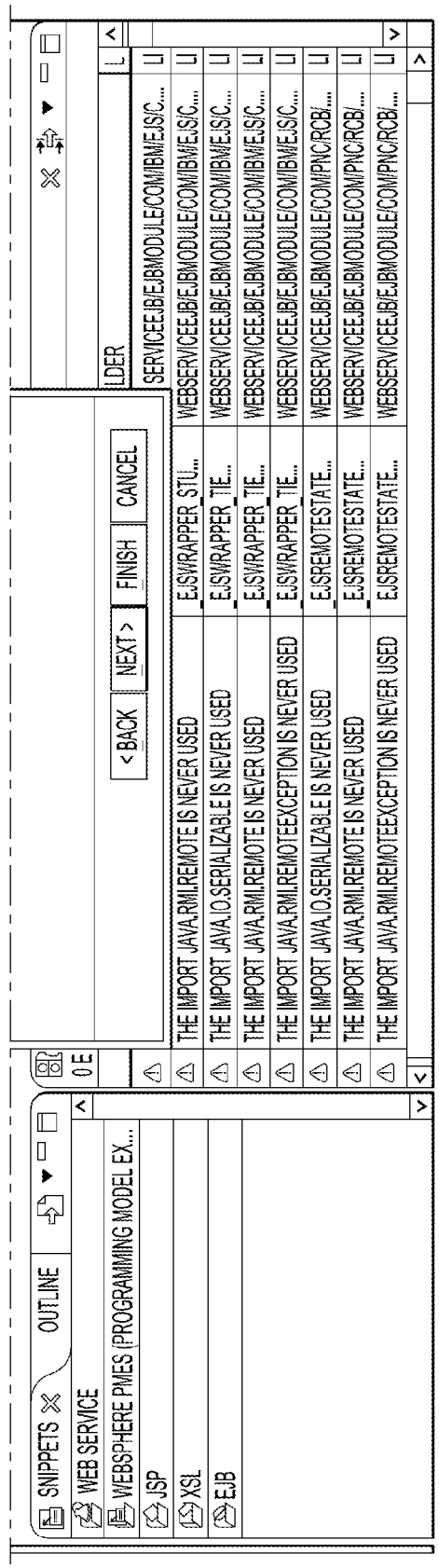
Figure 45A:
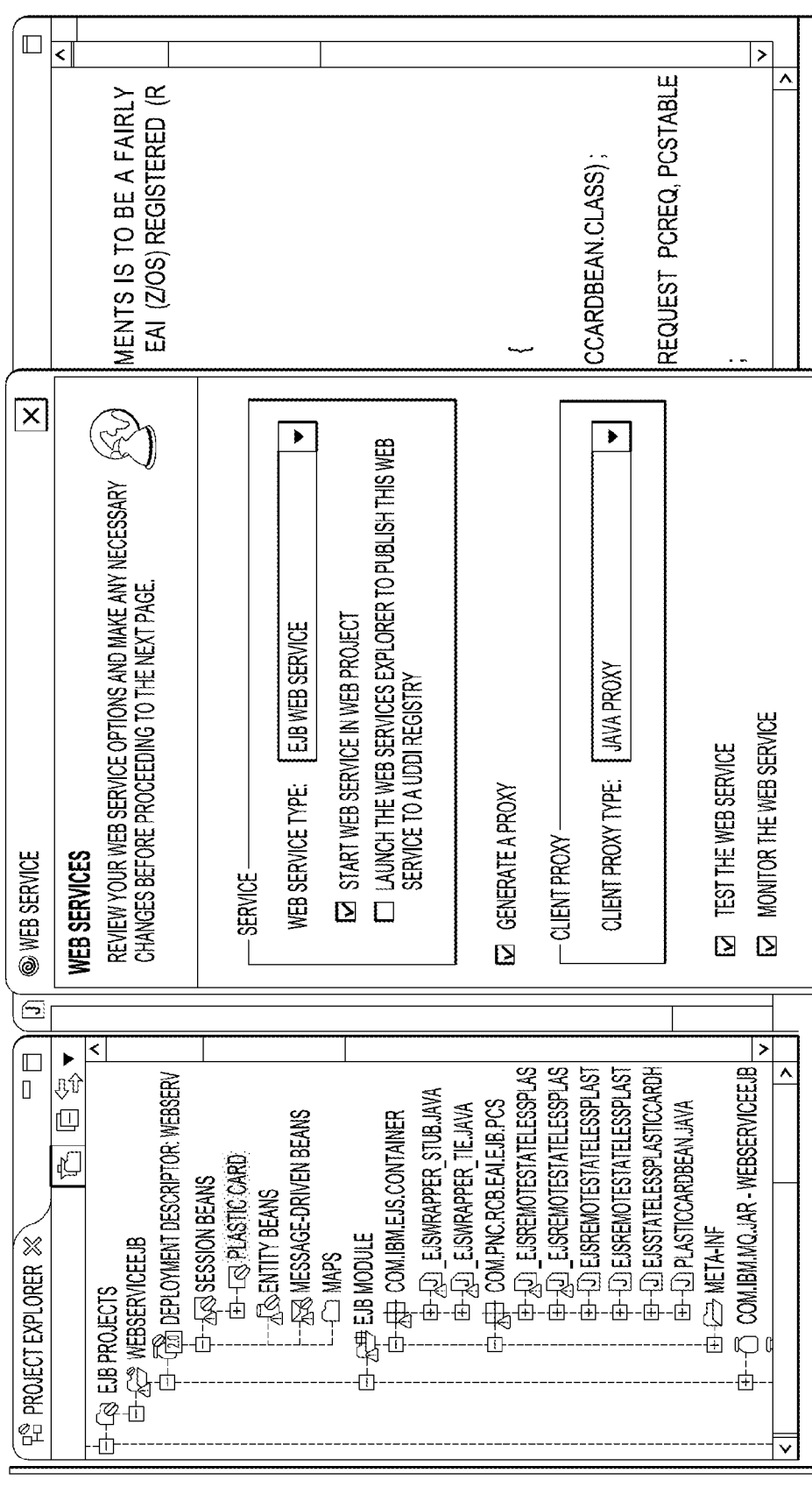
Figure 45B:
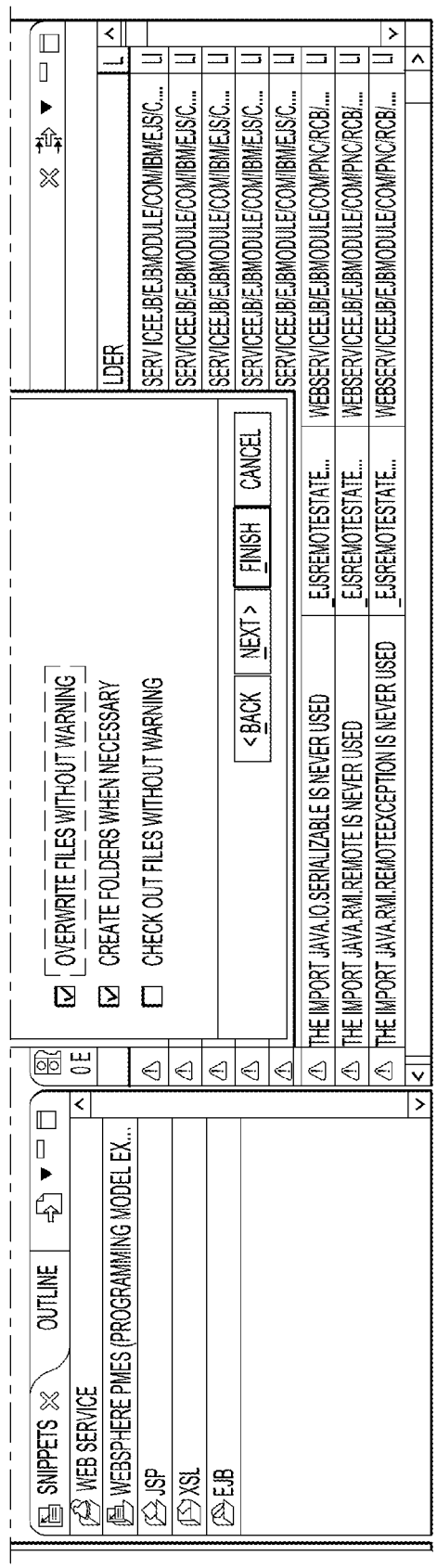
Figure 46A:
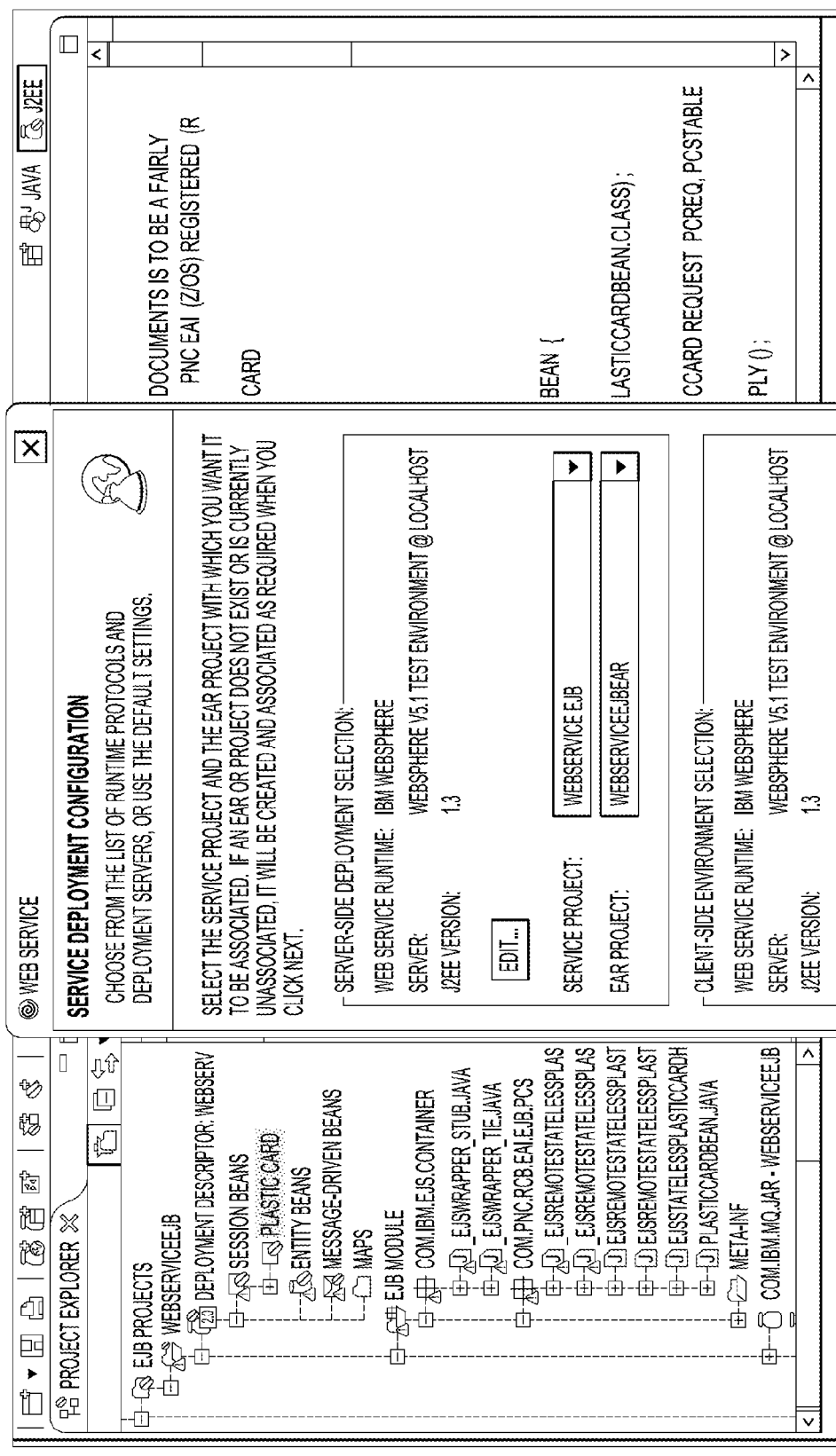
Figure 46B:
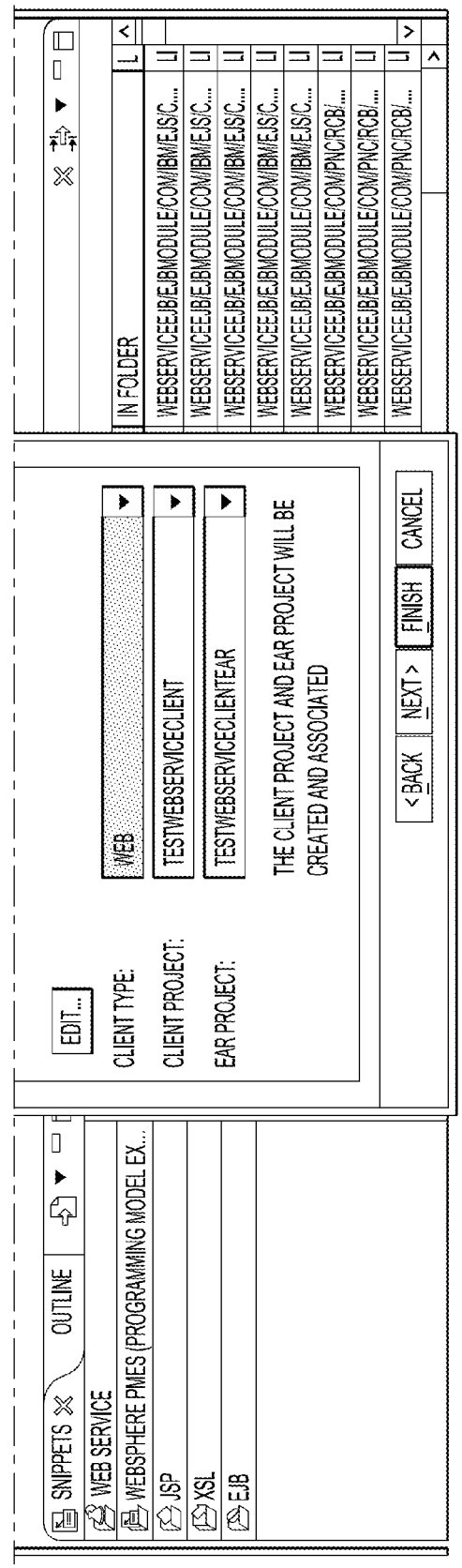
Figure 47A:
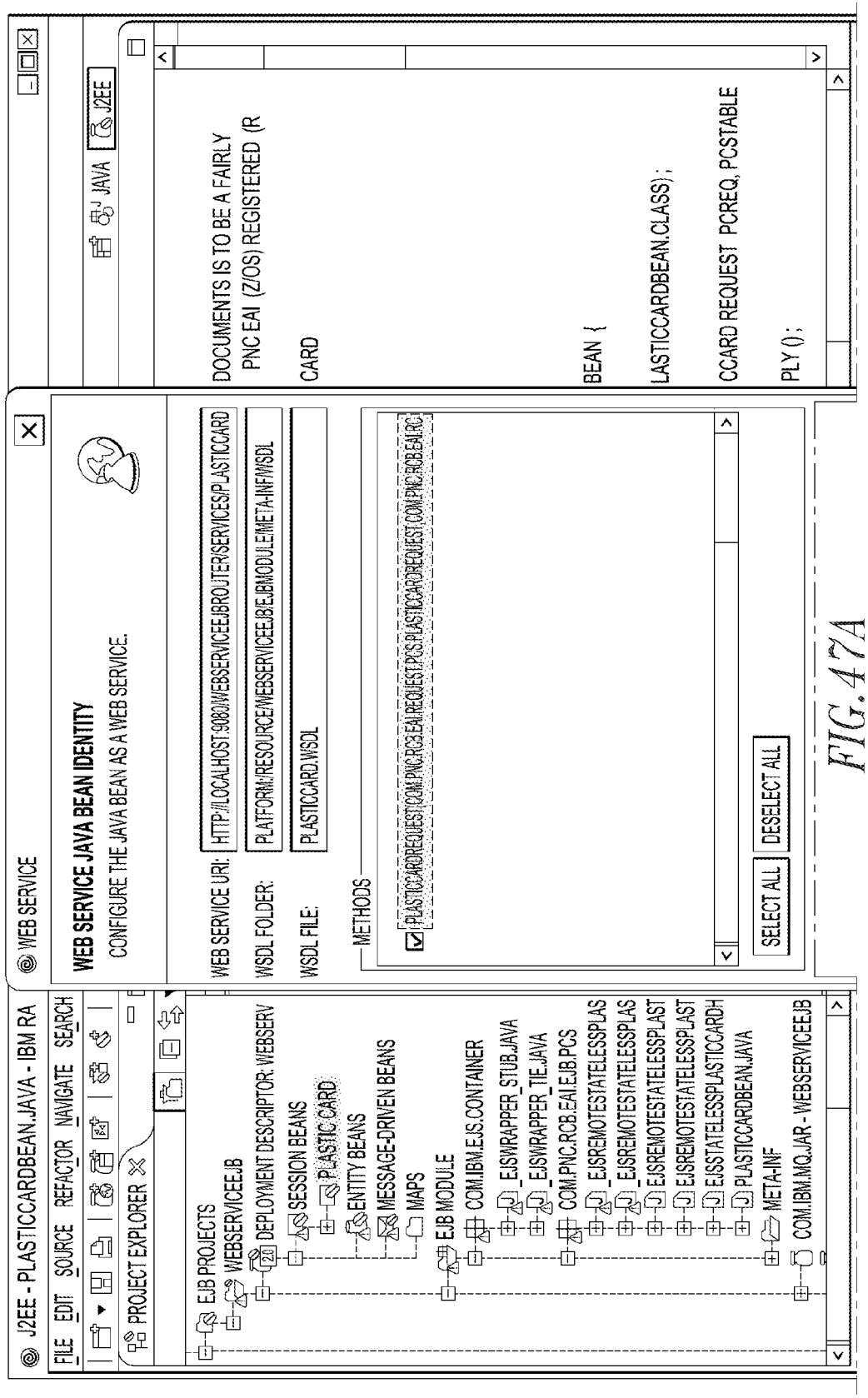
Figure 47B:
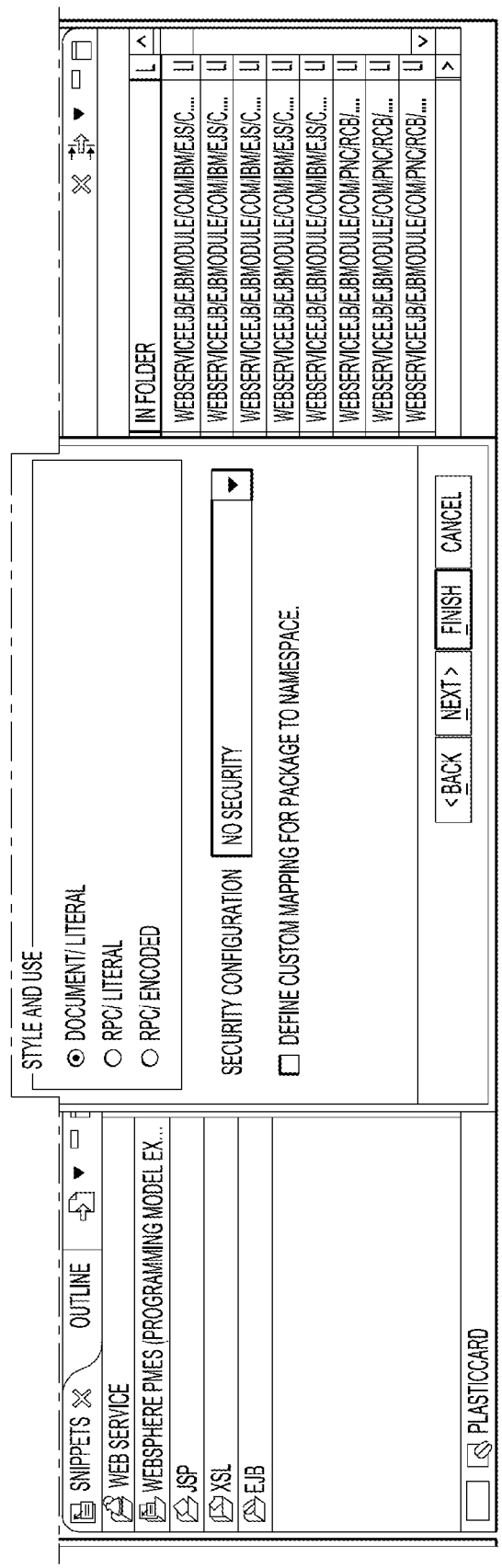

At step 2914, an application development tool such as IBM Rational Software Development Platform, for example, can be employed in connection with the output files for compiling the output files and constructing the web service. FIG. 37 illustrates an example of creating an "Enterprise EJB" project within the application development tool. FIGS. 38 and 39 illustrate an example of creating an enterprise bean using the application development tool.

At step 2916, the generated output files can be imported into the project work space of the application development tool. Examples of importing files into the project workspace of the application development tool are illustrated in the screen displays of FIGS. 40A-40B and 41A-41B. At step 2918, deployment code associated with the web service may be generated. The screen displays of FIGS. 42A-42B and 43A-43B illustrate examples of generating the deployment code for the web service. At step 2920, the web service can be generated by using the application development tool. The screen displays of FIGS. 44A-47B illustrate examples of generating the web service; and FIGS. 48A1-48A2 and 48B1-48B2 illustrate an example of a WSDL file generated during this process.

Figure 49A:
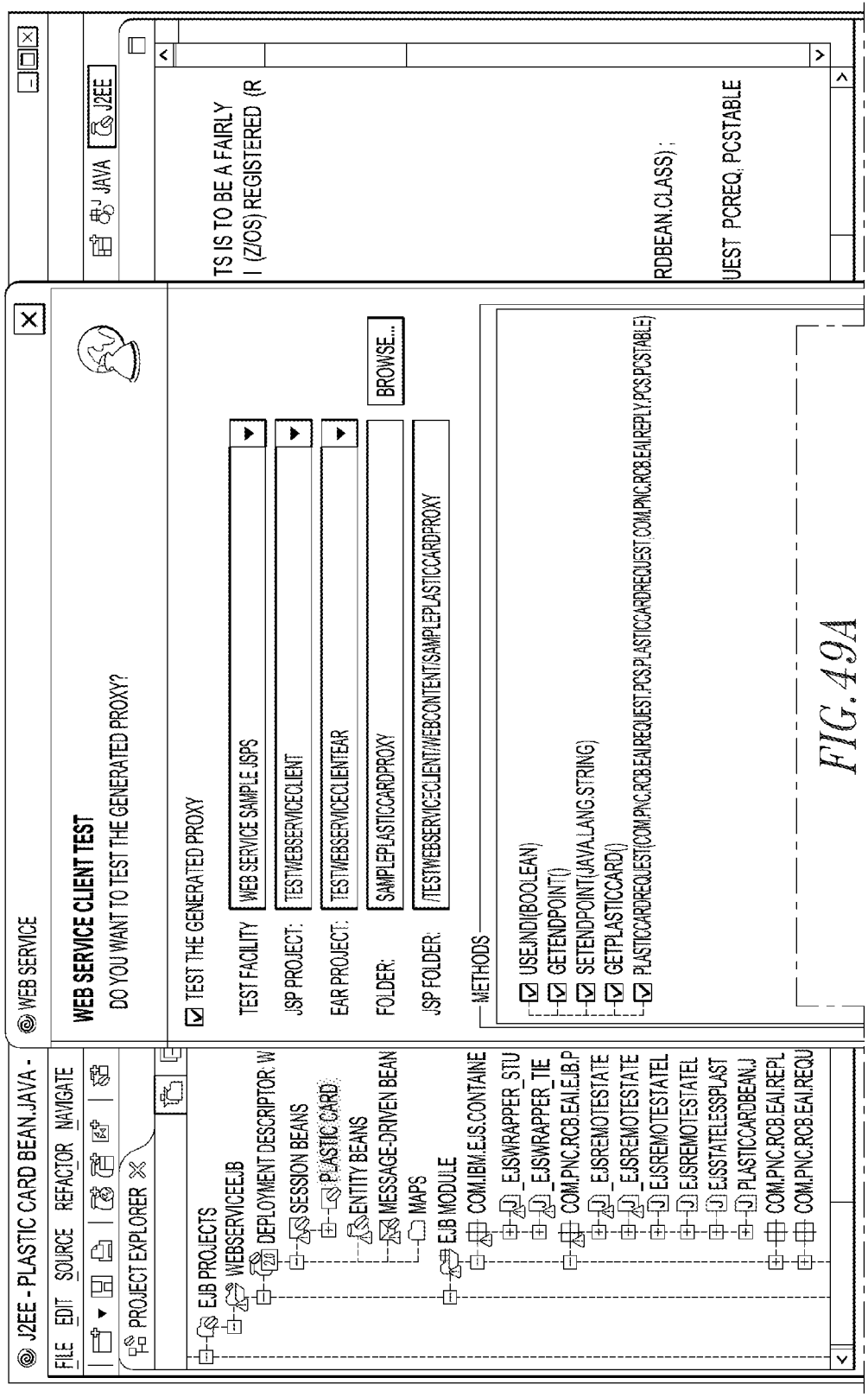
FIGS. 49A-49B include a screen display illustrating an example of creating a web service test client; and, FIG. 50 includes a screen display illustrating an example of executing the web service with the test client to obtain output data.
Figure 49B:
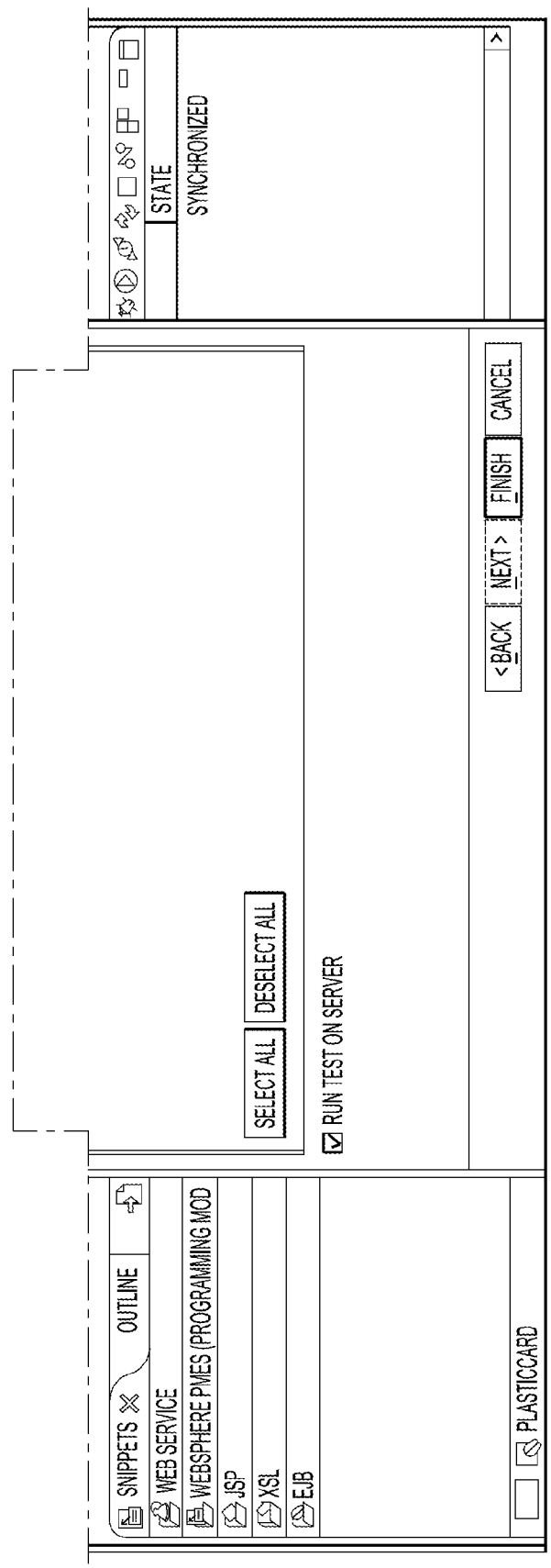

Subsequently, a test client can be created from the WSDL file for testing the web service. The screen display of FIGS. 49A-49B shows an example of creating a test client. Using the test client, the system can execute a message to communicate with the mainframe system in connection with executing the operations of the web service. For example, the interaction with the mainframe system may have involved communicating through a JAMS interface using an MQ call as the physical implementation of the JAMS interface. The screen display of FIG. 50 shows an example of executing the web service through the test client to obtain output data 5002 in response to input data 5004 entered in accordance with the request/reply contract which ultimately originated from the mainframe system. In various embodiments, multiple methods may be included within the same web service. For example, multiple inquiry messages communicated to the mainframe system can be embodied in a single web service.

The benefits and advantages of embodiments of the invention are readily apparent. Those skilled in the art will appreciate the advantages of encoding in Java classes, for example, in connection with pre-existing "hand shake" communication supplied by the mainframe system which is built into the EAI framework. Significant portions of data entry and other error prone activity associated with programming computer instructions can be reduced or eliminated by using various embodiments of the invention. The embodiments described herein account for data fields marshaled out of an XML stream into an object, marshalling data from serial data to an object and back and forth between the mainframe-based computing environment and the distributed computing environment. This allows for ready translation of data and processing functions in a web service in SOAP (simple object access protocol), for example, or another like protocol.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, components of the mainframe-based systems described herein may vary based on business requirements: EAI parsing algorithms can be called from both batch and on-line programs and are configurable; EAI tagging algorithms can be called from both batch and on-line programs and are configurable; routing rules are configurable; URLs are configurable; both synchronized and non-synchronized messages can be supported; and SOAP messages can be communicated to allow and facilitate web services communication.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, selected embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Such software may be stored on any type of suitable computer-readable medium or media such as, for example, a magnetic or optical storage medium. Thus, the operation and behavior of the embodiments at times may be described without specific reference to the actual software code or specialized hardware components. The absence of such specific references is feasible because it is clearly understood that those skilled in the art would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO-.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A system for facilitating generation of a web service, the system comprising:
an electronic mainframe computer system having at least one data storage medium and a registry, wherein the electronic mainframe computer system is operative within an enterprise application integration ("EAI") computing framework and is located within a mainframe-based computing environment, the electronic mainframe computer system configured for:
generating a request/reply contract by the electronic mainframe computer system, such that the request/reply contract comprises instructions for electronically processing at least one transaction of a financial institution;
electronically encoding the request/reply contract into a copybook of the electronic mainframe computer system;
submitting a job to the electronic mainframe computer system, wherein the job references the copybook;
in response to submitting the job, registering the copybook with the EAI computing framework of the electronic mainframe computer system such that the copybook has an EAI representation within the EAI computing framework;

electronically registering the request/reply contract encoded in the copybook of the electronic mainframe computer system with a registry of the mainframe computer system;

electronically defining the request/reply contract for the registry by assigning at least one tag name to at least one data field associated with each request component and each reply component of the request/reply contract, wherein the least one tag name is associated with an EAI computing framework field of the electronic mainframe computer system such that the request/reply contract is identified for processing within the EAI computing framework;

executing a build object job in the electronic mainframe computer system to create multiple output files based on the registry definition of the request/reply contract, wherein the output files include at least one component needed to build a selected web service;

communicating the output files to a destination location within a distributed network computing environment; and wherein electronically registering the request/reply contract encoded in the copybook of the electronic mainframe computer system comprises dividing the request/reply contract into at least one request component and at least one reply component and retaining the same copybook for the at least one request component and the at least one reply component; and an electronic computer server configured for compiling the output files in the distributed network computing environment to generate a selected web service.

2. The system of claim 1, wherein the request/reply contract is configured to receive at least one input parameter, wherein the at least one input parameters is at least one of an Operator ID, a branch ID, an account type, and an account number.

3. The system of claim 1, wherein the copybook includes a Common Business-Oriented Language ("COBOL")-based copybook.

4. The system of claim 1, wherein the electronic mainframe computer system is further configured for separating the copybook into an input area representing the request components and an output area representing the reply components of the request/reply contract.

5. The system of claim 1, wherein the electronic mainframe computer system is further configured for defining the request/reply contract for the registry of the electronic mainframe computer system by assigning at least one Extensible Markup Language ("XML") tag name to at least one COBOL-based data field associated with each request component and reply component of the request/reply contract.

6. The system of claim 1, wherein the electronic mainframe computer system is further configured for generating the multiple output files as multiple Java-class output files.

7. The system of claim 1, wherein the instructions for electronically processing the at least one transaction of the financial institution of the request/reply contract comprise instructions for electronically processing at least one transaction of an application of the financial institution, wherein the application is at least one of an inquiry application, funds transfer application, new account proposal application, and a payment application.

8. The system of claim 7, wherein the transaction includes a plastic card system transaction.

9. The system of claim 1, wherein the request/reply contract includes a transaction selected from the group consisting of a teller system transaction, a branch system transaction, a call center system transaction, an account link transaction, and an interactive voice response system transaction.

10. The system of claim 1, wherein the electronic computer server is further configured for employing an application development tool for compiling the output files.

11. The system of claim 1, wherein the electronic computer server is further configured for generating deployment code associated with the selected web service.

12. The system of claim 1, wherein the electronic computer server is further configured for generating at least one web services definition language ("WSDL") file in association with the selected web service.

13. The system of claim 1, wherein the request/reply contract is configured to return a plurality of output parameters, wherein the plurality of output parameters comprise a card number of a financial services card, an opening date for the financial services card, and a name on the financial services card.

14. The system of claim 1, wherein the least one tag name comprises an XML tag name assigned to a COBOL field.

15. The system of claim 14, wherein the XML tag name is associated with a parameter of the EAI computing framework field, wherein the parameter comprises at least one of an identity of the length of the EAI computing framework field, text justification, and whether the EAI computing framework field should include pre-entered data.

16. The system of claim 1, further comprising an application development tool and wherein the electronic computer server is configured for importing the output files into the application development tool and wherein the application development tool generates deployment code associated with the web service.

* * * * *